United States Patent [19]
Windle et al.

[11] Patent Number: 4,809,177
[45] Date of Patent: Feb. 28, 1989

[54] MULTIPLEXED ELECTRICAL WIRING SYSTEM FOR A TRUCK INCLUDING DRIVER INTERFACE AND POWER SWITCHING

[75] Inventors: W. Eric Windle, Antwerp, Ohio; James W. Kruse, Fort Wayne, Ind.

[73] Assignee: Navistar International Transportation Corp., Chicago, Ill.

[21] Appl. No.: 85,661

[22] Filed: Aug. 14, 1987

[51] Int. Cl.⁴ .............................................. G06F 15/14
[52] U.S. Cl. ............................... 364/424.01; 180/170; 364/424.05
[58] Field of Search .................... 364/424, 426, 431.04

[56] References Cited

U.S. PATENT DOCUMENTS

| | | | |
|---|---|---|---|
| 3,553,475 | 1/1971 | Fee | 307/18 |
| 3,651,454 | 3/1972 | Venema et al. | 340/52 F |
| 3,683,197 | 8/1972 | Ives | 307/10 R |
| 3,696,758 | 10/1972 | Godinez, Jr. | 105/61 |
| 3,742,447 | 6/1973 | Sognefest et al. | 340/52 F |
| 3,846,639 | 11/1974 | Ueda et al. | 307/9 |
| 3,913,064 | 10/1975 | Salway et al. | 340/52 F |
| 4,041,470 | 8/1977 | Slane et al. | 364/900 |
| 4,065,751 | 12/1977 | Stewart et al. | 340/58 |
| 4,258,421 | 3/1981 | Juhasz et al. | 364/424 |
| 4,368,824 | 1/1983 | Thomasson | 364/424 |
| 4,639,609 | 1/1987 | Floyd et al. | 307/10 R |

OTHER PUBLICATIONS

"Coming From Detroit: Networks on Wheels", R. K. Jurgen, *IEEE Spectrum*, Jun. 1986, pp. 53–59, Published by IEEE.

"Multiplexed Car Wiring Called Next Automotive Waye", R. K. Jurgen, *The Institute*, May 1986, Published by IEEE, pp. 1,13.

"Serial Data Communications Between Microcomputers Systems in Heavy Duty Vehicle Applications", S.A.E. J1708, Jan. 1986.

"MPC 1510 Application Considerations", Motorola, Inc., Received 7/20/87.

"DDEC-Detroit Deisel Electronic Control", R. J. Hames et al., General Motors Corporation, Oct. 23, 1984.

"DDEC DDL Reader Model #1285 Instruction Manual", General Motors Corporation, Oct. 23, 1984.

"Compuchek Protection Plan", Cummins Engine Company, Inc., 1985.

*Primary Examiner*—Eugene R. Laroche
*Assistant Examiner*—David Mis
*Attorney, Agent, or Firm*—F. David Aubuchon; Dennis K. Sullivan

[57] ABSTRACT

The land vehicle electrical system comprises a cab controller including a microprocessor system and a chassis controller including a microprocessor system. The microprocessor systems have a multiplexed coupling therebetween and each system includes a microprocessor substantially identical to the microprocessor in the other system with the hardware in each system being substantially identical and with each microprocessor having slightly different software. The microprocessor utilized in the chassis controller has analog inputs for direct connection to sensors. A public data link and a private data link are provided between the microprocessors for additional and backup communication between them. Smart switches are coupled to one or both of the microprocessors and each switch includes means for indicating its status, open circuit or closed circuit, to a microprocessor and the microprocessor includes means for reading the status of the switch and for controlling the status of the switch. The microprocessor also have a diagnostic routine for diagnostic capability or fault isolation. Furthermore, the cab controller includes a visual display having touch actuated switch function areas on the screen of the visual display which switch function areas can be actuated to call up different menus and different control panels.

56 Claims, 38 Drawing Sheets

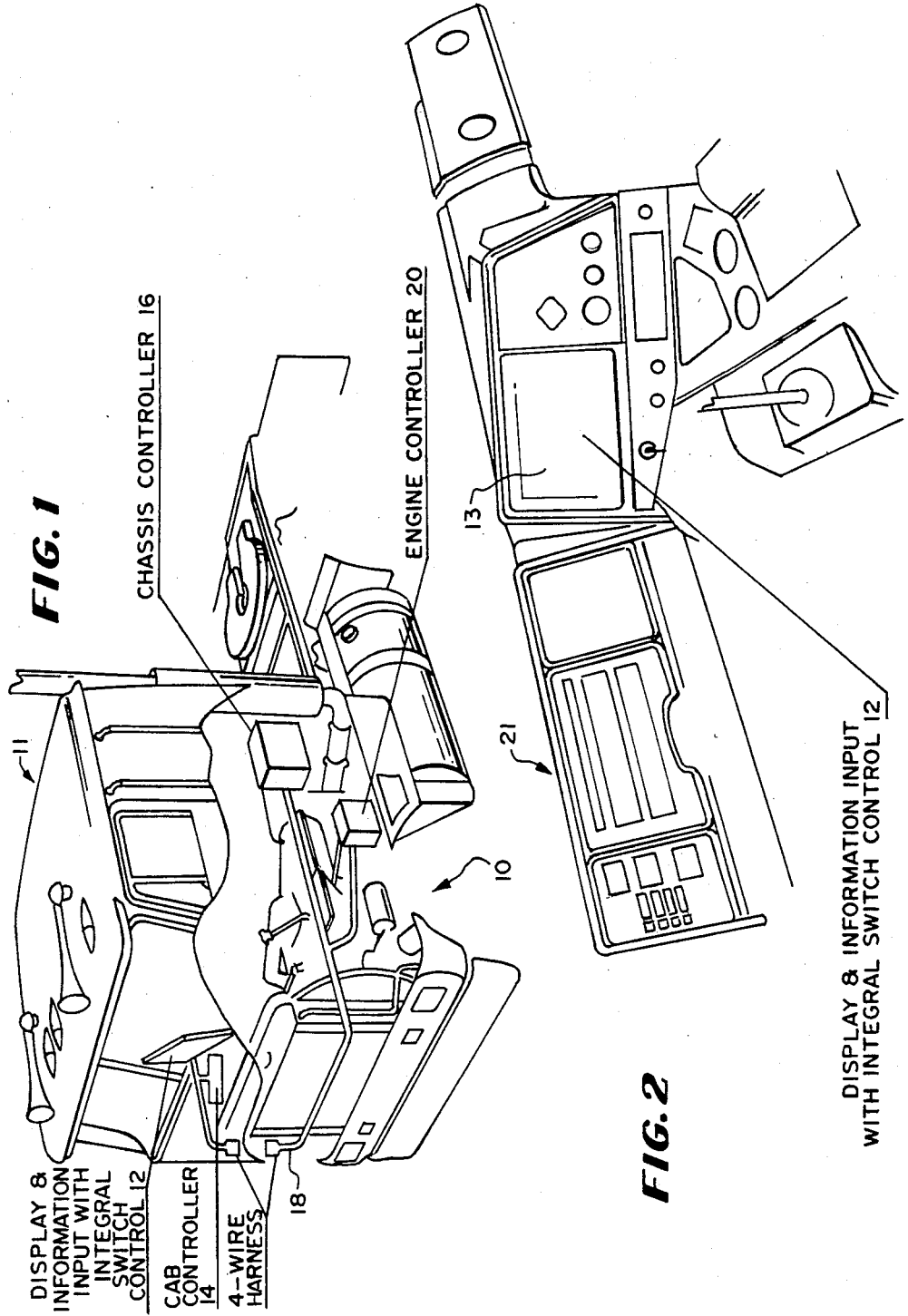

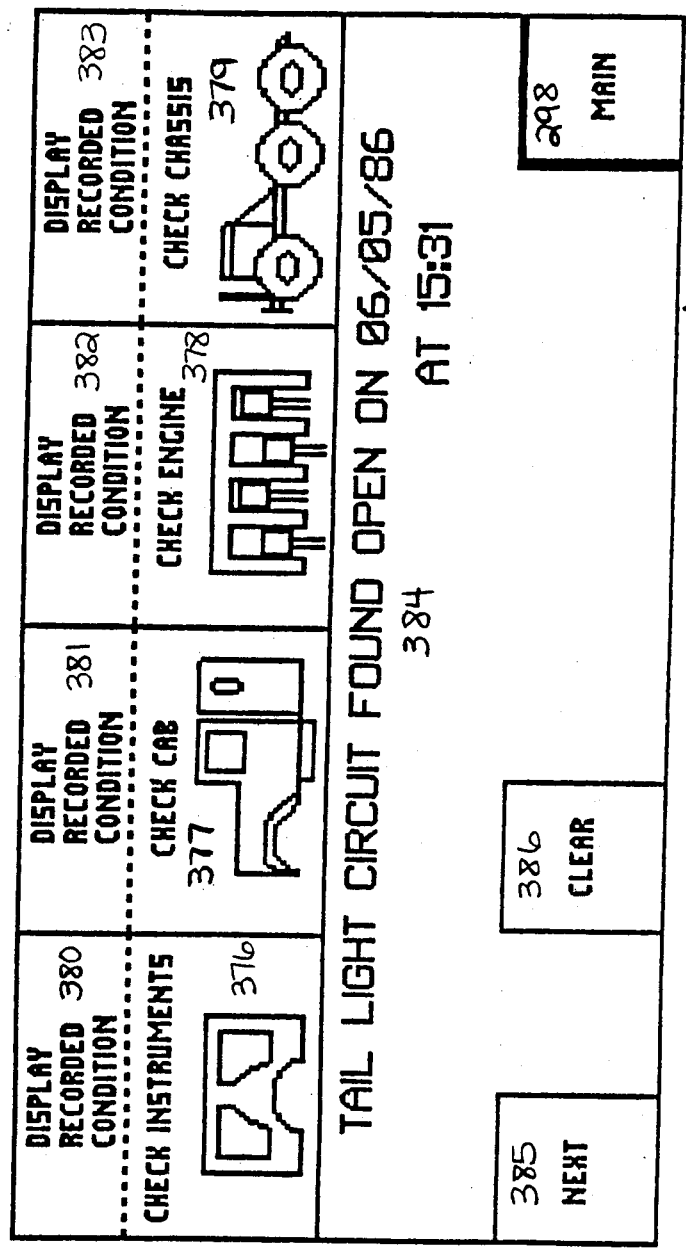

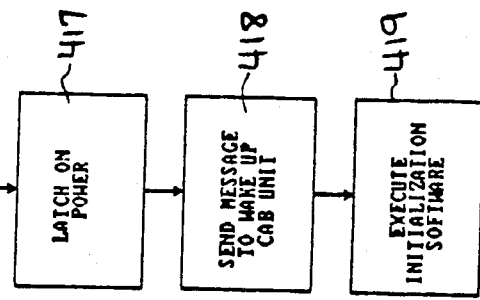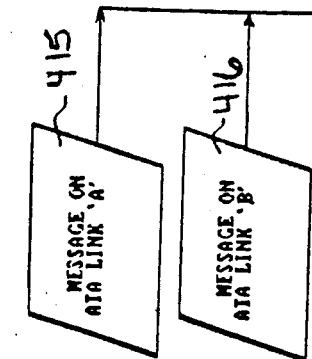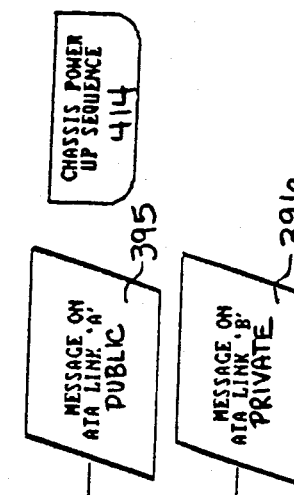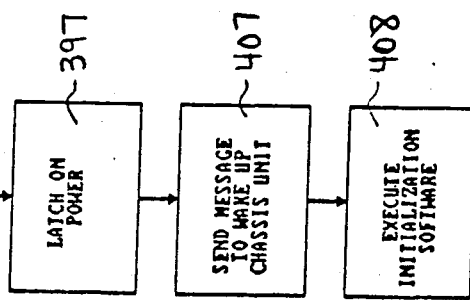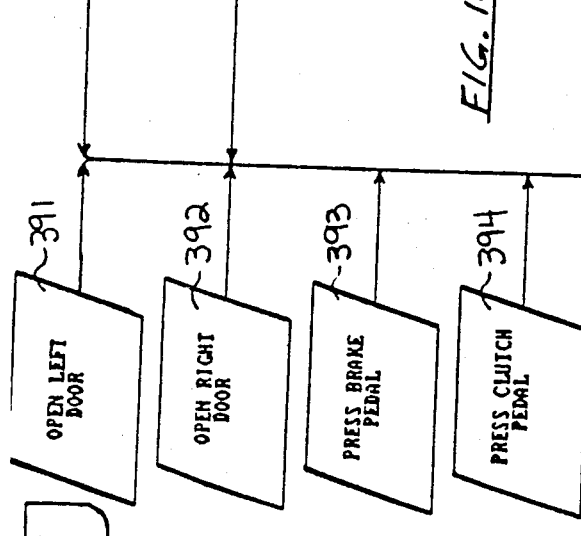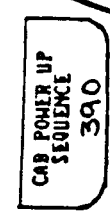

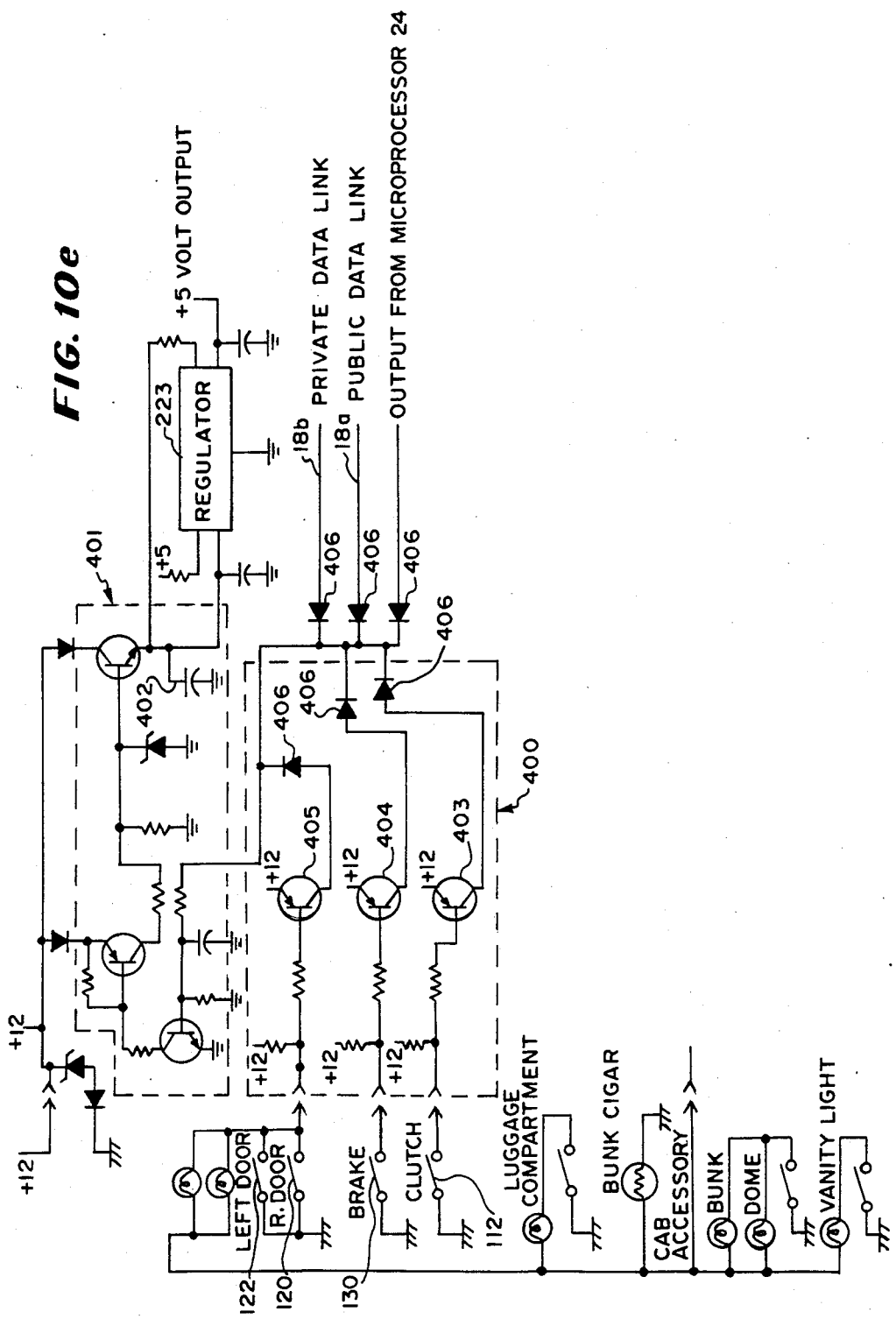

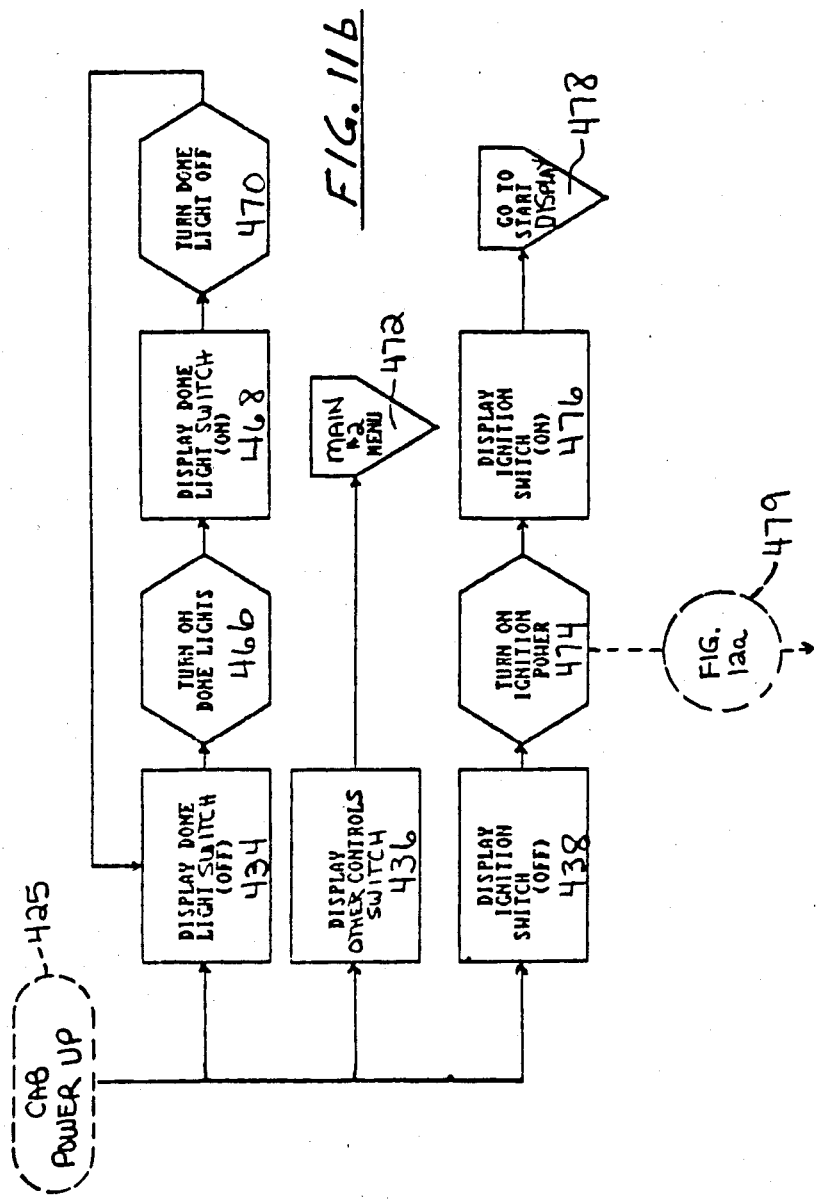

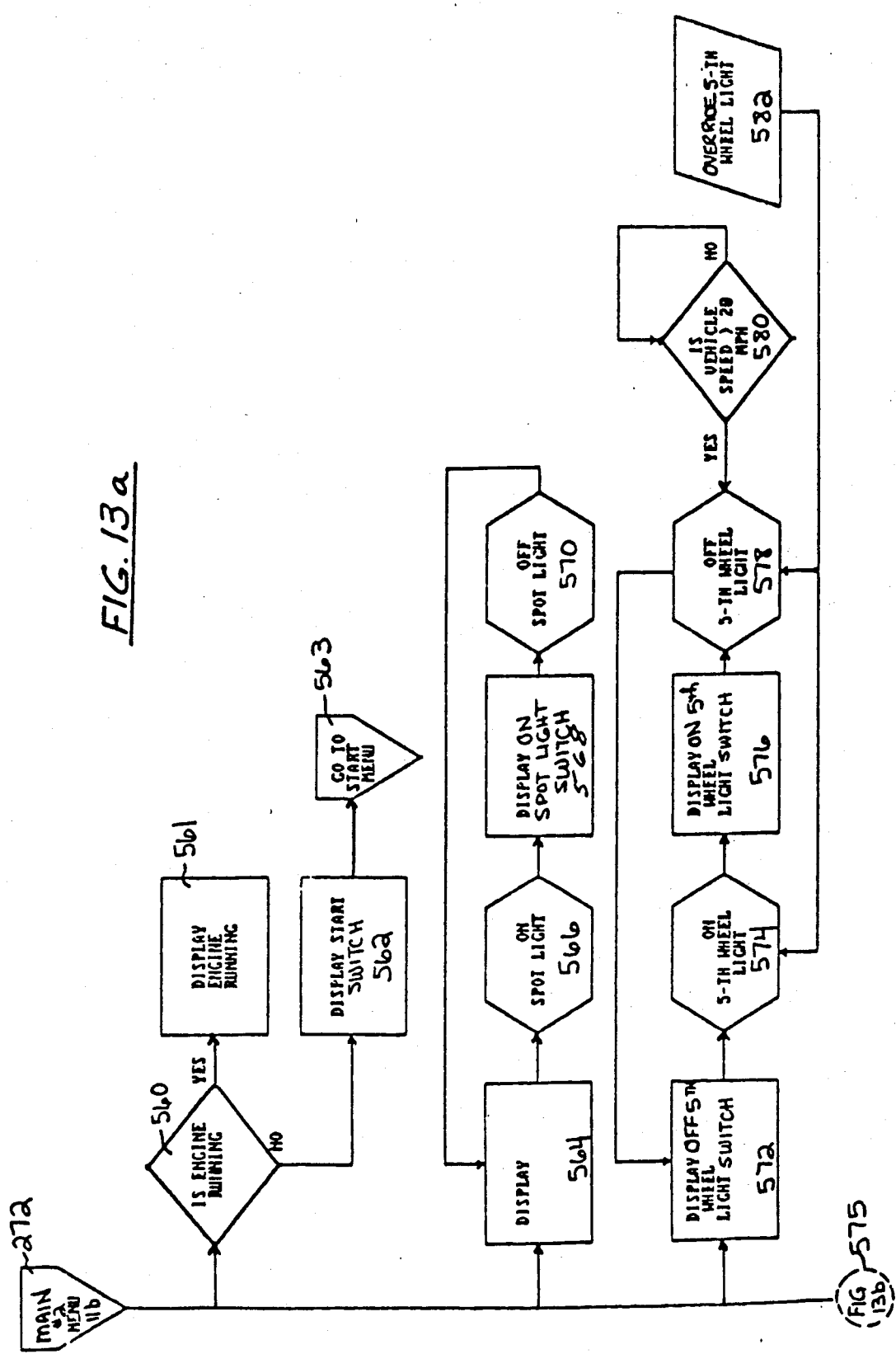

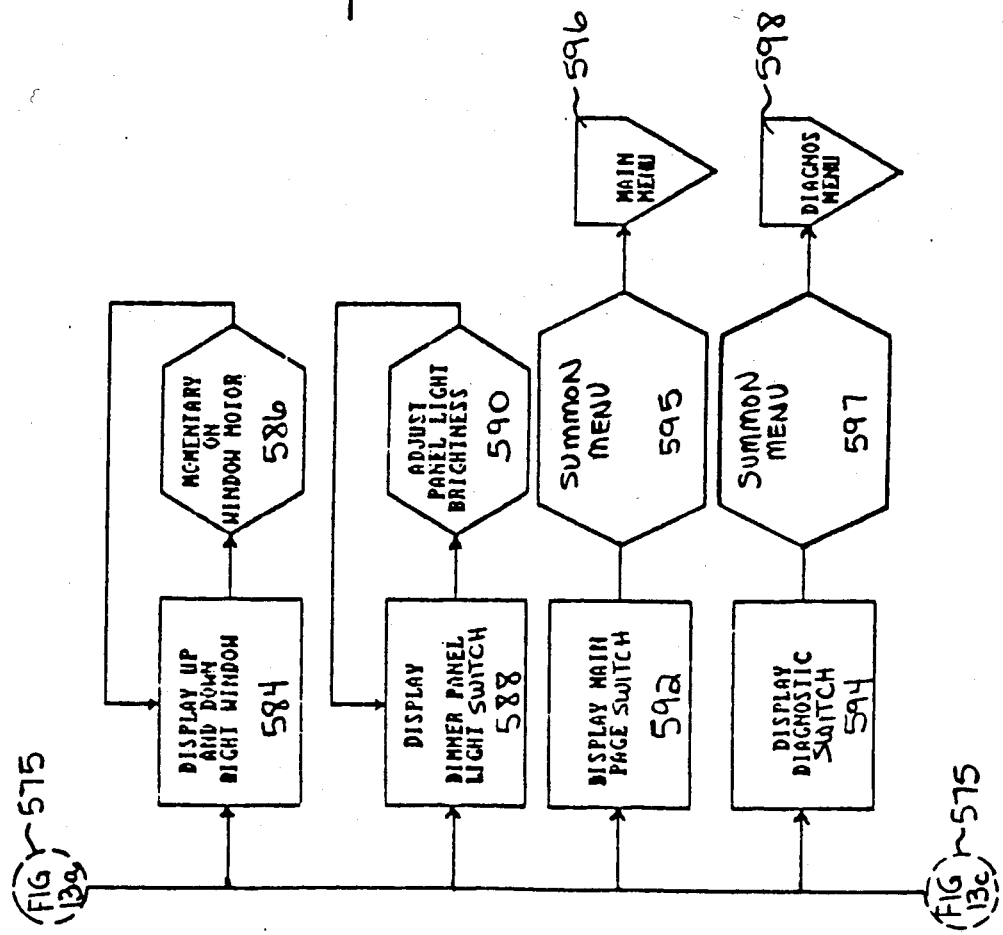

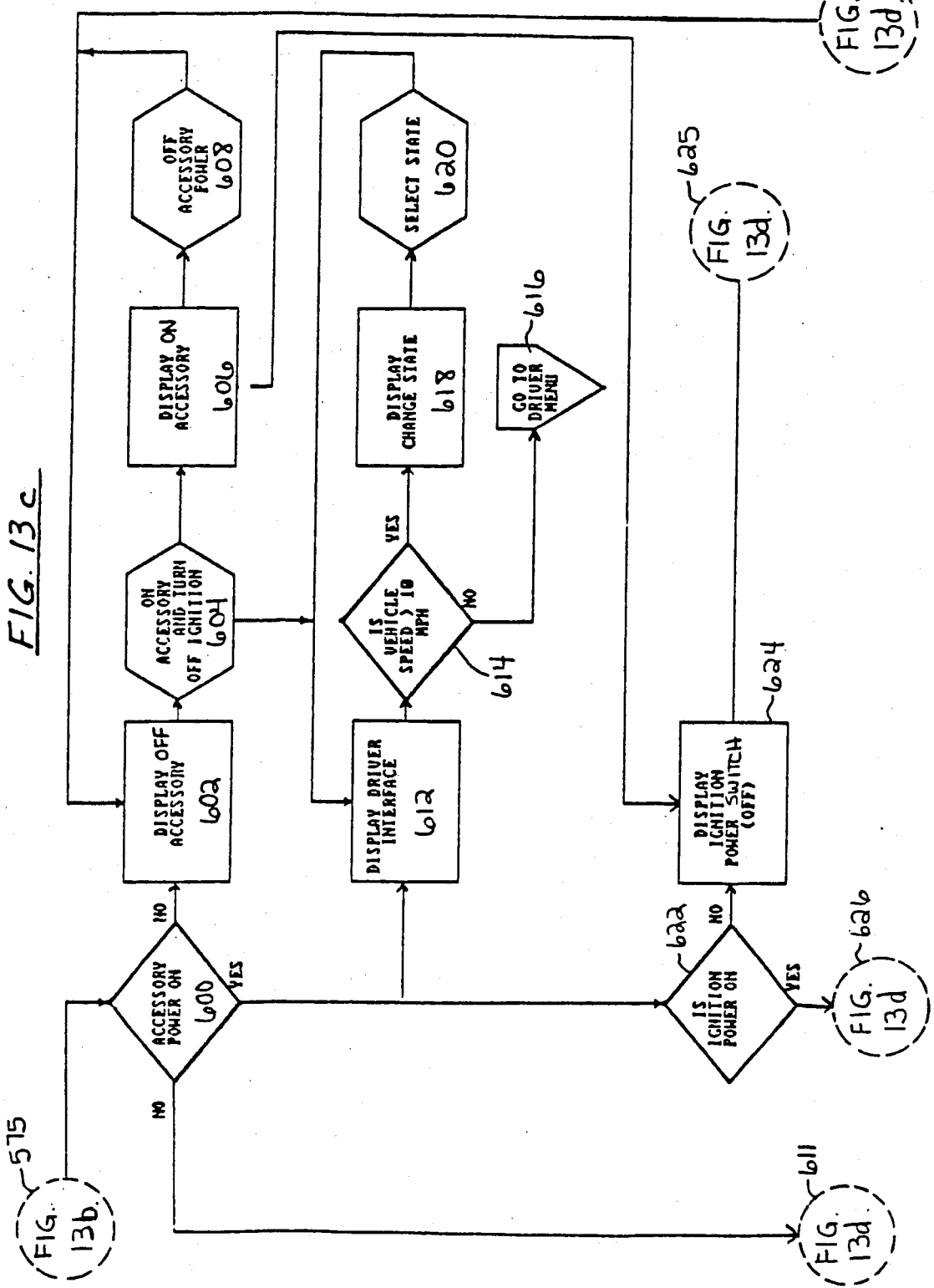

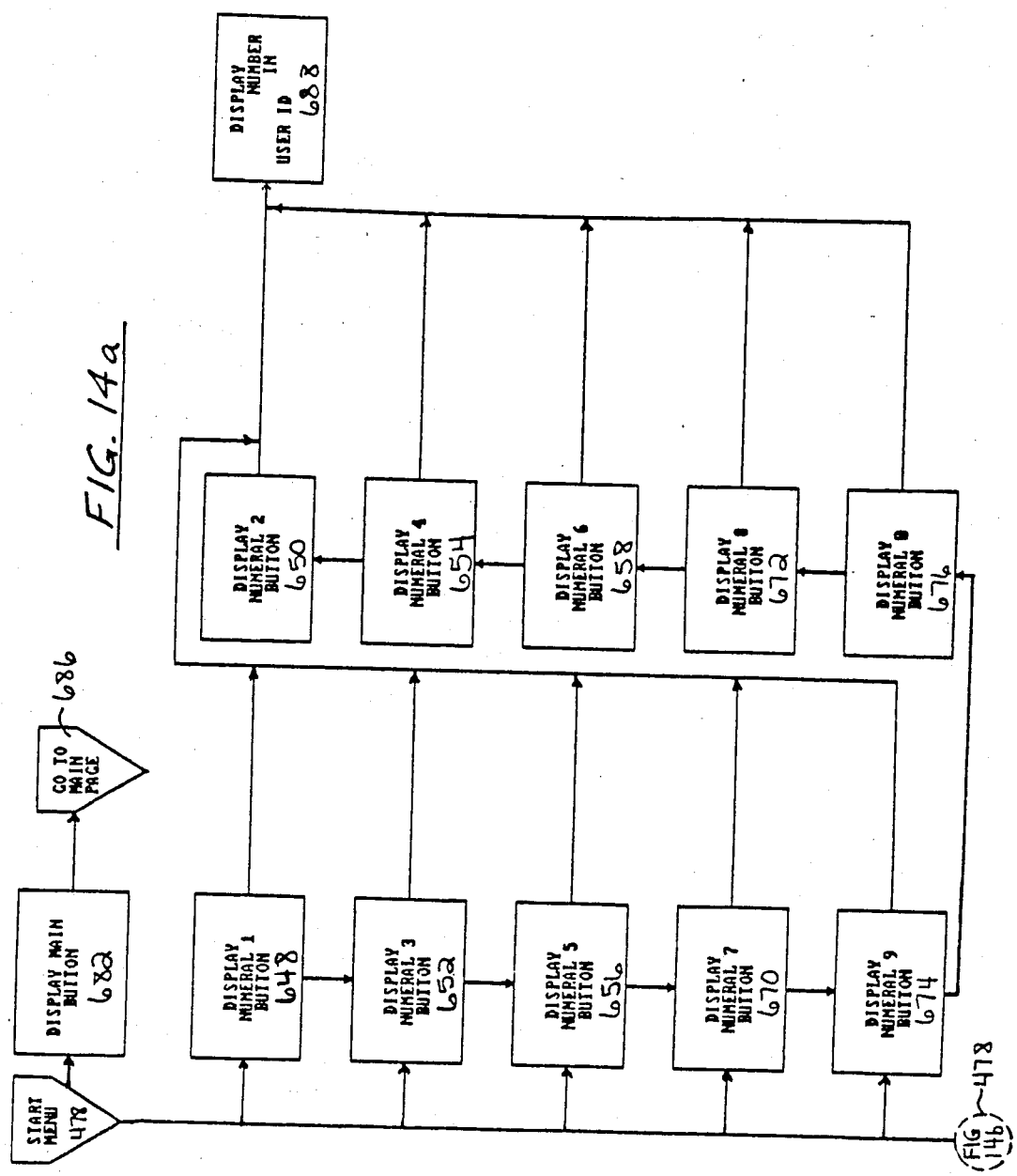

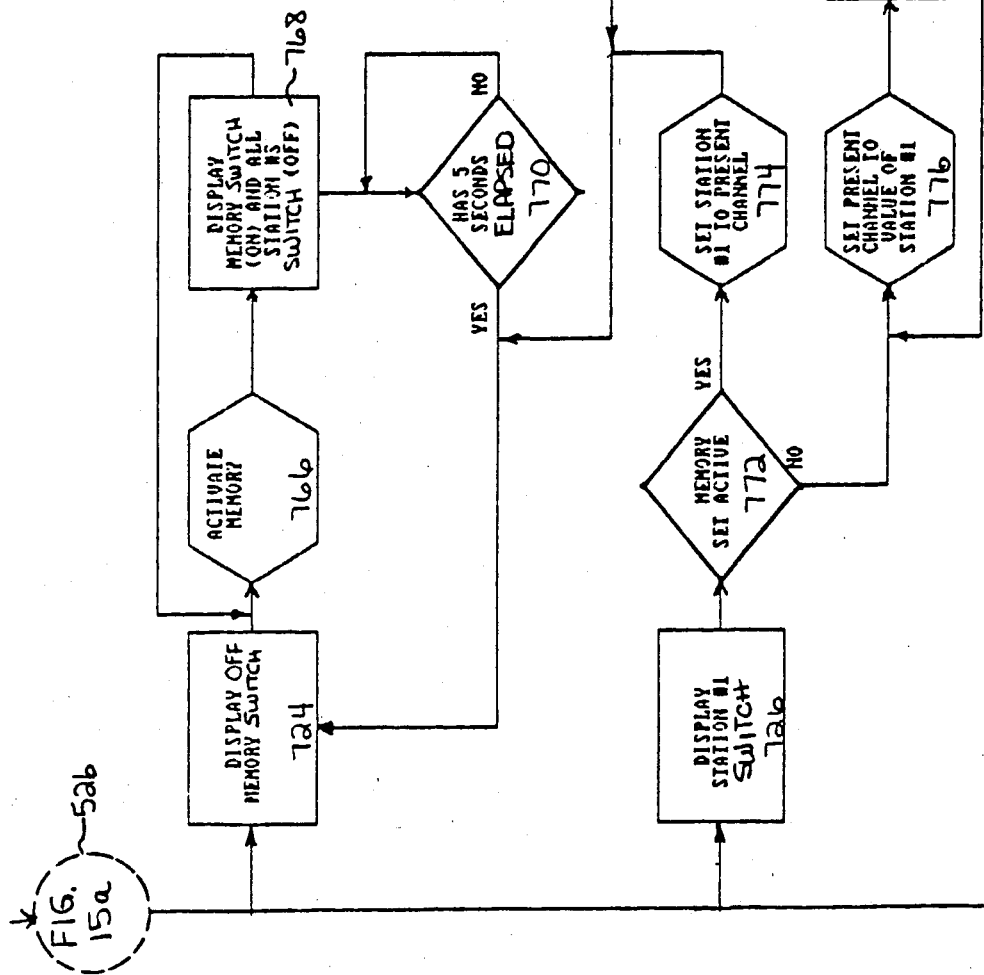

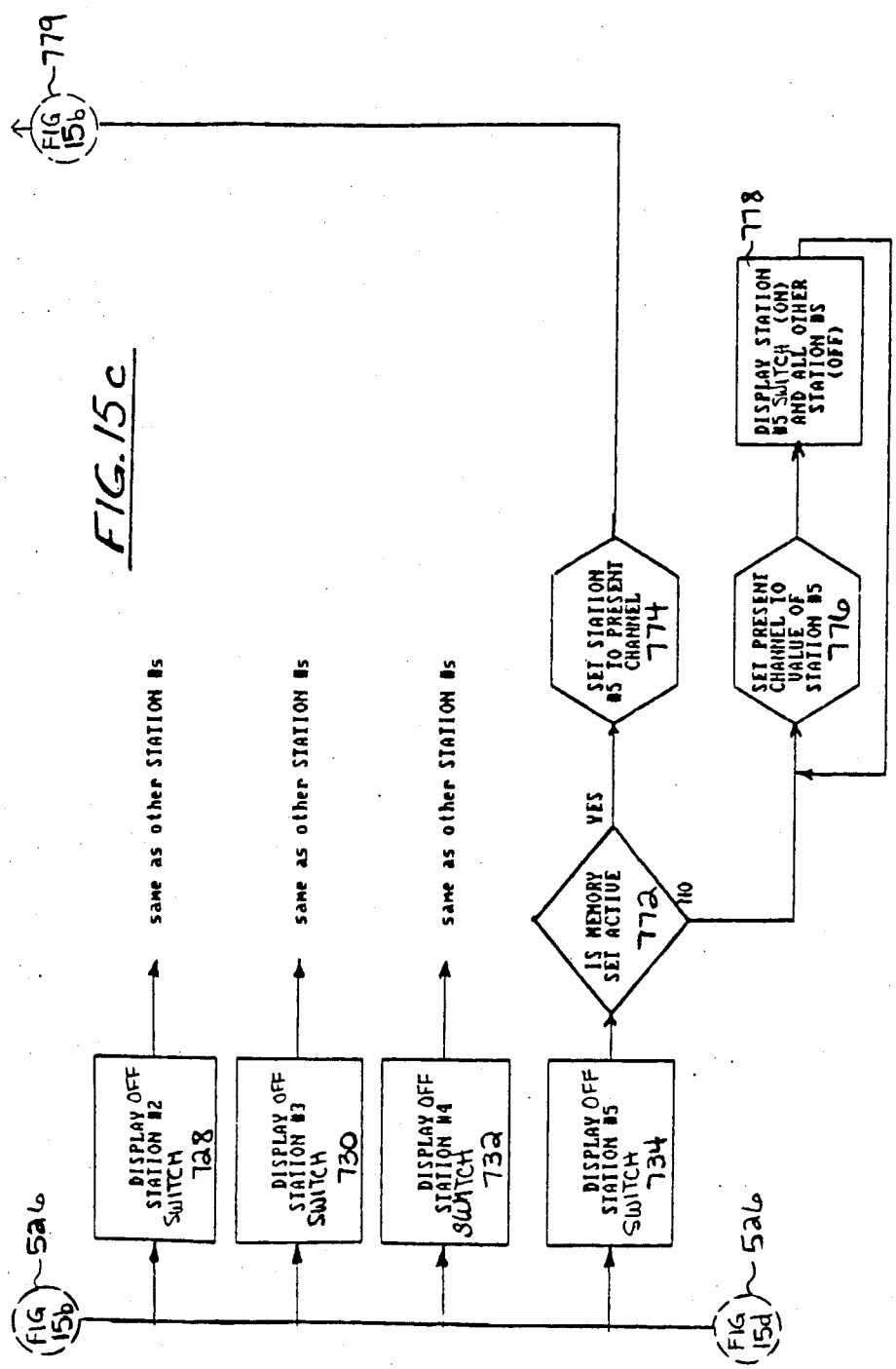

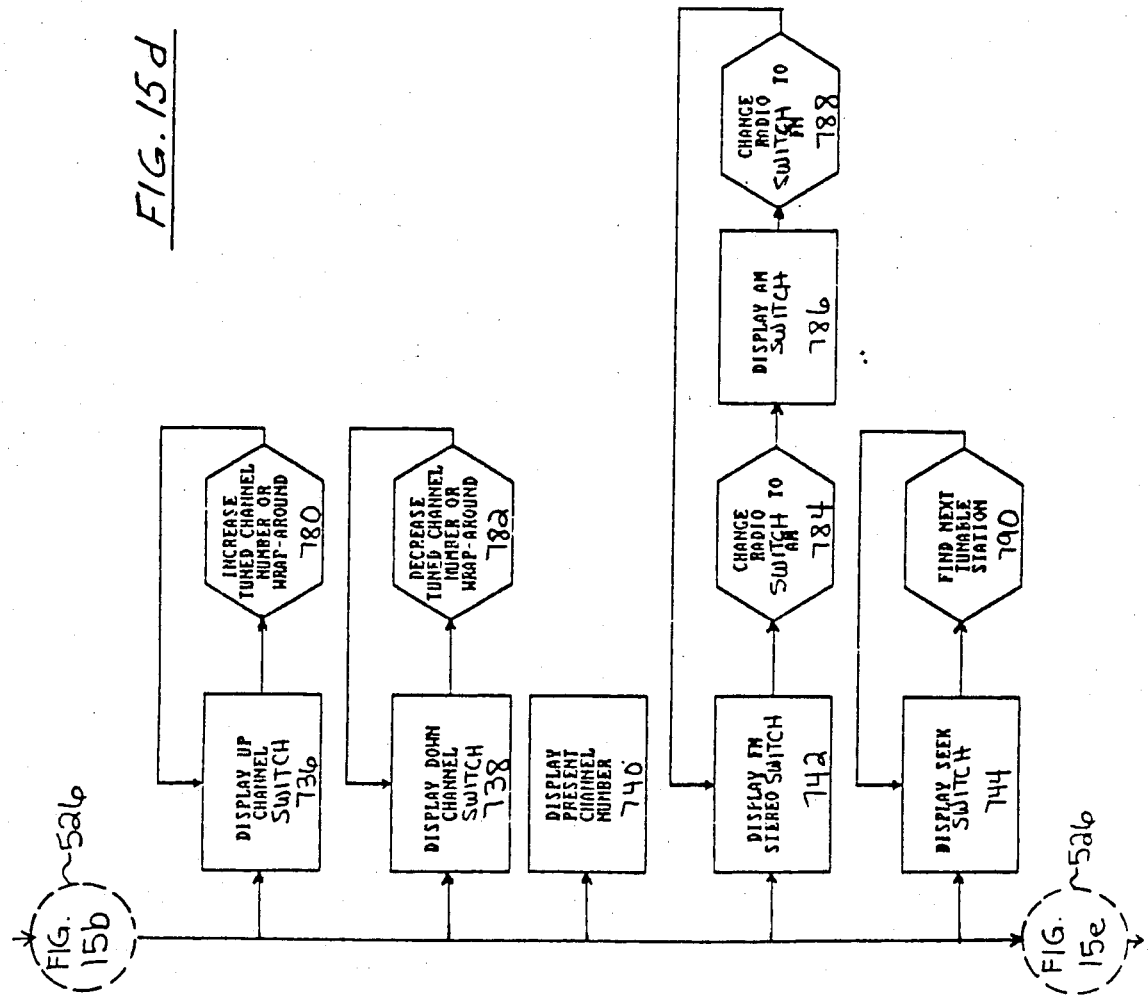

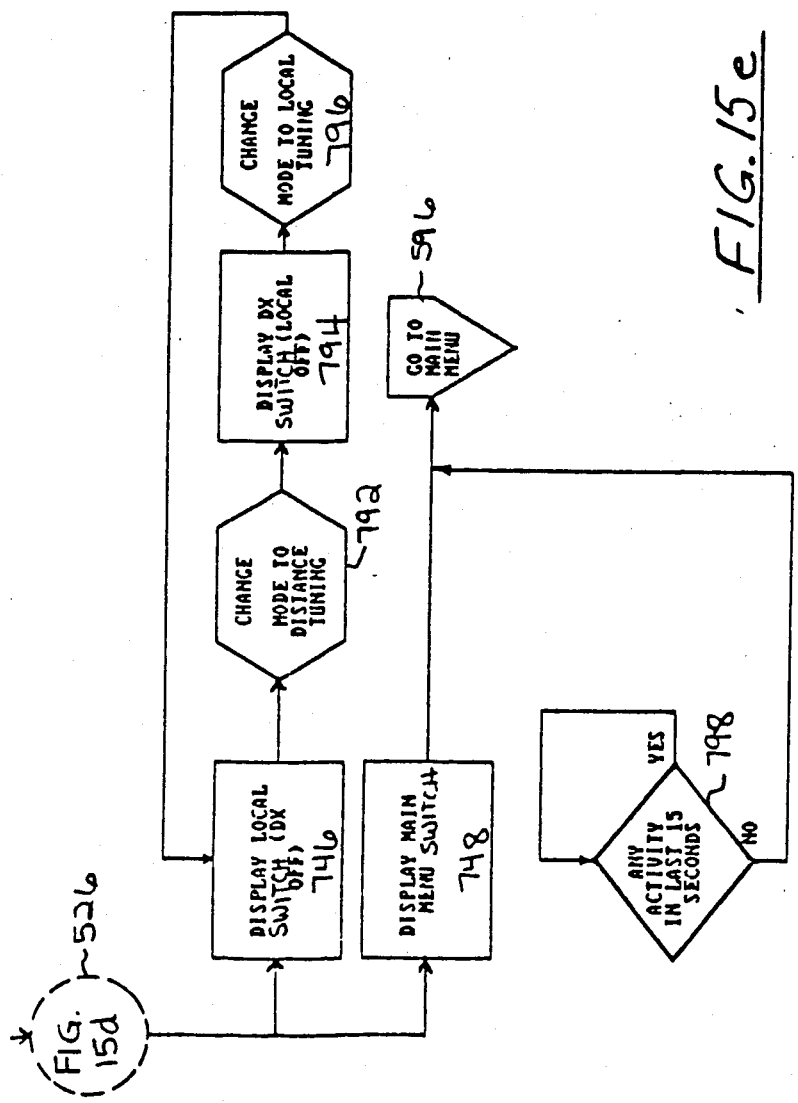

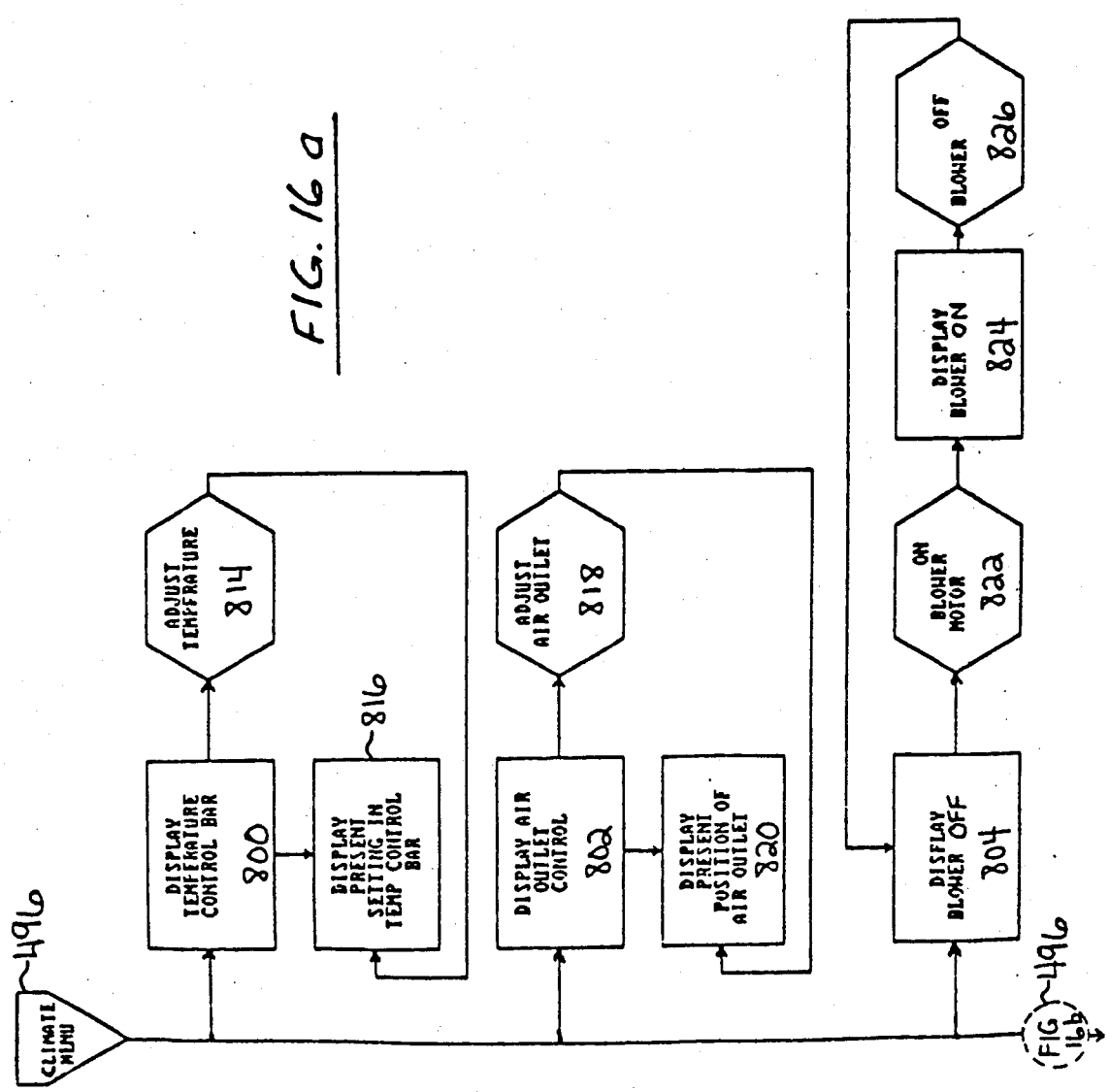

AUTOCLIMATE
PROGRAM 1100

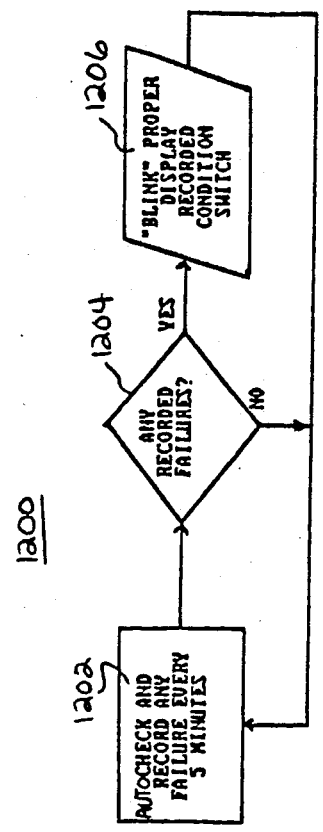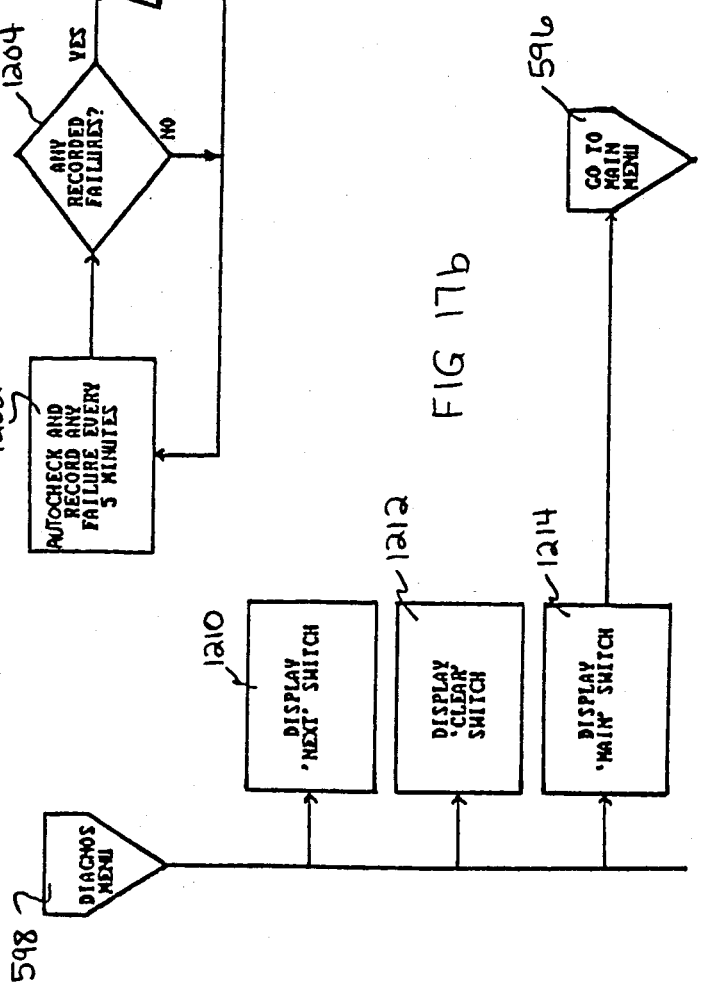

MULTIPLEXED ELECTRICAL WIRING SYSTEM FOR A TRUCK INCLUDING DRIVER INTERFACE AND POWER SWITCHING

BACKGROUND OF THE INVENTION

1. Field of the Invention

The present invention relates to ATA multiplexed communications for land vehicles and particularly relates to multiplexed communications with intelligent controls for tractor-trailers which conforms to the Society of Automotive Engineers' recommended practices for covered functions. A copy of the SAE J 1708 draft recommended practice for serial data communications between microcomputer systems in heavy duty land vehicle applications is enclosed and incorporated herein by reference.

2. Description of the Prior Art

Multiplexing to reduce the number of dedicated communication paths or links among transmitters and receivers is very old and is believed to have originated in telephone systems. More recently, as the number of accessories and functions to be performed in land vehicle applications have climbed, multiplexing has been employed in land vehicles. It is believed that the initial vehicular application occurred in military aircraft. Efforts are now being made in the automotive and truck industries to reduce the number of dedicated communication power links with improvements in the cost and reliability of such systems. See for example, the Floyd et al. U.S. Pat. No. 4,639,609 for: Load Current Management System for Automotive Vehicles.

Among the perceived benefits of such a system, are the following: elimination of 90% or more of the cab to chassis wiring circuits and their associated connections; elimination of 75% of the required cab current from that of non-multiplexed land vehicles compared to non-multiplexed land vehicles. Compared to non-multiplexed land vehicles the multiplexed systems provide a reduction of the cab feed circuit size and reduction of the voltage drop in each circuit multiplexed by eliminating about 25 feet of cable, an overall reduction of land vehicle weight; and reduced installation labor.

Multiplexing as a concept relating to land vehicle applications is somewhat amorphous. A fully distributed multiplex system is one in which each driven device such as a head lamp, a tail lamp, etc. is associated with a solid state circuit switch that actually turns the device power on and off in response to being addressed by a single central processor to accomplished their proper operation.

A more limited multiplex system has a central controller that signals various modules which in turn switch power to a driven device. With this type of system, the central controller, preferably located on one of the driven devices, organizes messages to the respective modules to accomplish the proper control of vehicular components. Multiplex systems are a needed and supportable technology used in association with microprocessors to effect vehicle operation. However, vehicle operation occurs in an environment which has been relatively hostile for previous generations of somewhat delicate integrated circuitry. The mere improvement of integrated circuit technology is not sufficient to allow ready application of the improved technology to a land vehicle.

Similarly, logic power switches recently have been developed by a number of manufacturers, some of which allow limited interrogation of the logic to power the switch. A smart switch of this variety has been developed by Motorola Company, Inc. and is provided under Motorola Model No. MPC 1500. When appropriately utilized, this switch may be employed for the gradual energization and de-energization of heavy loads which have previously contributed to the hostility of a vehicular environment to high level integrated circuitry.

When multiplexing is employed, the data link between the distributed components is of critical importance and it would be desirable to ensure the integrity of the communication processes by providing selective redundancy among a plurality of data links. Analogously, it is desirable that the data links themselves, in addition to being routed along differing paths, most preferably should operate in different modes to reduce the chance of a common failure.

Previously, about half the trucks sold in the United States were customized in some significant regard. At one time, a calculation was made that there were 40,000 differing options available for any given truck. It is now believed that the number of option combinations available are somewhat reduced from that figure. In any case, virtually any option change required a hardware change. As a result, it was virtually impossible for a factory to adequately and efficiently test every combination of options. With the proper employment of microprocessor based controls, all changes and varieties may be entered into the microprocessor memory and the testing can be made rapidly and effectively. The appropriate diagnostic menus and the rapid and efficient testing of these options is anticipated to be a considerable economy while significantly enhancing the quality of the product when this approach is taken. Also, stocking in the factory and at the distribution and maintenance levels is significantly reduced.

A number of developments in isolation have been made which are relevant to the present invention of a land vehicle electrical system. Among these developments are microprocessor based engine controls including some diagnostic abilities in automobiles and in trucks. For example, Cummins Engine provides such a diagnostic system under the name of Compucheck. Likewise, Detroit Diesel Allison provides what is called a DDE DDL reader.

As will be described in greater detail hereinafter, the system of the present invention is regarded as multiplexed and employs two major (substantially identical) controller units communicating with each other. Each unit in its respective control area, operates its respective driven devices directly.

By utilizing the system of the present invention, elimination of high current cab switches and other control, panel, and mechanical switches is achieved. Further, the system is compatible with ATA/SE serial data link standards, is compatible with truck operation monitoring systems, increases usable area on the instrument panel for other gauges, modules, etc. and provides on board dianostics with fault isolation.

SUMMARY OF THE INVENTION

According to the invention there is provided an electrical system controller for a land vehicle comprising: a controller microprocessor operatively connnected to other controller elements; a controller memory operatively connected to said controller microprocessor;

controller sensor input means operatively connected to said controller microprocessor; a plurality of controller device drivers, each of which has an on state and an off state operatively connected to said controller microprocessor for receiving logic level signals from said controller microprocessor and altering the device driver state between on and off in response to the logic level signals; controller input means operatively connected to said controller microprocessor; analog sensor means connected to said controller sensor input means for providing analog information concerning a sensed quantity; digital sensor means connected to said controller sensor input means for providing a state status signal conveying the occurrence of a sensed state; a plurality of driven devices connected to at least one of said controller device drivers; and display means operationally connected to said controller microprocessor for providing information concerning the operation of the land vehicle and land vehicle components.

Further according to the invention, there is provided a land vehicle electrical system including a battery, battery charging means for energizing the battery, controller means which may assume a number of controller states for regulating the flow of electricity to driven devices, sensor means for monitoring various parameters of operation of the land vehicle and land vehicle components, input means for affecting the controller state and for regulating the flow of electricity to driven devices, and display means for providing information concerning the operation of the land vehicle and land vehicle components, said controller means including a cab controller, a chassis controller and controller memory distributed between said cab controller and said chassis controller, said cab controller including a cab memory, a cab microprocessor to which cab functions are assigned, cab sensor input means for sensing signals from said sensor means, cab output means for affecting driven devices in accordance with the cab controller state, and cab communication means for receiving and transmitting digital signals, said chassis controller including a chassis memory, a chassis microprocessor to which cab functions are assigned, chassis sensor input means for sensing signals from said sensor means, chassis output means for affecting driven devices in accordance with the chassis controller state, and chassis communication means for receiving and transmitting digital signals, said chassis controller having substantially identical components as said cab controller; a controller bus coupled between said respective communication means of said cab controller and said chassis controller for exchanging digital data among said system components, said sensor means selectively including analog, switched digital sensors selectively coupled to the respective sensor input means of said cab controller and said chassis controller, said driven devices being operatively connected to the output means of said cab controller, said output means of said chassis controller, and to said input means of said controller means.

BRIEF DESCRIPTION OF THE DRAWINGS

FIG. 1 is a perspective view of a truck, tractor and cab in which the electrical system of the present invention is installed.

FIG. 2 is a perspective fragmentary view of the dashboard panels in the cab and shows a display and information input panel.

FIG. 9a is a plan view of a Diagnostic Menu generated by the system and displayed on the visual display and information input unit.

FIG. 10a is flow chart of a cab controller power up sequence routine.

FIG. 10b is a flow chart of a chassis controller power up sequence routine.

FIG. 10e is a partial schematic of the cab controller of FIG. 3b.

FIG. 11a through FIG. 12c are a flow chart of sequence routines associated with the Main #1 Menu.

FIG. 13a through 13d are a flow chart of sequence routines associated with the Main #2 Menu.

FIG. 14a through 14b are a flow chart of sequence routines associated with the Start Menu.

FIG. 15a through 15e are a flow chart of sequence routines associated with the Radio Menu.

FIG. 16a through 16e are a flow chart of sequence routines associated with the Climate Control Menu.

FIG. 17a through 17d are a flow chart of sequence routines associated with the Diagnostic Menu.

DESCRIPTION OF THE PREFERRED EMBODIMENTS

Figure 3A:
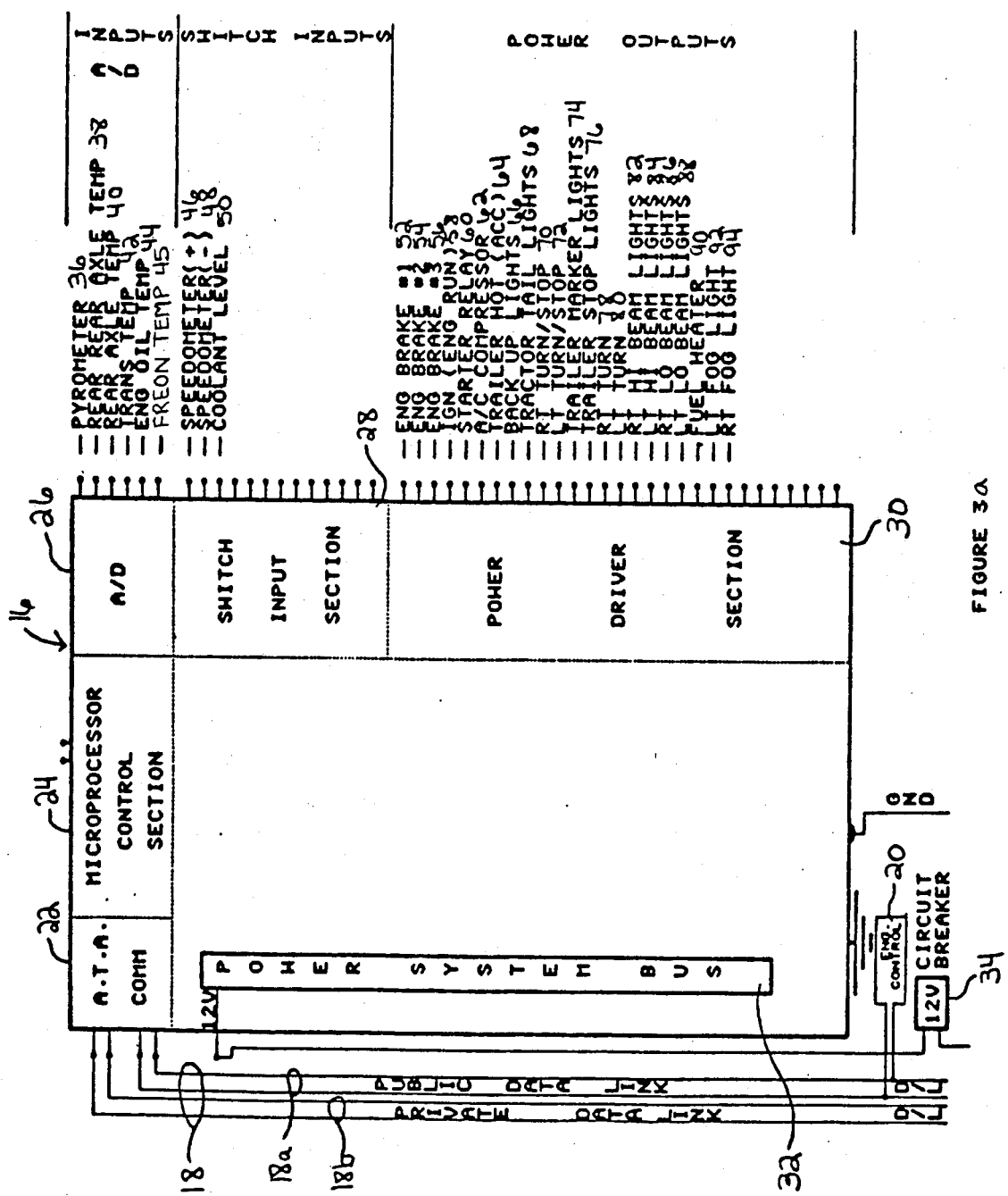
FIG. 3a is a block diagram or layout of a chassis controller of the system.

FIG. 1 is a perspective view of the electrical system 10 of the present invention installed in a cab 11. The system 10 includes an integrated display and information unit 12 having a visual display 13 (FIG. 2), a cab controller 14 and a chassis controller 16, all coupled together by a six-wire harness 18 which includes public and private data links with power and ground conductors.

The visual display 13 (FIG. 2) is of an electroluminescent type having a high brightness level of approximately 120 foot lamberts or of a type made by other comparable technology so as to be readily usable under all anticipated levels of light. The input aspect of the display and information unit 12 is achieved preferably with a resistive touch screen display controller shown on the visual display 13 of FIG. 2. A manufacturer of this type of device is Computing Devices Co. of O'-Hara, Canada. Lower levels of luminesce could provide adequate contrasts under some conditions and infrared grids or other means could be employed as an alternative to the resistive touch input means. Other displays could be employed which will provide adequate brightness such as a fluorescent display. The preferred means of input to the controllers 14 and 16 is through the display and information unit 12, although conventional mechanical switch inputs can be used.

The cab controller 14 and the chassis controller 16 comprise identical hardware, and each is preferably realized by an identical, central processing unit to which are coupled associated devices. The functions of each controller 14, 16 are, however, greatly different. Their functions requirements are achieved by firmware and user inputs. Substantial economies in manufacturing and inventory result from using identical controllers 14 and 16. It is likewise anticipated that the reliability of the system will be increased. In addition to interfacing with driven devices such as headlights, the system 10 is interfaced with an engine controller 20 and is fully compatible with a truck operation monitoring system 21 of the type disclosed in U.S. application Ser. No. 833,298 filed Feb. 25, 1986 and owned by the assignee of the present invention.

FIG. 3a is a block layout or diagram of the chassis controller 16. As shown, the controller 16 includes an ATA communications section 22, a microprocessor control section 24, an analog-to-digital conversion section 26, a switch input section 28, a power driver section 30, a power system bus 32, and a portion of the six wire harness 18. A twelve volt circuit breaker 34 for providing protected power to power system bus 32 is also indicated, as are a variety of the inputs to the chassis controller 16.

Among the analog input signals provided to the analog-to-digital converter 26 are the following: pyrometer 36, rear axle temperature 38, rear axle temperature 40, transmission temperature 42, engine oil temperature 44 and freon temperature 45. Each of these inputs is provided by a conventional analog device which avoids the expense of so-called "smart sensors".

The switch input section 28 receives a number of switch inputs including speedometer plus 46, speedometer minus 48, and coolant level 50. This input section 28 is resistive or voltage and current operated and is adapted to receive signals which are either digital or sinusoidal.

Figure 4:
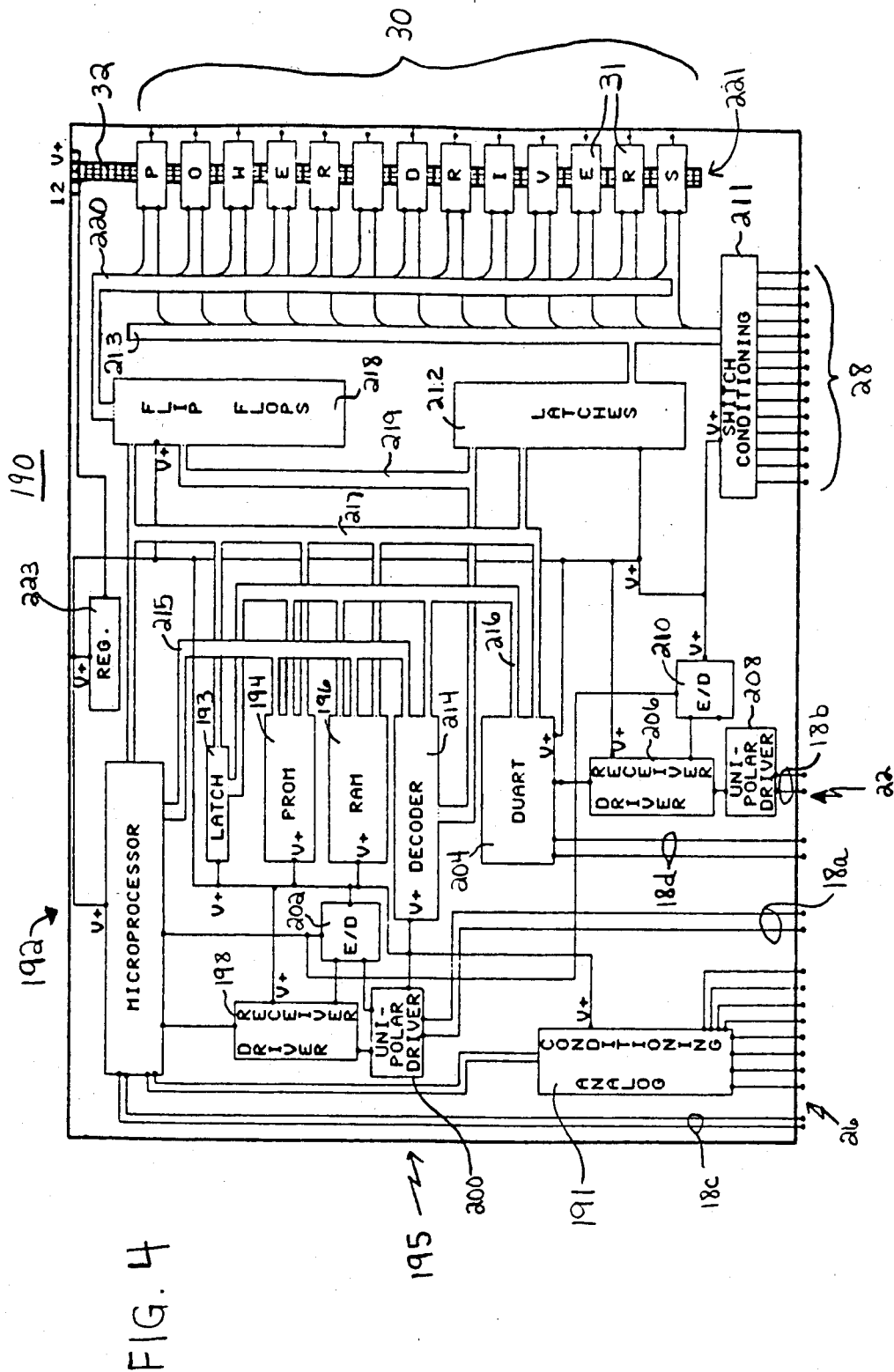
FIG. 4 is a block schematic diagram of the integrated circuit card for both the cab controller and the chassis controller.

Power driven section 30 as its name implies, provides power to a number of switched devices by means of logic to power driven switches 31 (FIG. 4). The driven devices include engine brake #1, 52, engine brake #2, 54, engine brake #3, 56, ignition (engine run) 58, starter relay 60, air conditioning compressor 62, trailer hot (acc.) 64, back-up lights 66, tractor tail lights 68, right turn/stop 70, left turn/stop 72, trailer marker lights 74, trailer stop lights 76, right turn 78, left turn 80, right high beam lights 82, left high beam lights 84, right low beam lights 86, left low beam lights 88, fuel heater 90, left fog light 92, and right fog light 94, as well as other driven devices.

The logic to power driven switches 31 are, as their name employs, preferably driven directly by logic level signals of, for example, about 5 volts, to switch power loads of considerably greater voltage, for example, about 15 volts. Additionally, switches 31 are preferably smart switches which when properly interrogated give some indication of whether they are functioning normally, and if they are not, an indication as to their mode of failure. An example of such a switch is provided by Motorola, Inc. under their Model No. MPC 1500 and as described in Motorola Publication No. ADI 1174 published and copyrighted in 1985. This device is a terminal device having terminals labeled GROUND, INPUT, BATTERY, NC (fault) and LOAD. As described by Motorola, the MPC 1500 logic to power switch series designated to take a CMOS input signal referenced to ground and translate it to drive an N-channel TMOS power FET connected between the supply voltage and a grounded load. An N-Channel device was selected as the power FET because the epi is the same as that required for the CMOS and the on resistance is less than half of that of a P-Channel for a given breakdown voltage and die size.

To minimize the on-voltage across the power FET, the gate voltage must be about 15 volts above the source, which, when the N-Channel FET is on, requires the gate voltage to be above the supply voltage. The use of a medium frequency or chip oscillator and voltage doubling circuitry allows this to occur. The frequency chosen and the size of the CMOS drivers used controls the charge rate and the switching time of the power FET. Additional circuitry is necessary with this high gate voltage when current limit protection is required. If the load is shorted when the power FET is on, the source will be pulled to ground which increases the gate source voltage and attempts to turn the FET on harder. Thus, a fast overload detector and gate discharge network is needed to quickly decrease the gate voltage and limit peak currents to safe values.

A feature that can be included with an on-board oscillator is the ability to limit power dissipation during an over-current situation. A divide down network is used to provide a repetitive pulse to the load with a 25% duty cycle. This minimizes the power loss in the FET and delivers adequate energy to start the load. After the over-current condition is removed, the integrated chip automatically returns to a full onstate and the duty cycling ceases. The current sense scheme that is used on these high current integrated circuits does not use sense resistors in the high current path. Rather, separate sense cells from the FET source are used to mirror the magnitude of the current in the load. This is another circuit techique that is used to minimize power losses in the integrated circuit, so crucial in high current application. An inductive protection circuit also is included that will turn the FET on when the load potential goes below ground, clamping it to about −7 volts.

When one of the internal protection circuits of over-temperature or over-current has been activated, a network is turned on to give a fault indication. An open load is detected when the switch is turned off, tripping a latch which then activates the fault line during the next on-cycle.

The interrogation feature of this type of a smart switch is employed in conjunction with diagnostic testing and recording of faults as is discussed in detail below.

Additionally, by the use of oscillators it is possible to nearly infinitely vary the speed of most motors between very slow revolutions and nearly fully speed by varying the duty cycle of a pulsed direct current source. This feature economically achieves very fine control over the speed of a motor without the use of additional components.

ATA communication section 22 is, of course, both an input and output for providing a serial data link to the engine controller 20, monitoring system 21 and cab controller 14. Two serial communication links are provided by the six wire harness 18, a public data link 18a which is in conformity with the aforementioned ATA/SAE Specification No. J1708, and a private serial communication link 18b between the controllers 14 and 16 for providing an additional link and a selectively redundant data link.

Figure 3B:
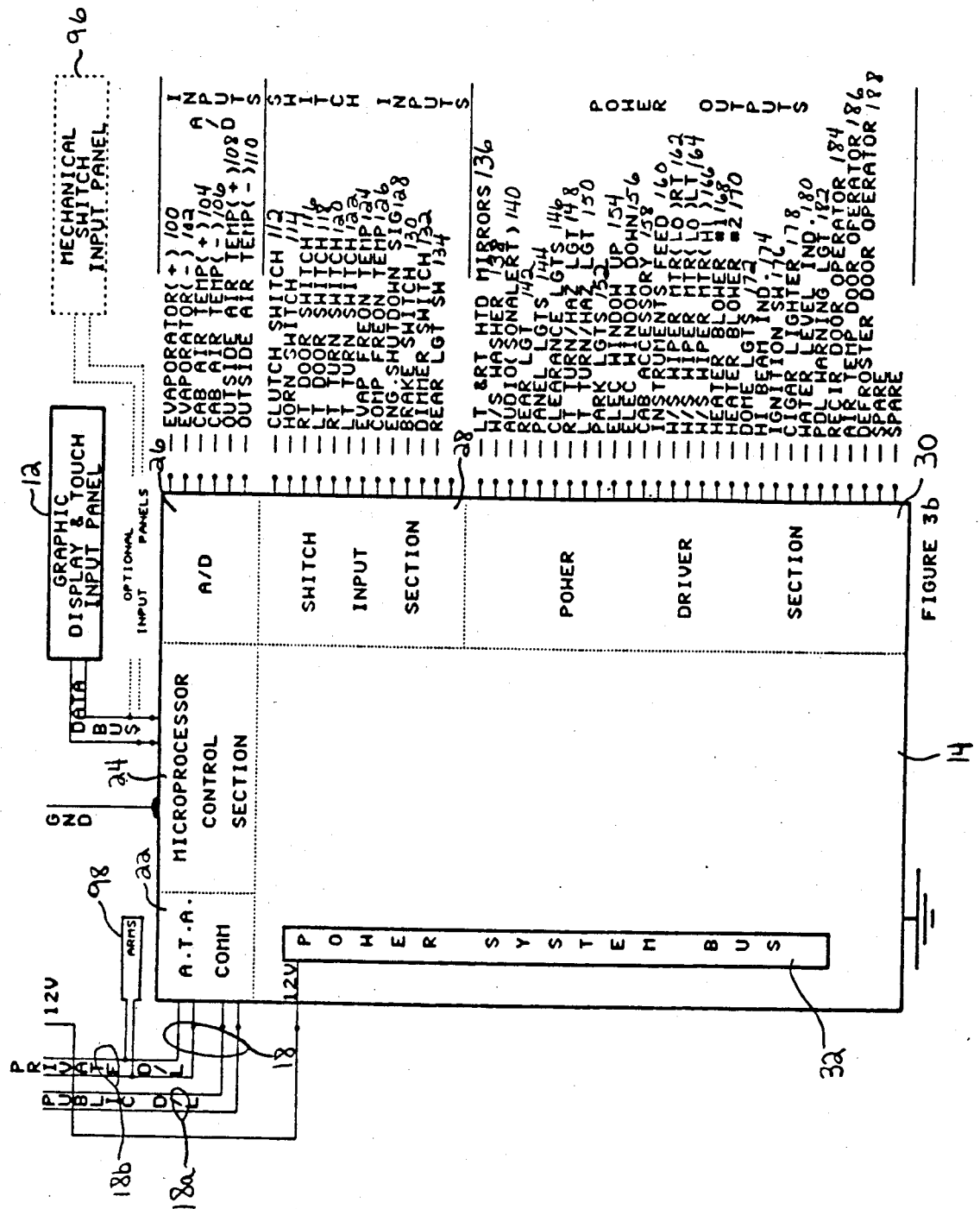
FIG. 3b is a block diagram or layout of a cab controller and a visual display and information input unit of the system.

FIG. 3b is a block layout or diagram of the cab controller 14 and display information unit 12 including an optional mechanical switch input panel 96 and the private data link 18b.

The hardware of the cab controller 14 is preferably identical to the hardware of the chassis controller 16 and identical portions of the circuit of each controller 14 and 16 is identified with the same reference numeral. The dedicated inputs and outputs for each controller 14 and 16 (as opposed to data links) differ in each controller and are selected primarily on the basis of shortening dedicated wire runs.

The analog-to-digital converter 26 receives input from the following analog sensors: evaporator plus 100, evaporator minus 102, cab air temperature plus 104, cab air temperature minus 106, outside air temperature plus 108, and outside air temperature minus 110. As required, other analog sensors may furnish their signals to the converter 26.

The switch input section 28 receives inputs from a clutch switch 112, a horn switch 114, a right door switch 116, a left door switch 118, a right turn switch 120, a left turn switch 122, an evaporator freon temperature sensor 124, a compressor freon temperature sensor 126, an engine shut down signal 128, a brake switch 130, a dimmer switch 132, and a rear light switch 134. Of course, switch input section 28 may read additional or other switch signals.

The driven devices which are provided power by the power driver section 30, include: left and right hand heated mirrors 136, windshield washer 138, audio (sound) alert 140, rear light 142, panel lights 144, clearance lights 146, right turn/hazard lights 148, left turn/hazard lights 150, parking lights 152, electric window up 154, electric window down 156, cab accessories 158, instrument feed 160, windshield wiper motor low right 162, windshield wiper motor low left 164, windshield wiper motor high 166, heater blower #1, 168, heater blower #2, 170, dome lights 172, high beam indicator 174, ignition switch 176, cigar lighter 178, water level indicator 180, PDL warning light 182, recirculating door operator 184, air temperature door operator 186, and defroster door operator 188. Other or additional driven devices may also be employed as desired.

FIG. 4 is a block circuit diagram of the circuit components employed in each controller 14 and 16 and is identified by reference numeral 190.

Because of the multi-functioning aspects of some of the circuit elements in each controller 14 and 16 and the distributed functions among several of the circuit elements, a total correspondence between the circuit elements of controller 14 in FIG. 3a and of controller 16 in FIG. 3b cannot be made, as is well understood in the art. For example, analog to digital converter 26 is a shared function between analog conditioning circuit 191 and microprocessor 192 which conditions the analog signal and perform the traditional analog-to-digital conversion, respectively. Microprocessor control section 24 includes latch circirtry 193, a programmable read only memory 194 (PROM) and active random access memory (RAM) 196. The PROM may be of any type to include those readily alterable without removal from the circuit 190, such as an EEPROM with associated reading and writing circuitry. The firmware and installed software, which distinguishes the circuit 190 in cab controller 14 from that circuit 190 in chassis controller 16 resides in PROM 194. Given the nature of PROM 194, one controller may be adapted to the other controller. Particularly, when the PROM is of the type which requries disconnection from the circuit 190 for programming, or removal of the circuit 190 from system 10, it is desirable that the PROM be of the type which is easily plugged into the circuit 190.

ATA communication section 22 is a widely distributed function indicated as 195 in FIG. 4. Driver receiver 198 and unipolar driver 200 feed and receive communications over public data link 18a. Error detector 202 reduces transmission errors over this public data link 18a.

Similarly, dual universal asynchronous receiver transmitter 204, driver receiver 206, unipolar driver 208, and error detector 210 are associated with private data link 18b. It should be noted that two other communication links are potentially associated with the circuit 190. Communication link 18c provides a link to a radio and communication link 18d provides a communication path to the display and information unit 12.

Many of the inputs to switch input section 28 require little or no action by the central processing unit of the microprocessor control section 24 before a desired result is attained. These inputs are provided to switch conditioning circuitry 211 which provides contact debouncing, and to latches 212 (via input status lines 213).

Decoder 21, in a manner well known in the art, logically decodes high address bus 215 and low address bus 216 and then selects the required component via bus 219. Data bus 217 exchanges serial (or sequential) data among microprocessor 192, flip flops 218, and latches 212 to include switch conditioning circuitry 211. Flip flops 218 buffers the data communicated on data bus 217 to parallel output data supplied to output status lines 220. This parallel output data selectively actives logic-to-power devices 221 in power driver section 30 to selectively activate the individual driven devices.

A regulator 223 insures an appropriate power supply to the multitude of low voltage devices in the circuit 190.

In FIGS. 5 through 9a there are illustrated six of the potential menus which are employed in system 10 and which are shown in display 13 of the display and information unit 12. The menu approach to displaying system status is particularly apt when employed with the combined display and information unit 12. Resistive or infrared type input switches are utilized in display and information unit 12. An operator merely has to touch a screen area to obtain further information concerning the status of a component of the system, or to effect a change in state of a component of the system 10.

Figure 5:
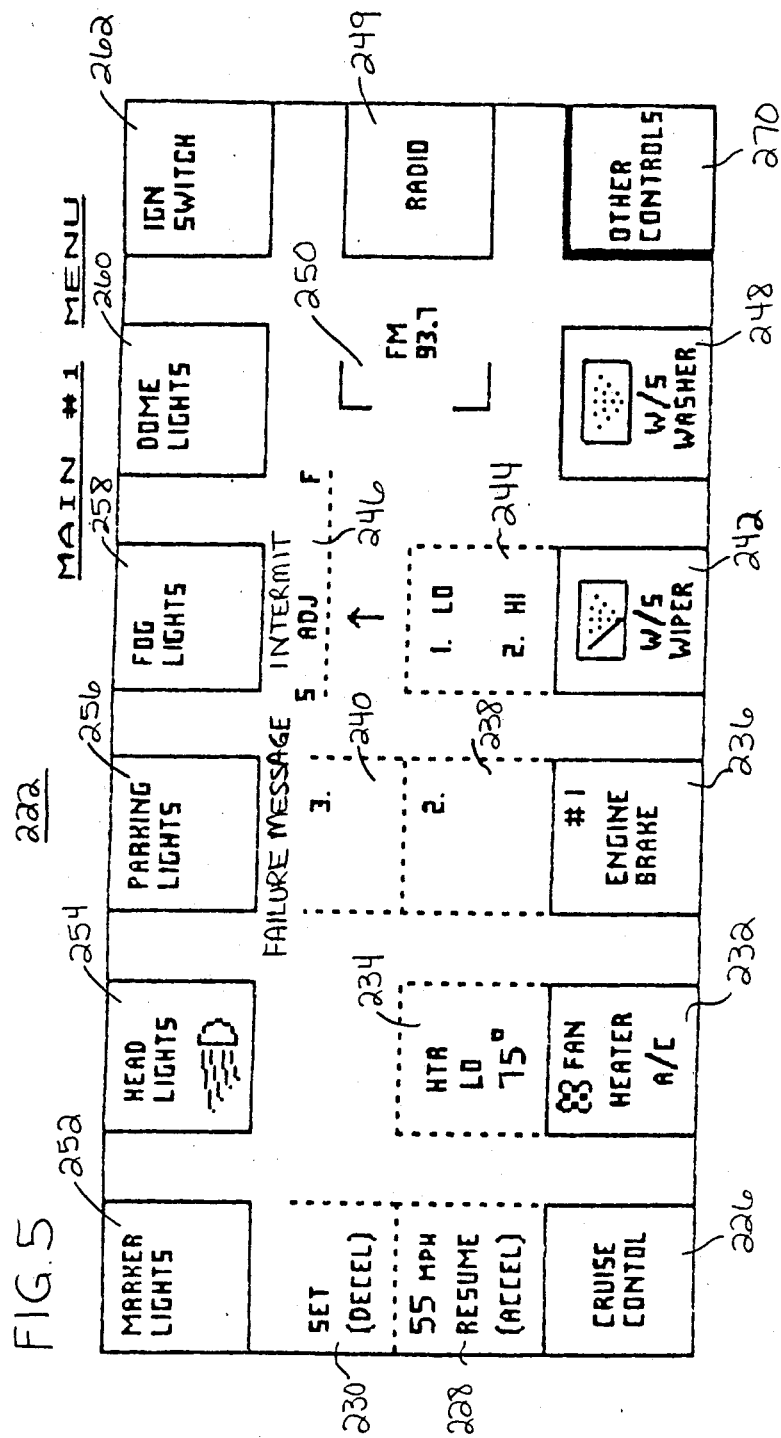
FIG. 5 is a plan view of a Main #1 Menu generated by the system and displayed on the visual display and information input unit.

In FIG. 5 is shown Main #1 Menu 222. Main #1 Menu 222, as its name implies, is the default status for the display and information unit 12. If another menu is displayed for approximately 15 seconds without any switch action or adjustment to the display menu, the display and information unit 12 will automatically default to Main #1 Menu 222. From a vehicle that is off (without engine activation or system operation), Main

1 Menu 222 comes up upon activation of the engine or of the system 120.

Each of the switch functions indicated will operate directly from the display and input unit 12 without activation of either the ignition switch or the accessory switch excepting the following functions: cruise control 226 with its associated set speed of 55 miles an hour, for example, resume or alternate acceleration function switch 228, and its associated set or deceleration function switch 230.

Similarly, fan heater and air conditioner control or heater/air conditioner function switch 232 will be nonfunctional as will be its associated heater low degree indicator function switch 234. Engine brake #1 236 with associated engine brake #2 238, and associated engine brake #3 240 are grouped with the other devices which are nonfunctional in the lower portion of the display.

Windshield wiper 242, with its associated speed function switch 244, and pause interval 246 also requires a switch activation for functionality, as does windshield washer 248.

Likewise, radio function switch 249 with its associated station indicator 250 requires switch activation.

Marker lights 252, headlights 254, parking lights 256, fog lights 258, dome lights 260, and ignition switch 262 need no switch activation to be responsive to a driver input.

Figure 6:
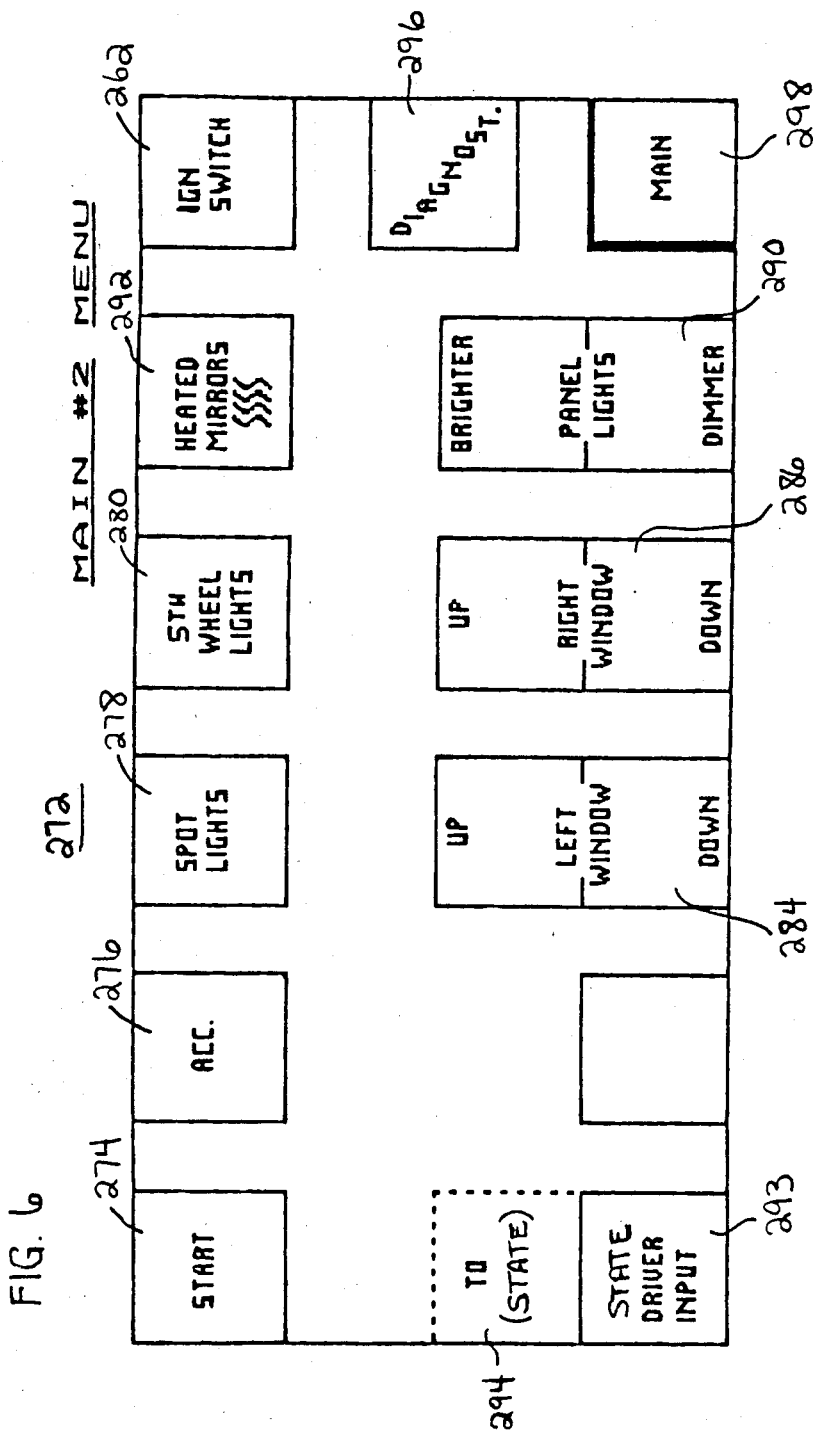
FIG. 6 is a plan view of a Main #2 Menu generated by the system and displayed on the visual display and information input unit.

A Main #2 Menu 272 is shown in FIG. 6 and includes start function switch 274, accessory function switch 276, spot light function switch 278, fifth wheel light function switch 280, ignition switch 262, left window up/down function switch 284, right window up/down function switch 290, heated mirror function switch 292 and driver input 293 with associated next state input 294 require the activation of the accessory switch or the ignition switch before accepting the driver input.

A diagnostic function switch 296 is of considerable practical importance in the operation of system 10. The diagnostic function switch 296 tends to be somewhat land vehicle specific, although many diagnostic functions common to all controllers are present.

Touching the main switch input 298 returns the display and information unit 12 to Main #1 Menu 222.

The specific routines associated with the process of displaying information regarding the status of components of system 10 and for providing operator input will be described in greater detail below. However, a brief overview of the functions of Main #1 Menu 222 and Main #2 Menu 272 will assist in the rapid understanding of the operation of the system 10.

Figure 7:
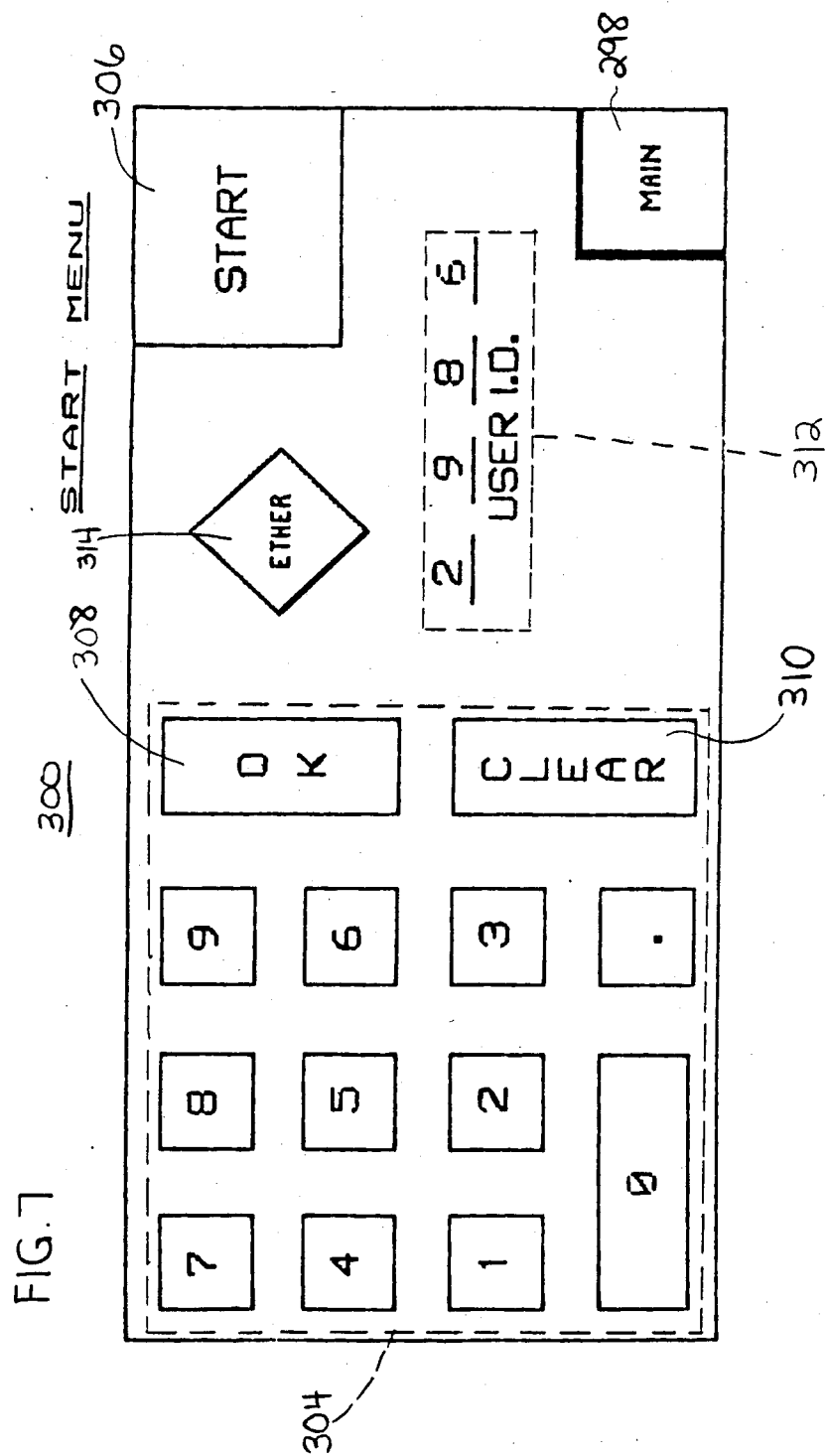
FIG. 7 is a plan view of a Start Menu generated by the system and displayed on the visual display and information input unit.

An ignition switch 262, when operated by the operator, allows the operation of most functions in the display 13. When the ignition switch 262 is activated from the system 10 off condition, the display 13 of display and information unit 12 immediately pages forward to the Start Menu 300 (FIG. 7). If for some reason a return to the Main #1 Menu 222 is made without starting the vehicle, Main #2 Menu 272 allows return to Start Menu 300 via start function switch 274. Any time ignition switch 262 is on, all accessory functions are automatically energized without the necessity of activating accessory function switch 276.

Touching of marker light switch 252 will provide activation of all marker lights so long as the operator is activating this function when headlight function switch 254 and parking light function switch 256 are not activated. Both visual and audio function switch 256 are provided as activation occurs by an audio signal and a reverse field in the function switch area of the display 13. When the headlight function switch 254 is activated, marker light function switch 252 is in a mode which will only momentarily deactivate the marker lights. Activation of the head-light function switch 254 will turn on the headlights, tail lights and marker lights. Similar to the other switch functions, visual (reverse field) and audio feedback occur on activation.

If the parking light function switch 256 was previously energized, headlight function switch 254 overrides parking light function switch 256 and controls the illumination of the parking lights.

If the fog light function switch 258 has been previously activated and high beam operation of the headlights is selected via a dimmer switch (not shown), fog light operation is inhibited while the high beams are on. It is desirable that activation of the headlight function switch 254 be such that turning on the headlights, always results in their illumination in a low beam mode regardless of the last position of the dimmer switch.

Touching of the parking light function switch 256 will energize not only the parking lights but the tail and marker light circuits of the vehicle electrical system. If the headlight function switch 254 has been previously energized, actuation of the parking light function switch 256 will turn off the headlights.

Dome light function switch 260 is in an on/off toggle mode, which, when activated, illuminates the cab 11. A reverse field of the display as well as an audio signal is provided.

Touching of the fog light function switch 258 similarly causes the fog lights to be illuminated, and provides both audio and visual feedback on activation. However, a time out function is provided so that when the vehicle fails to move and the vehicle engine is off for about fifteen minutes, the fog lights will turn off.

Windshield wiper function switch 242 results in a reverse field visual feedback and an audible tone on activation. The windshield wipers are immediately activated in a low speed mode. Following the activation of windshield wiper function switch 242, wiper speed function switch 244 and the symbol "intermit" switch area 246 are illuminated on the display 13 of display and information unit 12. If the operator activates wiper speed function switch 244, the winshield wipers immediately operate in the high speed mode and the high symbol will be displayed on the display area 244 for windshield speed function switch 244.

If the operator activates the "intermit" function switch 246, the symbol at 246 is illuminated, and the operator is presented with a choice of pause intervals in the display area at the pause interval function switch 246 area.

At any time, a second activation of the windshield wiper function switch 242 will result in turning the windshield wipers off. Windshield washer function switch 248, when activated, turns on the fluid pump for a predetermined interval. Simultaneously, the windshield wipers are activated. This function can be programmed to be a momentary function requiring the operator to continue to activate the windshield washer function switch 248 for so long as he wishes fluid to be dispensed. In this configuration, once the operator ceases the activation of windshield washer function switch 248, the windshield wipers will continue to operate for a preselected number of cycles, such as two, after dispensing of the fluid has stopped. Alternately, a time out function can be provided so that the fluid is dispensed for a preselected interval, such as eight seconds, and the windshield wipers could continue for a period beyond the dispensing interval to clear the windshield.

The heater/air conditioner function switch 232 with associated display area/function switch 234 are activated as follows. When heater/air conditioner function switch 232 is activated, a visual and audible feedback is provided to the operator. On activation and identifies the temperature setting and whether the heating or air conditioning modes have been selected. Likewise, the preset blower speed is displayed. On activation of area/function switch 234, the display will automatically page forward to the heating/air conditioning menu 302 (FIG. 9) where any adjustment to the control settings can be made, in a manner as will be described in detail hereinafter in connection with the description of FIG. 9. If no adjustments are made, the system defaults to the Main #1 Menu 222. If an adjustment is later desired, the touching of the function switch 234 will call up heating and air conditioning menu 302. In the event an operator desires to turn off the heater, or the air conditioner activation, touching of the heater/air conditioner function switch 232 disables them and returns this display area to a normal visual display.

A cruise control function switch 226 when touched, activates the cruise control system. On activation of the cruise control system, acceleration function switch/display area 228 and deceleration function switch/display area 230 are illuminated on the display 13 of the display and information unit 12. If the cruise control has not been previously engaged, no speed is indicated in acceleration function area 228. When the vehicle has reached the desired cruise speed, memortary touching of deceleration function switch 230 engages the cruise system and the set speed appears in the display area 228. If an operator decides to decelerate from a set speed, continuous touching of deceleration function switch 230 will result in lowering the set speed at a predetermined rate. If an operator wishes to increase the set speed, continuous touching of the acceleration function switch 228 will accelerate the vehicle to the desired speed at a predetermined rate. Once the desired cruise speed has been set, the last set speed will be displayed. Unless cruise control function switch 226 has been deactivated, an operator can return to the cruise set speed (after braking, which interrupts the cruise 20 function) by touching the acceleration function switch 228 to return to the set speed. Cruise control function switch 226 is analogous to an alternate on/off toggling device which may be turned on or off by successive touches of the cruise control function switch 226.

An engine brake function switch 236 similar to other function switches is analogous to an on/off switch. When engine brake #1 is activated, braking commences and associated engine brake switch #2, 238 and engine brake switch #3, 240 appear on the display 13. Should higher degrees of engine braking be required, either engine brake #2 function switch 238 or engine brake #3 function switch 240 may be activated by the operator.

Radio function switch 249 when activated by an operator turns the radio on, at the last selected radio station and volume level. On activation, a reverse field appears and an audible signal is emitted. At activation, station indicator function switch 250 is also illuminated and indicates the station being played. If an operator desires to adjust the radio function, activation of the station indicator switch 250 brings up Radio Menu 304 (FIG. 8) which will be described in greater detail hereinafter in connection with the description of FIG. 8.

Main #2 Menu 272 (FIG. 6) is activated by the other control function switch 270 appearing in Main #1 Menu 222.

Panel lights function switch 290 operates as a momentary touch and hold position switch. If the operator touches the brighter area of panel lights function switch 290, the panel, or dash, lights brighten until he removes his hand. Similarly, if the operator touches the dimmer portion, the illumination level diminishes until he removes his hand.

Right window switch 286 and left window switch 284 operate in an analogous manner as a momentary touch and hold switch. If the particular vehicle in which the system 10 is installed does not have electric window motors, this area remains blank on the display 13 of the display and information unit 12. When this function is present, a touch of the switch function area will raise or lower the window as long as the respective area is contacted.

The driver input function switch 293 and associated next state function switch 294 are particularly adapted for interfacing with a Truck Operation Monitoring System 21. The driver input function switch 293 allows input of driver information and will be compatible with the paging and content format of the Truck Operation Monitoring system 21. On activation of the driver input function switch 293, and when an operator anticipates a state line crossing needs to be entered, the operator will activate State input function switch 294 for causing a reverse field indication of the activation. On activation, switch area 294 becomes visible and scrolls the possible States which the operator could be entering. As states are written into the switch 294, a two letter abbreviation with an audible signal is triggered. When the desired State appears, activation of the switch 294 enters and holds the state indication. Entry of a selected state is accomplished by touching the input function switch 293 which deactivates this function. If the operator so desires, the State entry can be preselected and at actual State line crossing, Main #2 Menu 272 is called up by touching the Other Controls switch 270 to bring up the Main #2 Menu 272, followed by activating the driver input function switch 293.

Activation of the start function switch 274 brings up start menu 300 (FIG. 7) if the engine is not running. In the event the engine should be running, a message saying "engine running" is displayed. Accessory switch 276 on activation, allows activation of radio display area/switch 248, windshield wiper area/switch 242, windshield washer area/switch 248, and driver input area/switch 293 on the display 13.

The spotlight function switch 278 and fifth wheel light function switch 280 operate in the manner analogous to an on/off switch. When these function switches are activated, each provide a visual and audio feedback of activation.

Heated mirror function switch 292 when activated, provides visual and audio feedback. On activation, the heating elements are energized and remain on until the heated mirror switch 292 is turned off or a 15 minute time out elapses to turn off the heating circuits.

Diagnostics function switch 296 will page on operator forward to diagnostic menus to inform an operator of malfunctions and to assist a service technician to locate malfunctions. This menu is described below in conjunction with the description of FIG. 9a.

Touching of the Main Menu function switch 298 returns the display to Main #1 Menu 222. In common with the other menu pages, if no operator input occurs for 15 seconds, the display and information unit 12 returns to Main Menu #1, 222.

In FIG. 7 is shown the Start Menu 300 which appears on the display and information unit 12 when the ignition switch is turned on from a system off position, or when there is zero engine revolutions and the Start Menu function switch 274 is activated from Main #2 Menu 272. Start Menu 300 will automatically default to Main #1 Menu 222 at such time as engine revolutions exceed 200 RPM. A numeric key pad 304 provides only for authorized access to the start function. A four digit number comprising a programmed key code previously may be entered which must be matched by an operator before start function switch 306 may be activated by an operator. A start function is initiated in a manner analogous to the way activation of a push button start switch energizes the starting motor of a vehicle's engine. As an operator attempts to enter the authorization code, he selects an appropriate number which is displayed but not entered into system 10 for activation purposes until an O.K. function area 308 is activated. In the event the operator inadvertently enters an inappropriate number, the operator may clear the number completely from the system by activating a clear function switch 310.

The user I.D. number entered by the operator appears in area 312. If an operator makes three incorrect entries in sequence, system 10 will not accept a fourth entry for a period of 15 minutes.

Touching of the ether function switch 314 momentarily activates the ether system associated with the vehicle engine as long as this function switch 314 is touched by the operator. It is similar to the push button switch currently employed for activating an ether delivery system.

Figure 8:
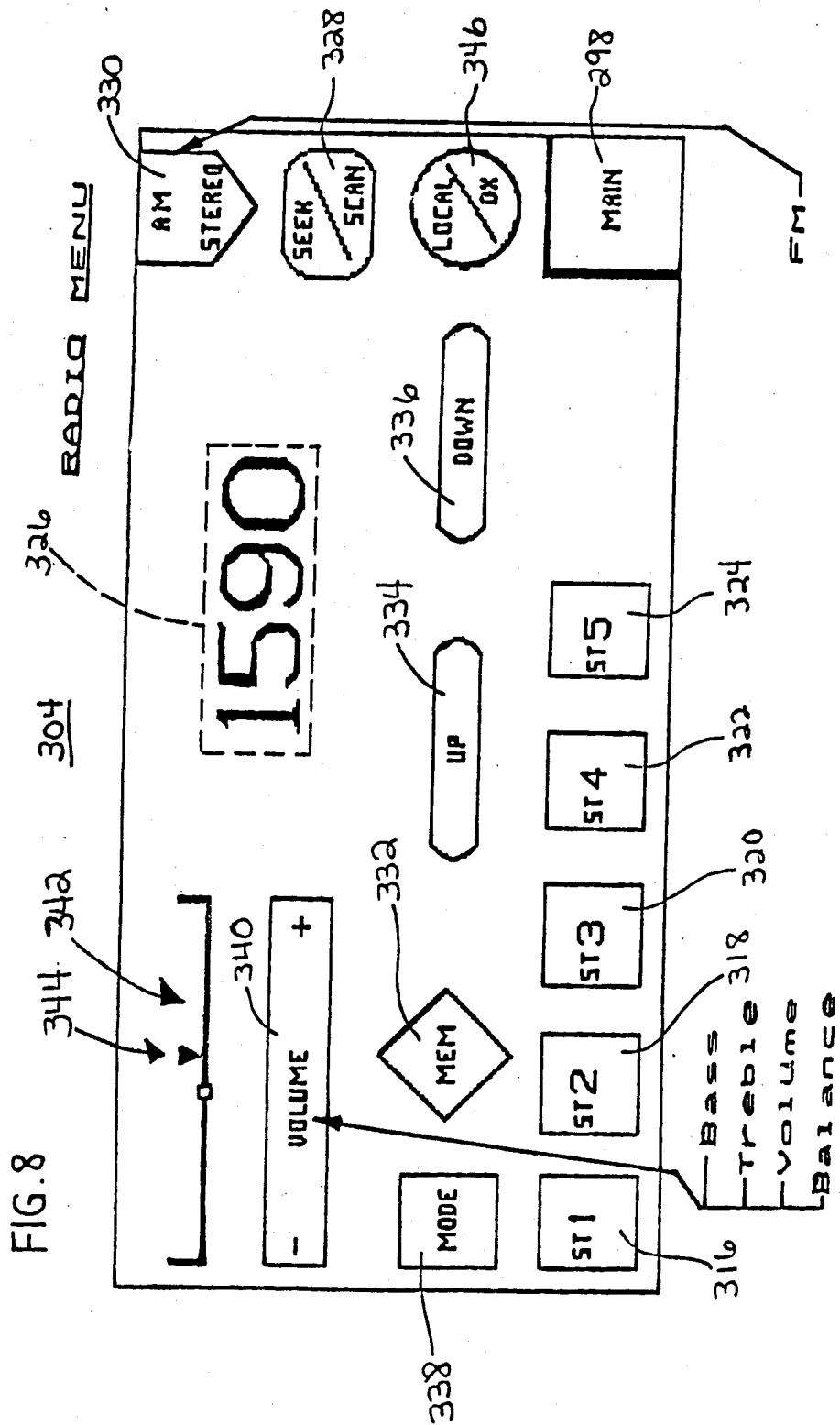
FIG. 8 is a plan view of a Radio Menu generated by the system and displayed on the visual display and information input unit.

In FIG. 8 is shown the radio menu 304. When summoned by touching the station indicator function switch 250 on Main #1 Menu 222, radio menu 304 enables further activation of the radio system. Radio menu 304 includes station function switches ST1–ST5, 316–324. Activation of any station function switch 316–324 results in the radio being turned to a preselected frequency. The preselected frquencies are entered in a manner analogous to that employed by conventional station calling buttons. As the function switch is activated, the preselected frequency is displayed in the frequency display area 316 which displays the frequency of the station being received. When the radio menu is in a seek scan mode selected by touching seek scan function switch 328, a reversal of field occurs when the station tuned coincides with one of the frequencies preselected in station function switch 316-324. Seek scan function switch 328 operates in a manner similar to an alternate on/off switch. When activated, a reverse field occurs and the radio will successively run across its frequency band pausing at preselected intervals when a station signal is present.

Touching of AM stereo function switch 330 alternately toggles between the tuning AM and FM bands. This dual band capacity allows five stations to be preselected from the station tuning function switches in the AM band and an additional five stations to be preselected for the station function switches in the FM band.

When the memory function switch 332 is activated, a reverse field appears and remains for a seven second period before returning to the default or non-memory state. When activated, the station currently tuned and appearing in station display area 326 may be assigned to any one of the five station function switches 316–324. Up function switch 334 and down function switch 336 each operate as a momentary touch and hold switch to tune the radio upwards or downwards in the frequency band by preselected intervals. Touching of mode function switch 338 successively toggles through activating base, treble, volume and balance circuitry.

As shown in FIG. 8, volume is selected and appears in a control bar display switch area 340. Control bar display switch area 340 permits an increase or decrease of the displayed variable by touching of the control bar switch 340 in either the plus or minus switch, as is desired. A level indication 342 is immediately above control bar display area 340 to indicate, by means of arrow 344, the current level set by touching the plus or minus switch area 340.

Touching of a local function switch 346 desensitizes the radio frequency input circuit to reduce unwanted interference from weak stations and to allow only the stronger stations to be selected.

If an immediate return to Main #1 Menu 222 is desired, activation of main function switch 298 will return display 13 to Main #1 Menu 222 before default occurs from lack of activation of a switch of the Radio Menu 304 in 15 seconds.

Figure 9:
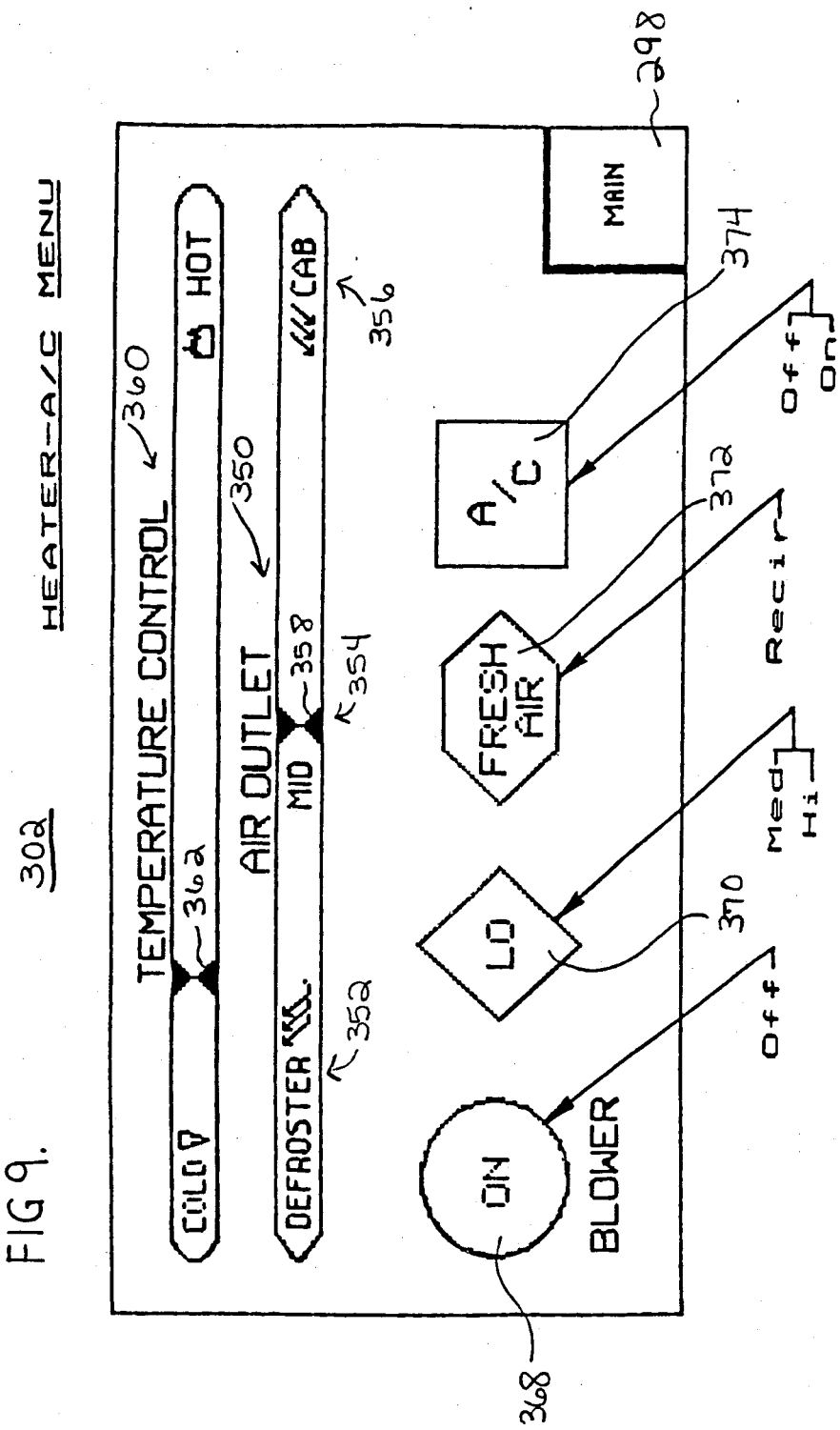
FIG. 9 is a plan view of a Climate Control Menu generated by the system and displayed on the visual display and information input unit.

In FIG. 9 is shown the Climate Control Menu 302. This menu is summoned from Main #1 Menu 222 by activating fan heater air conditioning function switch 234 in Main #1 Menu shown in FIG. 5. An air outlet function area 350 indicates the present state of the heating and air conditioning between defrost 352, mid-level 354, cab 356. An "hour glass" indication 358 shows which outlets are activated. By simply touching air outlet function switch 350 in the appropriate area, the operator may change the state of the system to show the new state. In a manner similar to the air outlet function switch/area 350, the temperature control function switch/area 360 immediately above it, may be adjusting by touching the temperature location between hot and cold states and an "hour glass" shaped indicator 362 indicates the temperature.

A blower function switch area 368 operates in a manner similar to an on/off switch. A visual reversal of this switch area occurs with display of the word "on" on activation of the blower function switch 368. The blower speed function switch 370 cycles between low, medium and high upon successive activations of this function switch with an accompanying display of "low", "med" or "high".

A fresh air switch 372 allows alternate selection of fresh air from outside the vehicle with an accompanying display of "fresh air", or recirculation of air in the cab 11 with an accompanying display of "recir air".

An air conditioner function switch 374 operates in a manner analogous to an alternate on/off switch. When the air conditioning system is turned on, a reverse field occurs with the display of "a/c"in the switch area. Each of these functions may selectively be remembered to ensure that, upon re-energization of the system 10, it will return to its last selected state. If the operator should desire to immediately return to Main #1 Menu 222, activation of main function 298 will call up that menu.

In FIG. 9a is shown the Diagnostic Menu 375. This Diagnostic Menu 375 offers an operator or mechanic the option of determining whether or not there is a recorded failure or abnormal condition of many of the truck components. An operator may, by appropriately touching one of the switch areas 376, 377, 378, 379, check the status of the instruments - switch area 376, of the cab-switch area 377, of the engine-switch area 378 or of the chassis-switch area 379.

Additionally, the operator may determine whether or not a previous record of failure has been recorded by touching the appropriate switch labeled "Display Recorded Condition" associated with each of these areas, namely switch area 380 for the recorded condition for the instrument-above switch area 376, switch area 381 for the cab-above switch area 377, switch area 382 for the engine-above switch area 378 and switch area 383 for the chassis-above switch area 379.

In the event that there is either a recorded condition or a failure during the checking procedure, a failure message is displayed in failure message area 384 which describes what has failed and preferably how it failed and the time and data of the failure.

Following the display of a failure message, diagnostic next switch 385 may be activated to determine whether or not there are additional failures associated with that component group. In the event that the operator or mechanic desires to clear a failure message from memory, a clear switch 386 may be pressed to initiate the procedure for clearing the recorded failure. Activation of the clear switch 386 may invoke a numerical pad similar to that shown in the Start Menu 300 (FIG. 7). In the event that the person activating the clear switch 386 lacks the proper authorization code, the message will not be erased from memory.

At such time as the operator desires to return to the Main #1 Menu, main switch area 298 may be activated to return to Main #1 Menu 222 shown in FIG. 5.

As known by those skilled in the art, microprocessor control section 24 may be realized by any one of a number of microprocessor chips, each of which has its own idiosyncrasies in programming. These idiosyncrasies are easily accommodated to obtain a desired result.

FIGS. 10a-18 are flow charts of various subroutines or steps indicating how the microprocessor functions to accomplish a given result. Related matters are also shown. FIGS. 10a-10d are directed to the power up and powering down of microprocessor control sections 24 in cab controller 14 and in chassis controller 16.

FIG. 10a illustrates the flow chart for a cab power up sequence 390. The cab power up sequence 390 can be initiated by any one of a number of events, namely opening the left door 391, opening the right door 392, pressing the brake pedal 343, or pressing the clutch pedal 394. Additionally, a message on the ATA link A 395 or on ATA link B 396 results in the cab controller 14 latching on the power supplied thereto as indicated by step "Latch On Power" 397.

Latch On Power step 397 is a functional step performed in associated hardware which is best understood by reference to FIG. 10e.

FIG. 10e is a schematic of a portion of cab controller 14 illustrated in FIG. 3b. This schematic FIG. 10e is intimately associated with switch input section 28 shown in FIG. 3b and with regulator 223 and switch conditioning circuitry 211 shown in FIG. 4. In FIG. 10e, a portion of regulator 223 receives the same reference numeral but a portion of switch conditioning circuitry 211 is shown in greater detail in association with reference number 400. One or more of the switches leading to cab controller 14 switch input condition section 28 is connected to switch input section 400. In particular, right door 120, left door 122, brake 130, and clutch 112 switches are shown in this drawing. Each in turn is connected through intermediate circuitry to a group of transistors collectively referred to as a supply switch 401. Supply switch 401, including capacitor 402, acts as a persistence means to provide an input to the regulator 223. Mechanical switches 112, 130, and the door pair switches 120, 122, are each individually connected to the base of a semiconductor input switch 403, 404 or 405, respectively. The collector output of these semiconductor input switches 403-405 individually feed isolation diodes 406. Each isolation diode in turn is operatively connected to the supply switch 401. Similarly, supply switch 401 receives inputs from the public data link 18a and the private data link 18b, as well as an input from the output of the microprocessor 24. Each of these signals are individually isolated from supply switch 401 by means of isolation diodes 406.

The net result of this circuitry is to reduce the burden on a vehicle battery by shutting down the output of the regulator 223 unless some activity is present. To ensure that a momentary inactivity will not prematurely interrupt the power supply, persistence means 402 continues to provide an adequate source of energy in the absence of a signal on one or more of the public data link 18a, the private data link 18b, the microprocessor 24, the clutch 112, the brake 130, the right door 120, the left door 122.

The hardware latching circuitry of the chassis controller is similar to that just described of the cab controller including an optional input for the mechanical switch inputs which is usually redundant given the interconnection between the cab controller 14 and the chassis controllers 16.

Immediately following "latch on power" in step 397, a message is sent at step 407 to the chassis controller 16 to send a message to "wake up" the chassis controller 16 such that the chassis controller 16 software is initiated by the cab controller 14.

If an acknowledgement from the chasis controller 16 is not received by the cab controller 14, the message is reset or a "fault" signal appears on the display 13. Once the software is initialized at step 408 in the cab controller 14 by acknoledgement from the chassis controller 16, a number of routines are automatically initiated and the cab controller 14 is ready to respond to further input, some of which are described hereinafter in detail and the remainder of which are commonly known or readily inferable from those described herein.

Just as the cab controller 14 must be powered up, it likewise must be powered down to return to a state from which it may commence the power up sequence in a predetermined order in system 10 to reach an operating state. Such a cap power down sequence 409 is illustrated in FIG. 10c. At predetermined intervals, the cab controller 14 tests to see whether or not accessory function switch 276 is activated in decision step 410.

If the accessory power is off, then the cab power down sequence 409 continues to "operator activity" step 411. In operator activity step 411, the program determines whether or not there has been any operator activity for a predetermined interval.

If there has been no operator activity in the predetermined interval, then a message is sent to the chassis controller 16 in "down chassis message" step 412. Thereafter, the cab controller powers itself down to a condition for beginning of a cab power up sequence in "cab power down" step 413.

Figure 10D:
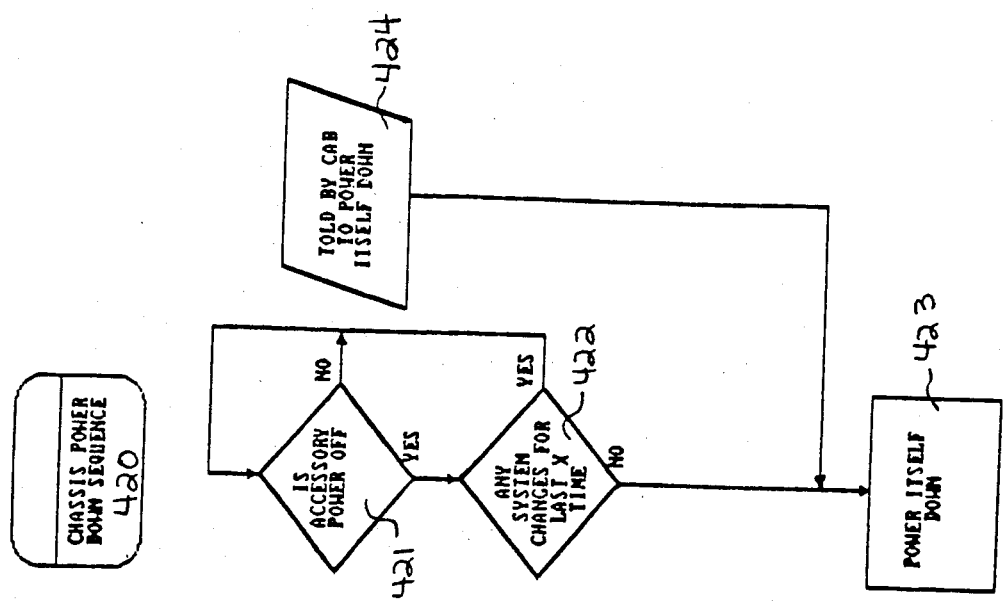
FIG. 10d is a flow chart of a chassis controller power down sequence routine.
Figure 10C:
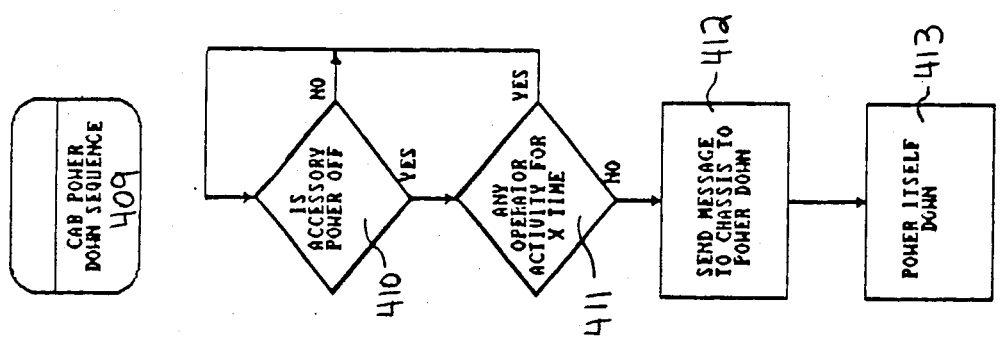
FIG. 10c is a flow chart of a cab controller power down sequence routine.

Just as the cab controller 14 must have programs to power itself up and down, given appropriate inputs, so must the chassis controller 16 have similar routines which are illustrated in FIGS. 10b and 10d.

A chassis power up sequence 414 is illustrated in FIG. 10b. The series of events which will commence chassis power up sequence 414 is considerably more restricted than that for the cab power up sequence 374. A message on the ATA link "A", 415 or a message on ATA link "B", 416 sent during the cab power up sequence 390 in the "wake up" step 407 results in "Latch On Power" step 417. Thereafter, a message to the cab wake up unit is transmitted at step 418 following which software is initialized to execute initialization chassis software step 419.

Once the software is initialized in the chassis controller 16, it proceeds to run its operation and application programs in a manner similar to the cab controller 14. Similarly, some of these operation and application programs are described in further detail hereinafter and others are readily inferable by those skilled in the art from their general knowledge and implied by the disclosure of the particular programs disclosed herein.

The chassis power down routine 420 is shown in FIG. 10d. The chassis power down routine 420 may be self initiated by the chassis controller 16. At predetermined intervals, the chassis controller 16 tests at step 421 to see whether or not the accessory function switch 276 is inactivated in accessory step 419.

If accessory function switch 276 is not inactivated, the chassis controller 16 proceeds to its next step in its operation program or returns to running any application program in accordance with its preprogrammed instructions.

If the accessory function switch 276 is inactivated, the chassis controller 16 determines whether or not there has been any change in the state of the system in a system activity step 422.

If there has been system activity within the predetermined interval, the cab controller 14 treats it as if the accessory function switch 276 is activated.

If there has been no system activity within the predetermined interval, the chassis controller 16 powers itself down in a chassis power down step 423.

If at any time a message from the cab controller 14 is received in the power down message step 424, the chassis controller 16 immediately proceeds to power itself down in chassis power down step 422.

FIGS. 11-17 are flow charts associated with the menus generated by the cab controller 14 and shown in FIGS. 59a.

Figure 11A:
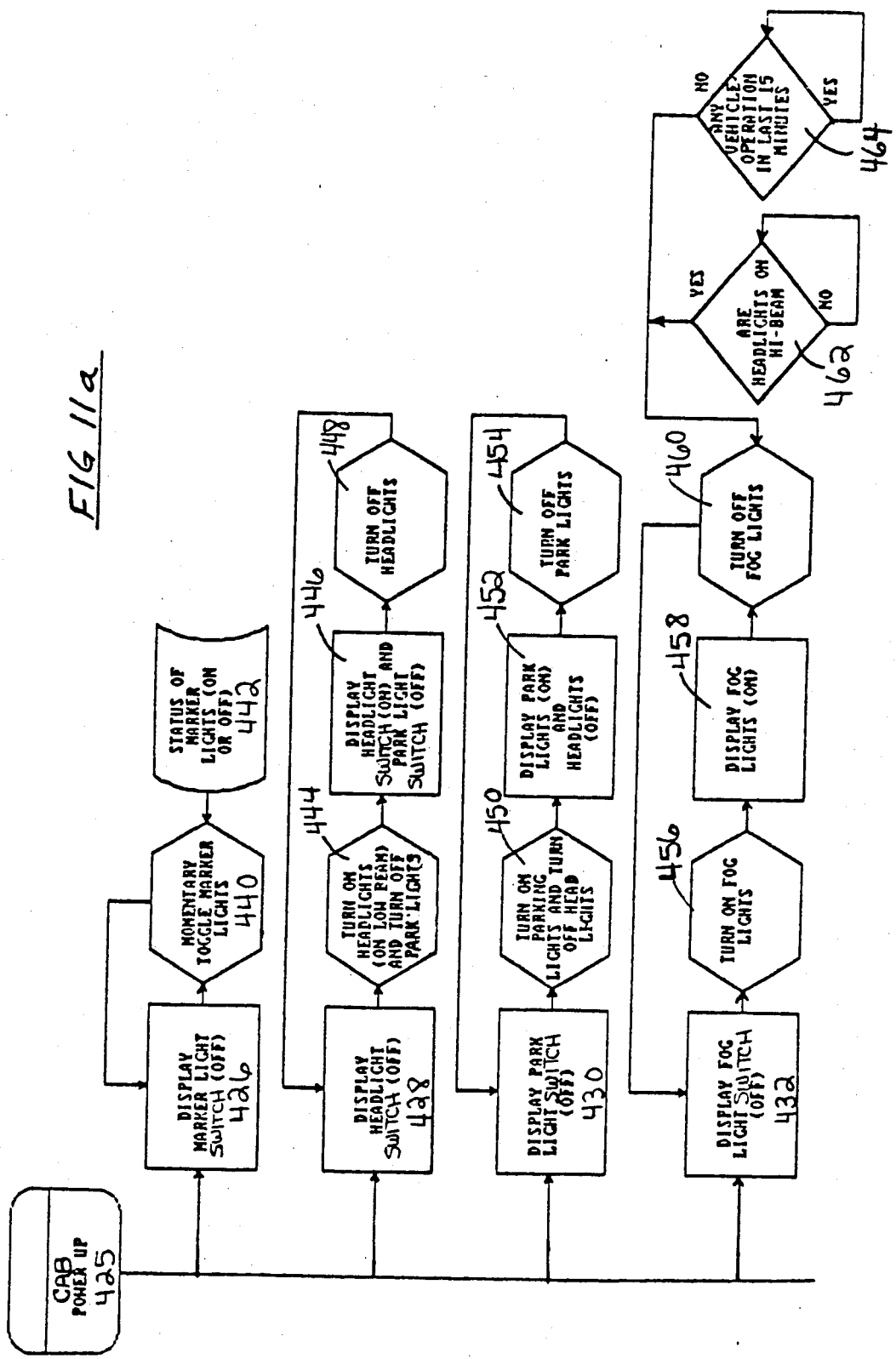

FIGS. 11a-12c are flow charts of routines associated with the Main #1 Menu 222 shown in FIG. 5. The steps shown here are a continuation of the initialization of the cab software step 394 shown in FIG. 10a. FIG. 11a begins with step 425 which is a continuation of the execution of the initialization software step 394 and is labeled "power up" step 425. Here a number of functions are displayed on the display 13 of the display and information unit 12.

The following steps or display illuminations occur almost simultaneously as part of the power up step 425 on the display 13 of the display and information unit 12; display marker light function switch 426; display headlight function switch 428; display park light function switch 430; display fog light function switch 432; display dome light function switch 434; display other controls function switch 436; and display ignition switch 438. Each of these functions or switches are displayed or illuminated in an off state.

Returning to the display marker light step 426, once the display is activated, the function may be activated in the "Momentary Toggle Marker Lights" step 440.

In the flow charts illustrated herein, hexagon steps generally indicate an operator input initiated by an operator touching the appropriate function switch on the display 13 of the display and information unit 12. The appropriate function switch area is not fixed from menu to menu but varies in accordance with the menu being displayed. Additionally, hexagon steps may be responsive to various flags and auxiliary routines of programs or states of memory which allow variation of the step.

"Momentary Toggle Marker Lights" step 440 is illustrative of this interrelated operator input/system status activity. In any event, if marker light function switch 252, Main #1 Menu 222, is touched by an operator, marker lights are momentarily activated or deactivated to the opposite state shown in the marker light area 252. If, as on power up, touching of marker light area 252 results in turning on the marker lights if the headlight switch function 254 is in an off state.

The state of the marker lights is to a degree affected by the state of the headlights. If the headlights are on, control of the marker lights on a non-momentarily basis passes to headlight function switch 254. If the headlight function switch/area 254 indicates headlights on, activation of the marker lights switch 252 results in momentarily deactivating of the marker lights. The headlights are first activated in a low beam state.

The status of the marker lights investigation is generally indicated by status inquiry step 442 in FIG. 11a but the interrelationship and dominant control resulting from the inquiry is not shown to avoid obscuring the clarity of the flow chart shown.

Following display of headlight function step 428, an operator may turn the headlights in their low beam state on as indicated in headlight step 444. Once the headlights are turned on in step 444, they not only dominate the marker lights but also dominate the park lights. Both marker and parking lights remain on, buth their function areas on the display 13 shown them as off. Again, for clarity, the obvious decision trees and connections have been omitted.

Following the turning on of the headlights in step 444, headlight function switch/area 254 indicates that the headlights are on and the parking lights are off as shown in display headlight step 446. A subsequent touching of headlight function switch 254 results in turning off the headlights in step 448 with a subsequent adjustment of the display to the off condition in step 428.

After displaying the parking lights function switch 256 in its off state in step 430, subsequent touching of the parking light function switch 256 will result in turning on the parking lights step 450. As indicated, activation of the parking light function switch 256 will turn off the headlight function switch 254 if it is in an on state following the parking light step 450. The display in the switch function area is altered as indicated in display step 452 which alters the function displayed on the display 13 of the display and information unit 12 to show the parking lights on and the headlights off. Subsequent touching of the parking lights function switch 256 results in turning off the parking lights as indicated in off park lights step 454. Thereafter, display parking lights off step 430 alters the state of display 13 on the display and information unit 12.

Following the display of the fog light off step 432, the fog lights may be turned on by touching fog light function switch 258 which results in on fog light step 456. Immediately thereafter the display and information unit 12 is altered to display fog lights on step 458. A subsequent touching of the fog light function switch 258 will result in turning off the fog lights at off fog lights step 460. Thereafter, the display and information unit 12 is altered to show fog lights off at step 432. Off fog lights step 460 is also responsive to two other status and time out functions. The program periodically tests in high beam decision step 462, to see whether or not the headlights are on high beams. If the headlights are found to be on high beam, the program routine goes to off fog light step 460. If high beams are not on, the testing function is re-initialized and the operational or application program continues its predetermined activity. Similarly, the vehicle operation step 464 tests to see whether or not the vehicle has been moved in the last 15 minutes. If the vehicle has been operated, the program continues the operation or application program continues its predetermined activity. If there has been no vehicle operation in the time out period of 15 minutes, the program goes to off fog lights step 460.

FIG. 11b continues the cab power up sequence related to Main #1 Menu 222 commencing with step 425. Following display of dome light off step 434, a subsequent touching of dome lights function switch 260 results in turning on the dome lights at "Turn On Dome Lights" step 466. Following performance of on dome light step 466, the display and information unit 12 is altered at display dome light switch step 468. Thereafter, a subsequent touching of the dome light function 260 results in this program going to off dome lights step 470. Thereafter, the display and information unit 12 is altered at display dome light function off step 434.

Following illumination of "other controls" function switch 270 on the display 13 of the display and information unit 12, a subsequent touching of "other controls" function switch 270 will result in display of Main #2 Menu 272 as shown at step 472 continued in FIG. 13a.

Following illumination of ignition switch 262 at display ignition step 438, a subsequent touching of ignition switch 262 results in turning on the ignition at on ignition step 474. Thereafter, display and information unit 12 is altered to show ignition on at ignition step 476. Thereafter, Start Menu 300 is brought to the screen at step 478. The display 13 of the display and information unit 12 is altered at continuation step 479 shown in both FIGS. 12a and in 12b. Continuation steps of various types have been inserted at various points in the flow chart to facilitate continuity between the Figures since it is not possible to provide a readable flow chart for some applications or routines on a single sheet of acceptable size. These continuation steps are fictitious and are only provided to facilitate following the flow charts on several sheets of the drawings.

Figure 12A:
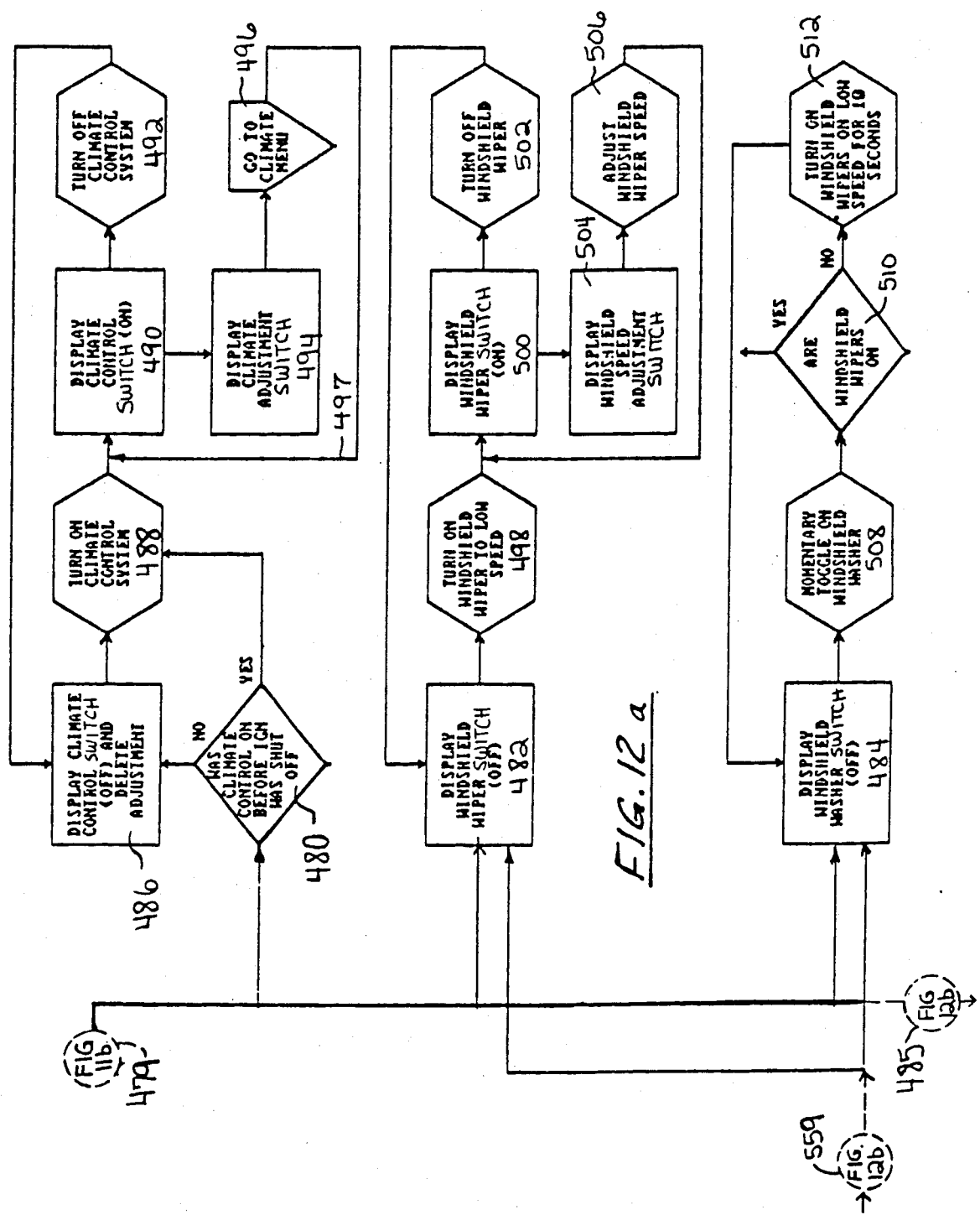
Figure 12B:
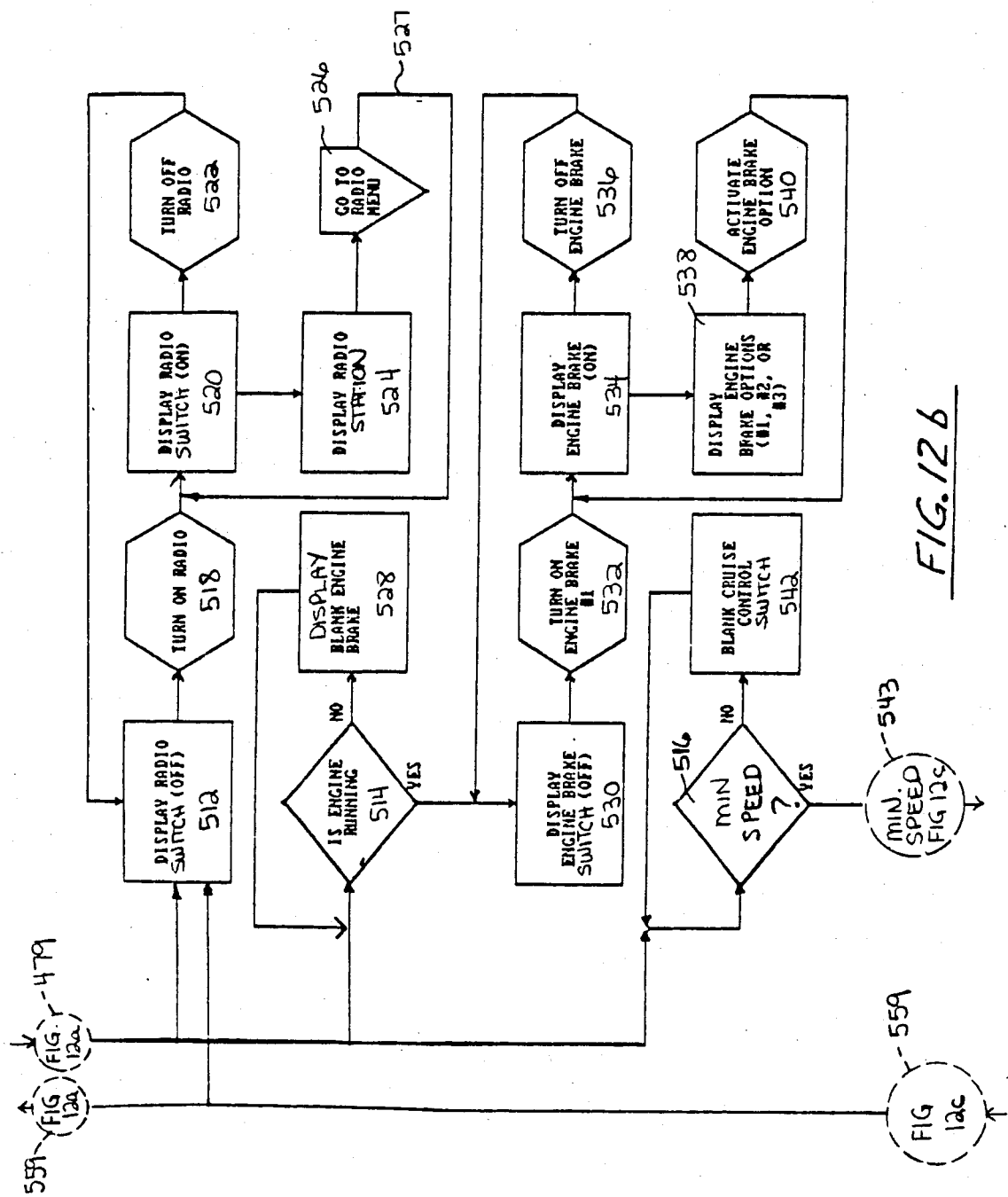
Figure 12C:
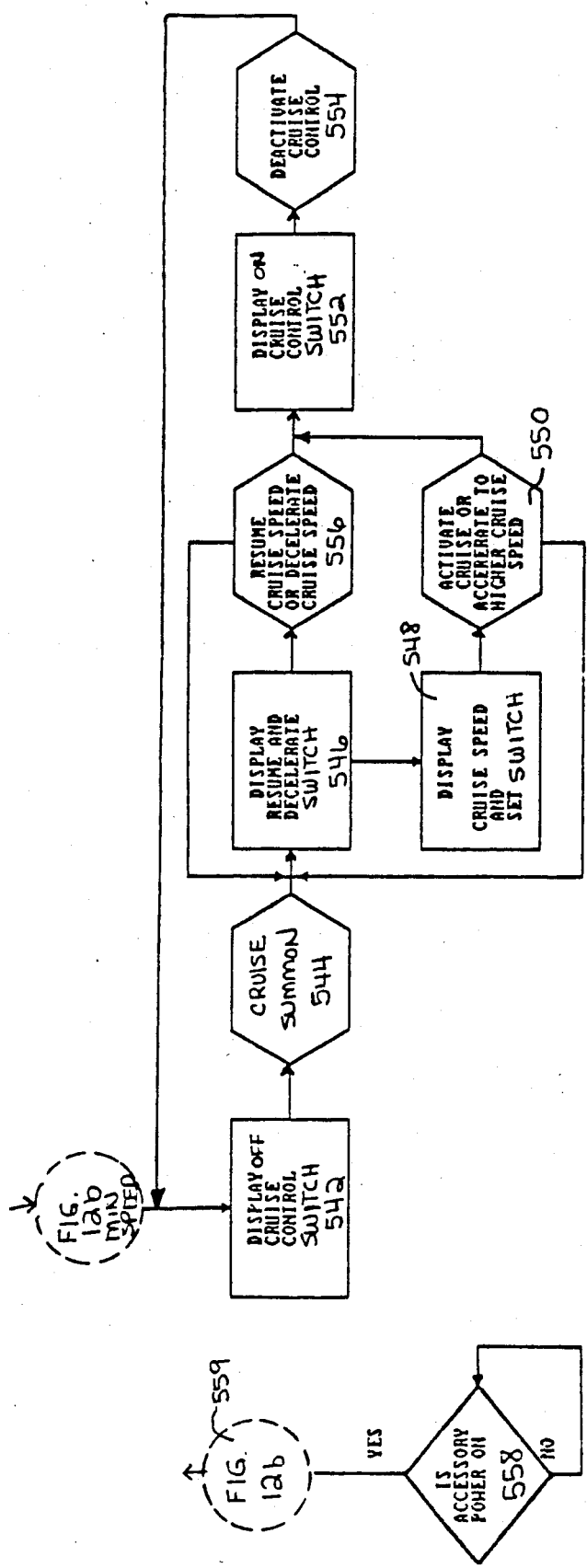

In general, a return to Main #1 Menu 222 results directly or indirectly in the program going to the flow chart shown in FIGS. 12a-12c.

With reference to FIG. 12a, from continuation step 479, the following events occur nearly simultaneously. The previous state of the climate control or Heating, Ventilating, Air Conditioning (HVAC) system is tested in HVAC state step 480 and the display 13 is altered in a number of respects, namely the following switches are shown in their off state: windshield wiper switch 242 is activated in an off state at step 482; display washer switch off at step 484. Further steps are shown on FIG. 12b by proceeding to continuation step 485.

Testing at HVAC state step 480 ultimately results in changes to the display 13. If the HVAC function switch 232 was off when the ignition was last activated, HVAC function 232 is displayed in an off condition and heater function switch 234 is suppressed at HVAC off step 486. If, however, HVAC function switch 232 was active at the last time ignition function switch 262 was activated, the HVAC system is activated at step 488. It should be noted that at step 488, the operator operates HVAC function switch 232 by touching it when it is in an off state. Following step 488, the display 13 is altered to show activation in display HVAC step 490. A subsequent touching of HVAC function switch 232 will place the HVAC system in off at step 492 with a subsequent alteration of the display 13 to indicate its off status at display step 486.

Display HAVC adjustment step 494 is performed to appropriately illuminate the HVAC adjustment switch 234. The illuminated HVAC adjustment switch/area 234 shows the HVAC system blower speed (high or low) and the heater is activated (HTR) as well as the current cab temperature.

Upon a touching of the HVAC adjustment function switch once displayed by the display HVAC adjustment step 494, the HVAC menu 302 is summoned to the display 13 at step 496 which will be described in greater detail hereinafter.

Following a return from HVAC display menu 302, Main #1 Menu 222 controls as is symbolically indicated by the return loop 497.

Following display wiper off step 482, subsequent activation of wiper function switch 242 by touching same will turn the windshield wipers on at low speed as is indicated in wiper low step 498. Immediately thereafter, wiper function switch area 242 indicates the wipers are on as is shown at display wiper step 500. Subsequent touching by the operator of wiper function switch 242 results in turning off the windshield wipers as indicated at wiper off step 502. Thereafter, at display wiper off step 482 the display 13 is altered to indicate that the windshield wipers are off.

Following the display wiper on step 500, the wiper adjustment function switch/area 244 is illuminated to show the current low speed and option intermittent and high speed operation. Activation of the high speed switch of wiper adjustment switch 244 results in the wipers going to a high speed mode and extinguishment of the pause interval function 246. In the event the intermittent switch in location 246 is activated, switch 246 replaces the intermittent switch and may be used to adjust the pause interval for intermittent operation.

Display of wiper adjustment function switch/area 244 and pause interval function switch/area 246 is indicated in display adjustment steps 500, 504, and the options in adjusting wiper speed are lumped together at wiper adjustment step 506. Following any adjustment indicated in adjustment step 506, the program returns to display wiper at step 500.

Following display washer off step 484, activation of washer function switch 248 by touching results in the described illustrated option in a momentary activation of the washer system as long as this function switch/area is being touched, as is shown in washer on step 508. Thereafter, the state of the wiper system is tested in wiper on step 510. If the windshield wipers are on, the display 13 returns to display washer off step 489 when the operator moves his hand from washer function switch 242 of Main #1 Menu 222. In the event that the wipers are off, they are activated in low speed on step 512. Thereafter, washer display washer off step 484 is again activated and the program goes to continuation step 485 in FIG. 12b as indicated in FIG. 12a.

Following a return to Main #1 Menu 222 from Starter Menu 300, and simultaneously with the initial activities shown in FIG. 12a, some initial activities occur as indicated in FIG. 12b from continuation steps 479 and 485. Display radio off brings up the radio function 249 indicating the off state of the radio in display radio off step 512. A check is made to see whether or not the vehicle engine is running in engine running step 514 and a check is made to see whether or not vehicle speed is greater than 15 miles per hour in minimum speed step 516.

In common with most condition checks, the engine running and vehicle minimum speed check is periodically run at predetermined intervals to determine their respective states. This completes the direct path of immediate events following a return to Main #1 Menu 222 from Start Menu #300, although some consequential events will follow very rapidly, as described in detail below.

Following radio display off step 512, a subsequent touching of the radio function switch 249 will turn on the radio to the last selected station at the last selected parameters, which ignition function switch 248 indicates on the display 13 that the radio is on in/display on radio on step 520. Thereafter, a subsequent touching of radio function switch 249 will turn off the radio as indicated in off radio step 522. The display 13 of the display and information unit 12 is altered accordingly in display off radio step 512 as a result of turning off the radio in off radio step 522. When the radio comes on, the station indicator function switch 250 appears on the display 13 of the display and information unit 12 and shows the currently tuned band (AM or FM) and the frequency of the tuned station, as is indicated at display station step 524. A subsequent touching of station indicator function switch 250 results in summoning the radio menu 304 as indicated at radio menu step 526. In accordance with the radio functions shown in FIG. 15, the display and information unit 12 returns to Main #1 Menu 222 as is symbolically indicated here by loop 527.

Following the engine running check in engine run step 514, if the engine is not running, display and information unit 12 blanks engine brake #1 function switch 236 on the display of Main #1 Menu 222, as indicated at display blank engine step 528. Alternately, if the engine is running, the display and information unit 12 indicates that engine brake #1 function switch 234 is off as indicated at display engine brake off step 530. Thereafter, a subsequent touching of engine brake #1 function switch 234 results in turning on the engine brake at the #1 level as indicated at engine brake #1 step 532. Immediately thereafter, display and information unit 12 is altered to show that the engine brake is on at the level selected, as indicated at display engine brake on step 534. Thereafter, a subsequent activation of engine brake #1 function switch 234 turns off the engine brake at any level as indicated at off engine brake step 536. This naturally results in the alternation of the display 13 on the display and information unit 12 to indicate the off condition of the engine brake, as indicated at display off engine brake step 530. At any time the engine brake function is activated, engine brake #2 function switch 238 and engine brake #3 function switch 240 appear on the display 13 of the display and information unit 12, as indicated at display engine brake options step 538. Thereafter, the selection of an option (engine brake #1 and engine brake #2 and engine brake #3), not currently being performed, will result in the selection of the option selected and an appropriate alternation of the display 13 of the display and information unit 12 to show the level of engine braking which is in operation. Activation of engine brake options by touching the appropriate switch areas of Main #1 Menu 222 as indicated at activate engine brake option step 540. The subsequent alteration of the display 13 of the display and information unit 12 is indicated at display on engine brake step 534.

Following a minimum speed check performed at minimum speed step 516, if the vehicle speed does not exceed the predetermined minimum, the display 13 on the display and information unit 12 is altered by blanking cruise control function switch 226 on the Main Menu #1 222 as indicated at display blank cruise control step 542. Again, this minimum speed test is performed at a predetermined interval as long as ignition function switch 262 is in an on state. If the minimum speed is exceeded, the program passes through speed continuation step 543 which is continued in FIG. 12c of the drawings. First, the display and information unit 12 is altered to show cruise control off at display off cruise control step 542. Unlike similar paths associated with Main #1 Menu 222, a subsequent touching of the cruise control function switch 226 does not immediately result in engagement of the cruise control system. As indicated at cruise summon step 544 and subsequent steps, the touching of the cruise control function switch 226 merely initially alters the display 13 on the display and information unit 12.

The display resume and accelerate switch step 546 brings up the function displays of resume switch 228 and decelerate switch 230. Immediately thereafter, the display and information unit 12 is altered to show the last selected cruise speed (prior to ignition off) at resume function switch 228 and set in function switch 230, as indicated at display cruise speed and set step 548. Thereafter, an operator touch of the step function switch 230 will engage the cruise system at the current speed of the vehicle at the time it is touched, as indicated at activate cruise step 550. If the operator should wish to engage the cruise control at a speed in excess of that current speed of the vehicle, a touching of the display acceleration function switch 228 will result in the vehicle gradually accelerating at a predetermined rate to the desired speed. A successive touch of the acceleration function switch 228 results in the vehicle speed resuming to that set into the cruise control system. This acceleration process is also indicated at the activate cruise step 550. Following activation of cruise at step 550, the display and information unit 12 is altered to indicate that cruise control function switch 226 is on as indicated at display on cruise control step 552. Thereafter, an operator touch of the cruise control function switch 226 disengages the cruise control system as indicated at deactivate cruise control step 554. Following the activation, the display and information unit 12 is altered to show that the cruise control system is off as indicated at the display off cruise control step 542. Once activated, deceleration to a lower speed may be achieved by touching deceleration function switch 230 on Main #1 Menu 222, as is indicated at resume/decelerate cruise speed step 556.

As with other cruise control systems, a touch of the brake pedal will result in disengagement of the cruise control system with an appropriate adjustment to the display 13 on the display and information unit 12. Following such deactivation, touching of the resume function switch 228 will engage the cruise control with appropriate adjustments to the display 13 on the display and information unit 12 and an adjustment to the last speed set in the cruise control. Resume/decelerate cruise speed step 556 indicates this alternative. Thereafter, the program proceeds as with any other setting of the cruise speed.

As will be described hereinafter in connection with the description of the Main #2 Menu program 272, an alternate path to selectively activate some of the switches on the display 13 of the display and information unit 12 is present in Main #1 Menu 222. Periodically, the system tests to see whether or not accessory power is on at accessory on decision step 558 in FIG. 12c. In the event the accessory power is off, the program proceeds to the next operational step or to a previously interrupted application program. Should the accessory power be on, the program proceeds through accessory continuation step 559 appearing in FIGS. 12c, 12b and 12a to activate display off radio step 512, display off windshield washer step 484, and display off windshield wiper step 482. This ends the description of the various flow charts associated with Main #1 Menu 222.

Figure 13D:
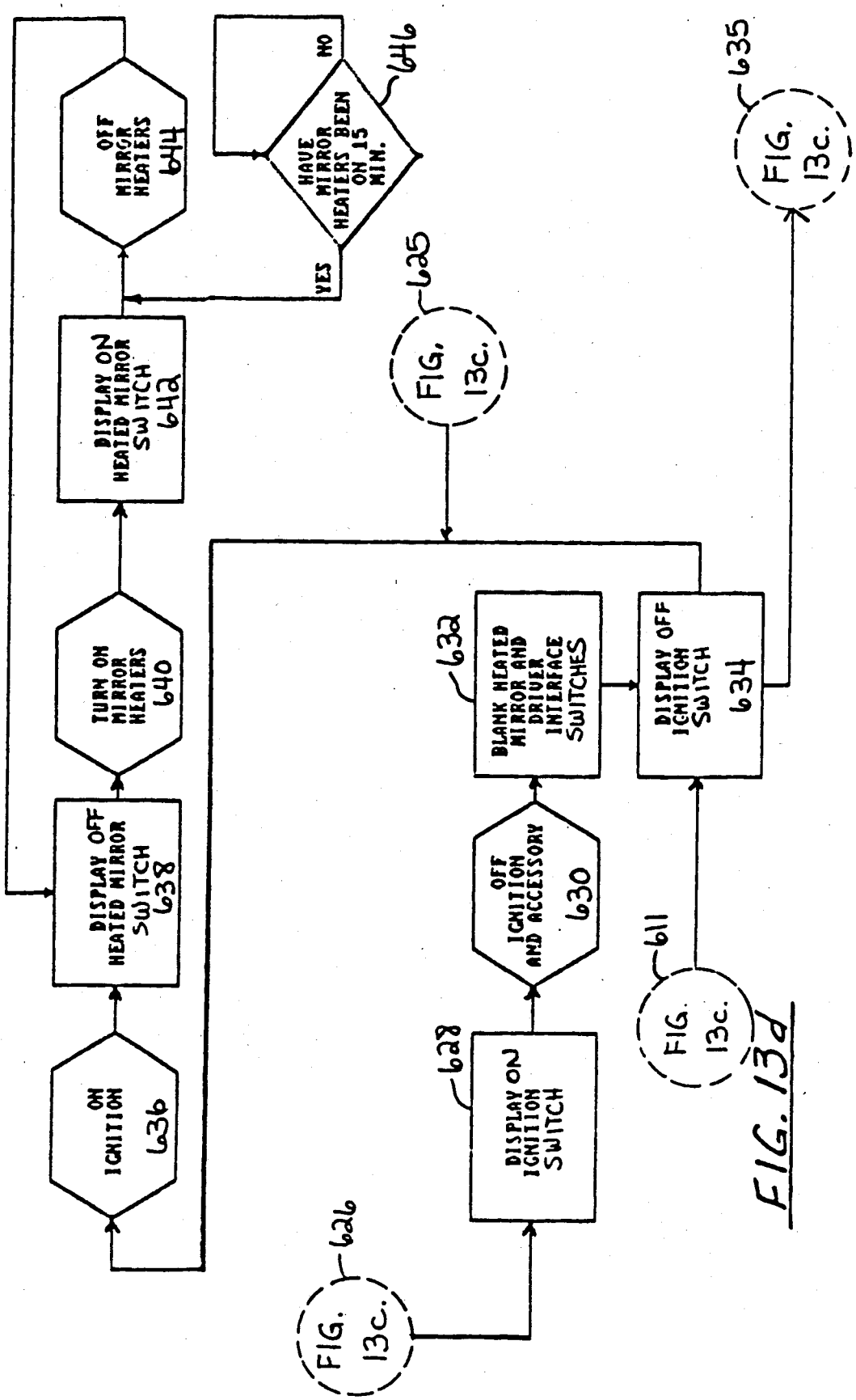

In FIGS. 13a and 13b are shown the primary flow chart associated with Main #2 Menu 272 and are brought up from Main #2 Menu 272 in FIG. 11b. The flow chart extends from FIGS. 13a through 13d. Following activation of other controls switch 270, a test is performed to see whether or not the vehicle engine is running at decision step 560. If the engine is running, start function switch 274 in Main #2 Menu 272 is altered to show that the engine is running at display engine running step 561. If the engine is not running, the display 13 is altered to show start function switch 274 at step 562. Subsequent activation of start function switch 274 by an operator results in calling up the start menu as indicated in start menu step 563.

The engine running test is performed at predetermined intervals any time Main #2 Menu 272 is displayed on the display and information unit 12. When the Main #2 Menu 272 is displayed, the display off spot light function switch 278 is initially presented to the operator as indicated at step 564. Subsequent activation of spot light function switch 278 results in turning on the spot light as indicated at on spot light step 566. In addition to turning on the spot light on the display 13, the display 13 of the display and information unit 12 is altered to display on spot light at step 568. Thereafter, a subsequent touching of spot light function switch 278 results in turning off the spot light as indicated in off spot light step 570 with a subsequent alternation of the display and information unit 12 to indicate the spot light is off at display off spot light step 564.

The display and information unit 12 brings up the fifth wheel light switch 280 in an off condition as indicated at display off fifth wheel light step 572. A subsequent activation of fifth wheel light switch 280 results in turning on the fifth wheel light as indicated at step 574. Thereafter, the display and information unit 12 is altered to show the on status of the fifth wheel light at display on fifth wheel light step 576. A subsequent touching of fifth wheel light function switch 280 results in turning off the fifth wheel light at step 578 and a subsequent alteration of the display and formation unit 12 to show the off status at step 572. Periodically, vehicle speed is tested to determine whether or not it exceeds 20 miles per hour, at decision step 580. If it does, the fifth wheel light is turned off a step 578.

An independent toggle switch operates to override the display and information unit 12 input at decision step 572 and as is indicated at operator fifth wheel light override block step 582.

Continuing through continuation step 572 to FIG. 13b, right and left window function switches 284 and 286 are also displayed on the display and information unit 12 at display up/down right window switch step 584. An operator touch of a switch results in the window being opened or closed as is indicated in momentary on window motor step 586. The left window operation is identical and description of same is omitted here, it being understood that the sequence of steps is the same as for right window operation.

The display and information unit 12 also displays panel light function switch 290 at display panel light step 588. An operator activation of the brighter or dimmer portion of the panel light function switch 290 results in an appropriate adjustment of panel ligt brightness at adjust panel light step 590.

Similarly, both diagnostic function switch 296 and Main #1 Menu 222 function switch 298 are displayed at display main page step 592 and display diagnostic step 594. A subsequent activation to these menus may be made by touching the display and information unit 12 in the appropriate switch area resulting in calling up main menu step 596 and diagnostics menu step 598 as indicated in summon menu steps 595, 597.

Continuing through continuation step 575 to FIG. 13c, the accessory power on function switch 276 is periodically tested at accessory power on step 600 at predetermined intervals. If power is off the display 13 conforms to the off state as shown in display off accessory step 602. A subsequent touch of accessory function switch 276 results in turning on accessory power as indicated in an accessory step. Following the turn on of accessory power in step 604, the display and information unit 12 is altered to show its altered state at display on accessory step 606. Thereafter a touch of accessory function switch 276 results in turning off accessory power at off accessory step 608. The display and information unit 12 is then altered to show the off state at display off accessory step 602.

Returning to decision accessory power on step 600, another branch of the sequence is continued through continuation step 611 in FIG. 13d.

In the alternative, if accessory power is on at decision step 600, the display and information unit 12 displays driver input and state select function switches 293 and 294, as indicated at display driver interface select step 612. Thereafter, vehicle speed is tested at vehicle speed step 614 to determine whether the vehicle speed exceeds 10 miles per hour. In the event that vehicle speed does not exceed 10 miles per hour, a driver's menu is brought up upon activation of switch 293 on the display as indicated in driver menu step 616.

If vehicle speed exceeds 10 miles per hour, the display and information unit 12 is altered to show change state switch 294 at display change state step 618. A subsequent touching of the switch 294 results in scrolling states for an appropriate selection at select state step 620. Thereafter the display is altered at display driver interface state select step 612.

Returning to decision accessory power on step 600, if the accessory power is on, the status of the ignition is periodically tested in ignition power on decision step 622. If the ignition power is not on, display off ignition power step 624 alters the state of the display 13 on the display and information unit 12 to reflect the state of the ignition. This step 624 also follows display on accessory step 606.

Similarly, once the display and information unit 12 is altered by the display off ignition power step 624, the program continues through continuation step 625 in FIG. 13d. Alternate to this path, the ignition being found on at decision step 622, the program goes to FIG. 13d through continuation step 626 and the display and information unit 12 is altered at display on ignition step 628. Thereafter, if ignition function switch 262 is touched, the ignition is turned off as well as the accessory power at off ignition and accessory step 630. Thereafter, display and information unit 12 is altered by blanking heated mirror function switch 292 and driver interface function switch 292 at blank heated mirror and driver interface step 632. Thereafter, the display and information unit 12 is altered at display off ignition step 634. As a result, the program passes through continuation step 635 to FIG. 13c where the display and information unit 12 is altered at display off accessory step 602.

Returning again to decision step 600 in FIG. 13c, if accessory power is not on the program passes through continuation step 611 to FIG. 13d where the display and information unit 12 is altered at display off ignition step 634. At any time display off ignition step 634 is performed, the program also proceeds to on ignition step 636 which indicates that a subsequent touching of ignition function switch 262 will result in turning on the ignition at on ignition step 636. Thereafter, the display and information unit 12 is altered at display off heated mirror step 638. A subsequent touching of the heated mirror function switch 292 will result in turning on the mirror heater of heated mirror step 640. Thereafter, the display and information unit 12 is altered to indicate mirror heater on at display on heated mirror step 642. Subsequently, a touching of the heated mirror function switch 292 results in turning off the mirror heat at off mirror heater step 644. Naturally, this results in performance of display off heated mirror step 638. Mirror heat is subject to time out at decision 15 minute mirror heat step 646. If mirror heat has been activated for less than 15 minutes, the function continues. When the mirror heat has been activated for 15 minutes, it is turned off as indicated by the return to off mirror heater step 644.

Figure 14B:
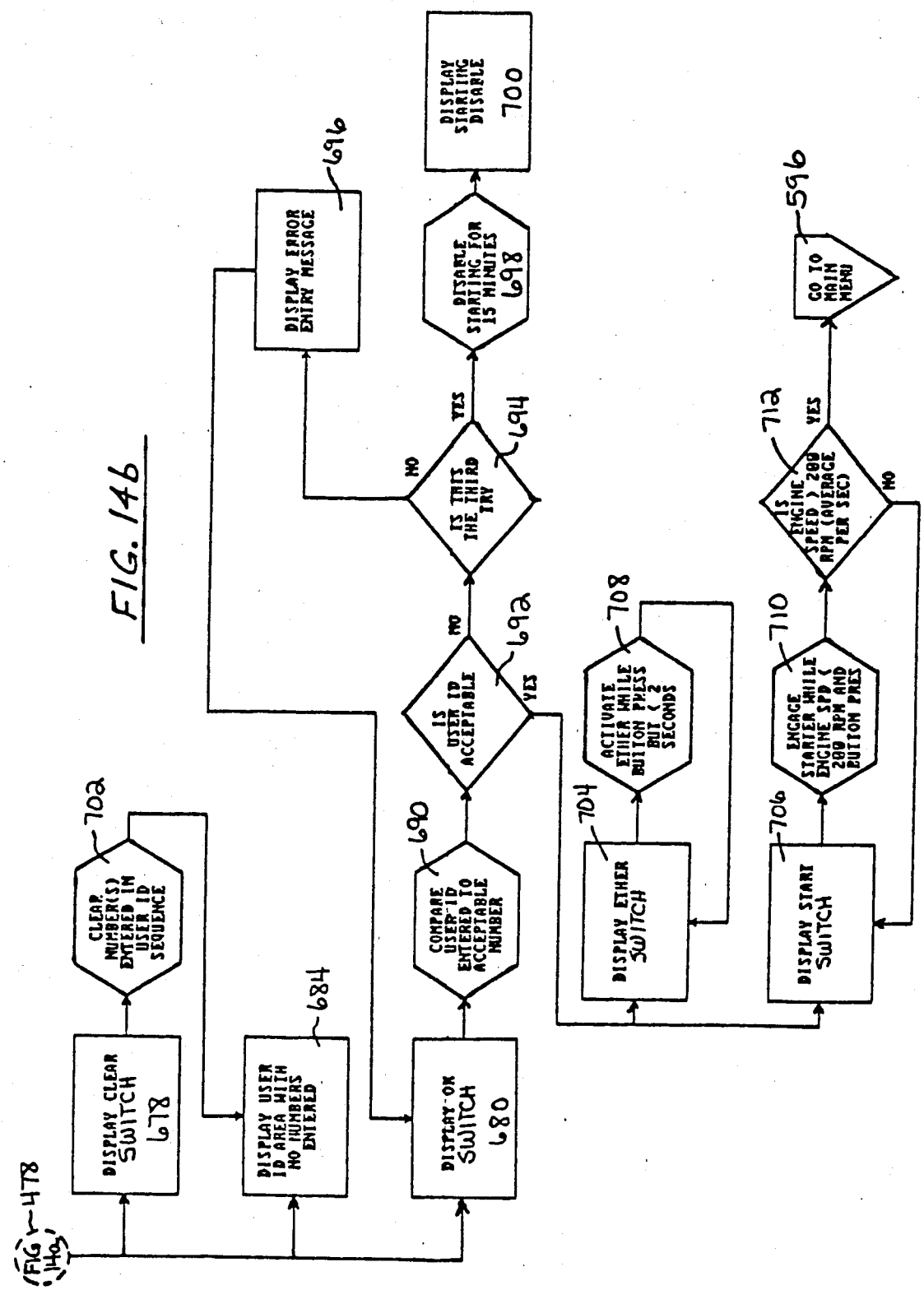

The flow chart for the start program is shown in FIGS. 14a and 14b. This problem immediately brings up numerical key pad function switch 305 including O.K. function switch 308 and clear function switch 310 on menu 300, as indicated on display numeral 1, 648, display numeral 2, 650, display numeral 3, 652, display numeral 5, 654, display numeral 5, 656, display numeral 6, 658, display numeral 7, 670, display numeral 8, 672, display numeral 9, 674, display numeral 10, 676, display clear 678 and display O.K. 680.

Additionally, at step 684, user ID appears. Subsequently, if main function switch 298 is touched, Main #1 Menu 222 and its associated program is run as indicated at main page step 686 in FIG. 14a.

Activation of any of the numeric keys results in the activated key being displayed in the user ID area 312 in the order entered, as indicated at display number in user ID step 688. When an operator is satisfied that the correct number appears and touches O.K. switch 308 brought up at display O.K. step 680, it acts to compare the user ID number to the list of acceptable numbers as indicated at step 690. It acts to determine the acceptability made at decision acceptability step 692. If the user ID is unacceptable, a test is made at decision step 694 to determine if this is the third try in third try step 694. If it is not the third try, an error message (not shown) on start menu 300 is displayed, as indicated at display error entry message step 696. Thereafter, the display O.K. block is indicated on the display and information unit 12. Returning to third try step 694, if this were the third try, then the start menu entries are disabled for 15 minutes as indicated in disable 15 minute step 698. Thereafter, the display and information unit 12 is altered at display starting disable step 700. Following this period of disablement, the menu is brought up fresh at start menu step 478 when 15 minutes has elapsed.

In the event the number displayed in the user ID area 312 is recognized as erroneous by the operator, the operator may touch the clear function switch 310 to re-initiate the program as indicated at clear numbers step 702 following the display clear step 678. This may be done after error entry message step 696 or prior to activating compares step 690.

Returning to user ID acceptable step 692, if the user ID 35 is proper, the display ether switch 704 and display start switch 706 steps are performed to alter the display 13 of the display and information unit 12. Both ether function switch 314 and start function switch 306 act as momentary switches when touched by an operator subject to limitation of this start program. If ether function switch 314 is touched, the ether system is activated as long as it is touched with an upper limit of two seconds to reduce the likelihood of engine malfunction or injury, at activate ether less than two seconds step 708.

Touching of the start function switch 306 will engage the starter while engine revolutions are less than 200 rpm as indicated at engage starter step 710. During this program, engine speed is tested at decision step 712 on a continuous averaging basis. If the average engine speed exceeds 200 rpm for one second, then the main menu program is brought up as indicated at main menu step 596. As long as the average revolutions are less than 200, the start button is displayed at step 706.

The radio menu 526 is accessed from Main #1 Menu 222, as indicated in FIG. 12b in radio menu step 526. This program is shown in FIGS. 15a, 15b, 15c, 15d and 15e. The display and information unit 12 is immediately altered to show the display mode function which is one of the following: display volume mode at step 714, display bass mode at step 716, display treble mode at step 718, or display balance mode at step 720. Actuation of the radio menu 304 in the area of mode function switch 338 results in successive progression through this loop, although the actuation steps have been omitted for brevity. Any one of the mode function switches 340 may be brought up on entry into radio menu program 526. Additionally, display graphic adjustment indicator bar with indicator 344 is brought up at step 722. Then there is display off memory at step 724 and display off station #1 through station #5 at step 726 through 734. Likewise the display up channel step 736 and display down channel step 738 also take place. Similarly, preset channel number 326 is brought up at display present channel number step 740 as is the present band at display FM stereo step 742, if last selected. Additionally, display seek function switch 328 is brought up at display seek step 744. Likewise, display local function switch 346 is brought up at display local step 746, if last selected. And, lastly, display main function switch 298 for returning to Main #1 Menu 222 is brought up at display main function switch step 748.

Continuation steps 526 have been inserted to provide continuity between successive figures. As in other programs it should be recognized that these display functions need not occur in the order shown and occur essentially simultaneously to alter the appearance on the visual display 13 of the display and information unit 12.

Figure 15A:
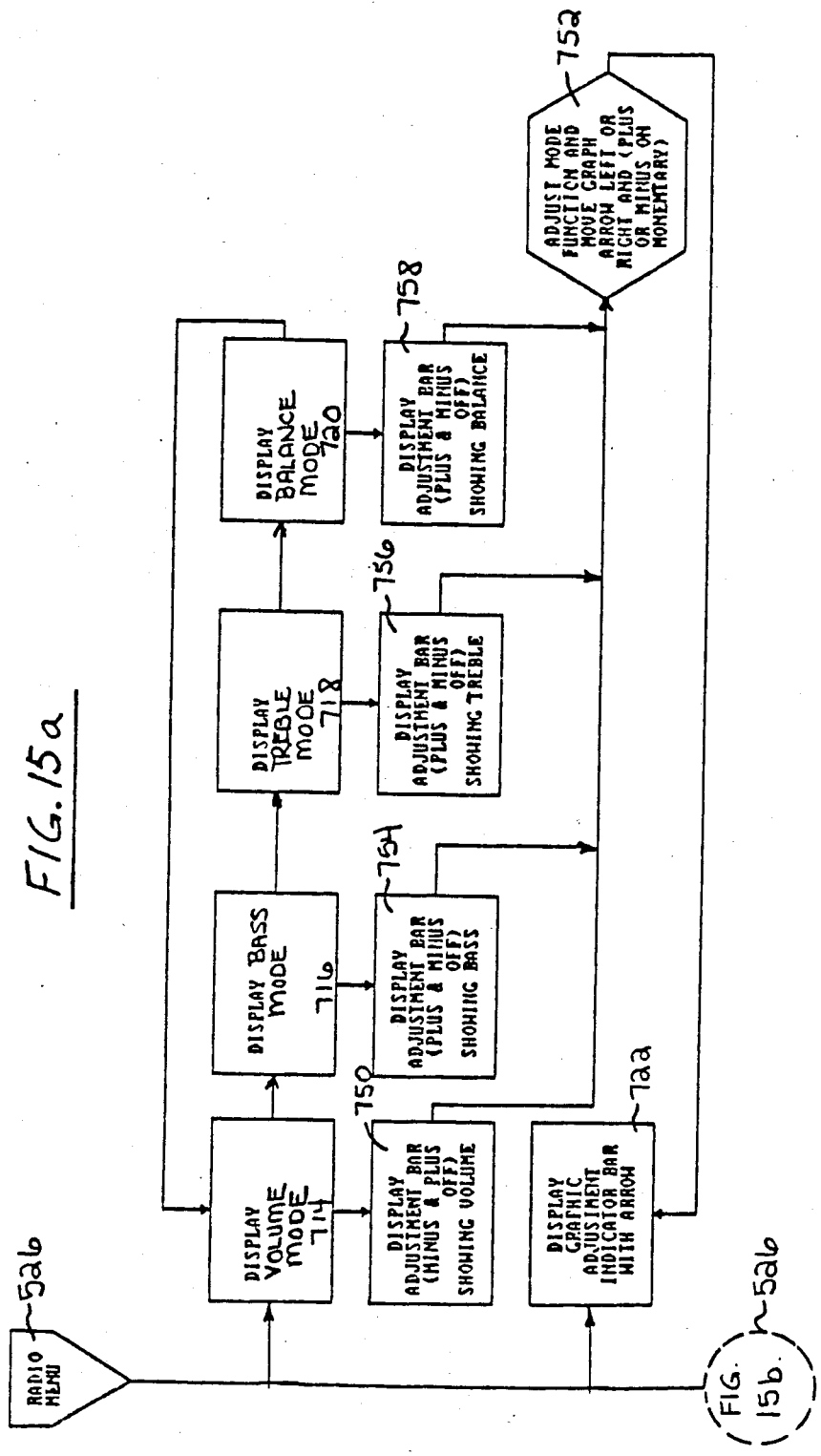

Returning to display volume mode step 714 in FIG. 15a, the appearance of display adjustment bar function switches 340 at display adjustment bar step 750 is part of the mode adjustment function. A subsequent touching of the plus or minus areas of the mode adjustment function switch 340 results in moving arrow 344 in an incremental manner in preselected steps to adjust the function indicated in a manner analogous to a momentary switch. This adjustment and movement is indicated at adjust mode function step 752.

Similarly, the display and information unit 12 is altered in display adjustment steps 754, 756 and 758. As indicated, a subsequent touching has similar results to that discussed for the program path through the display adjustment volume bar step 750.

Following display off memory step 724, a subsequent touching of memory function switch 332 results in activating the memory for a five second interval, as indicated in the path through activate memory step 766. As a result of this activation, the display and information unit 12 is altered and all the station numbers are displayed in a normal rather than a reverse video mode which has previously been indicated as on, at display on memory step 768. The time out function for the five second activation is indicated in five second elapsed step 770. Once the five second period has elapsed, display off memory step 724 alters the display and information unit 12 if not previously toggled off in a manner described hereinafter.

Setting a particular station which is being played in memory is illustrated in program loops following display station #1 at a display step 726 and display station #5 step 734. The other station setting functions are not illustrated in detail. Immediately following display off station #1 step 726, the memory set function actuated at step 766 is tested in memory set active step 772 memory set is active and station #1 function switch 316 is touched by an operator, then station #1 function switch 316 becomes set to the station which is tuned as indicated in set station #1 to present channel step 774. This results in the display and information unit 12 being atlered at display off memory step 724, since the purpose has been achieved.

Returning to memory set active step 772, if the memory set is not active, a subsequent touching of station #1 function switch 316 results in tuning to the last set value for station #1 function switch 316, as indicated at set present channel to station #1 step 776. Thereafter, the display and information unit 12 is altered at step 778.

The similar steps relating to station #5 function switch 324 are identified by the same reference numerals 772-778 in FIG. 15c following display off station #5 step 734. Following the setting of station #5 at set station #5 step to present channel step 774, display off memory step 724 is activated through continuation step 779.

In FIG. 15d following display up channel step 736, a touching of up channel function switch 334 results in scanning through the band in an upward direction at preselected intervals which wraps around to the lower portion of the band, as indicated at increased tuned channel step 780. Similarly, a touching of down function switch 336 area results in decreasing the tuned channel with a wrap around to the upper portion of the band, as indicated at decreased tuned channel step 782.

Following indication of AM stereo function switch 330, display stereo step 742, a touching of stereo function switch 330 results in changing all functions of the radio to the AM band, as indicated at change radio to AM step 784. Thereafter, the display and information unit 12 is altered to show AM function switch 330 as indicated at display AM step 786. A subsequent touching of AM function switch 330 results in changing all radio functions to FM, as indicated at change radio functions to FM step 788.

If an operator should wish to avoid stepping the channel selectors through these predetermined intervals, a touching of the seek scan function switch 328 results in the radio being tuned to an adjacent station which is tunable, as indicated at find next tunable station step 790.

Continuing through continuation step 526 to FIG. 15e following display local function step 746, if local was last selected, a subsequent touching of local function switch 346 results in changing the tuner section as indicated at distant tuning step 792. Thereafter, the display and information unit 12 is altered to show display DX in display DX step 794. Thereafter, touching DX function switch 346 results in a return to local modes which desensitizes the radio as indicated at change local tunings step 796.

A return to Main #1 Menu 222 may be achieved at any time by touching Main #1 Menu function switch 298 which directs the program to "Go To Main Menu" step 596. In any event, if the operator fails to make an entry within 15 seconds of the last entry in radio menu step 526, Main #1 Menu 222 function is activated. Main #1 Menu 222 program step 596 is activated as is indicated at time out decision of 15 second activity step 798.

Figure 16B:
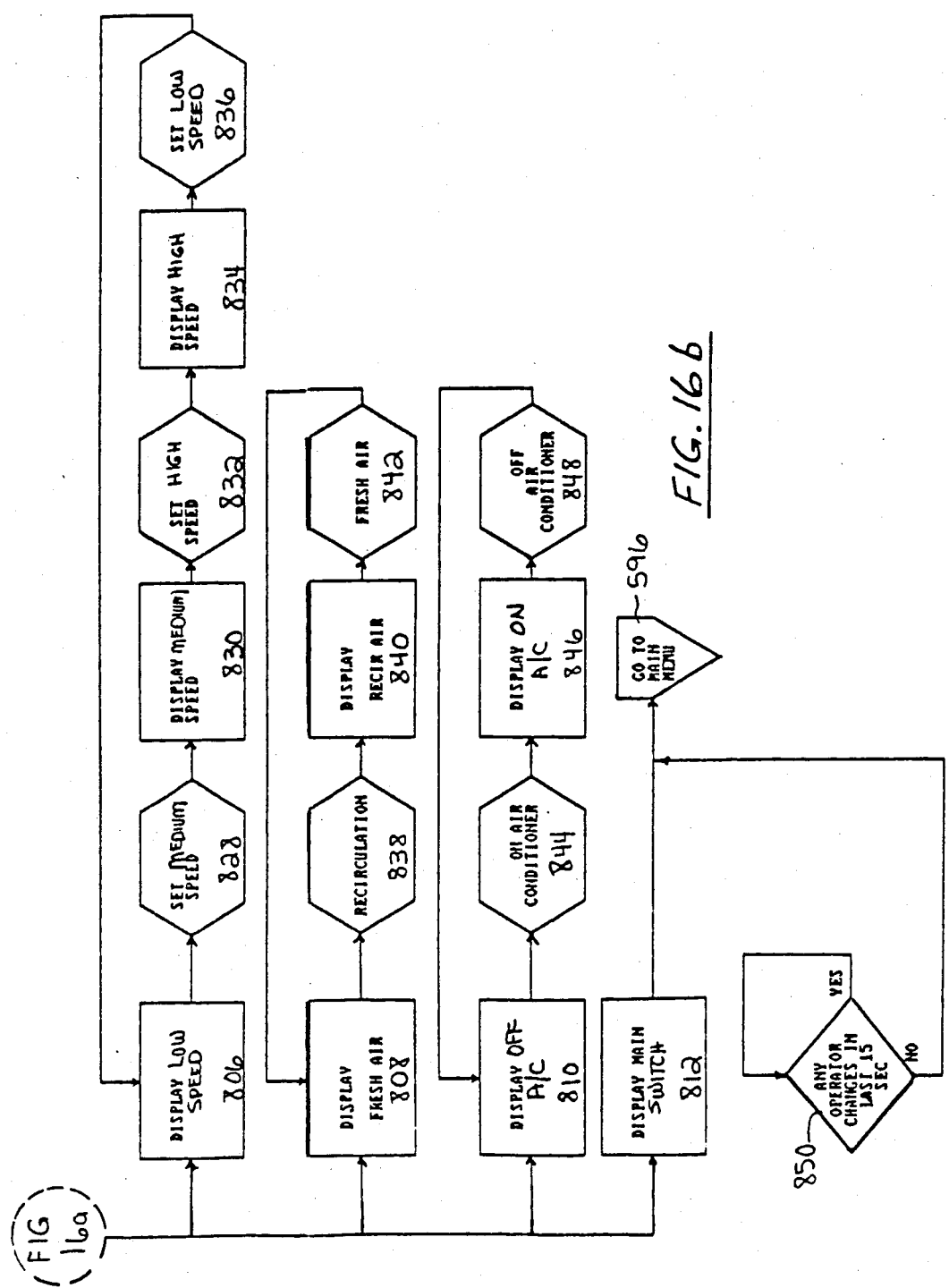

The program associated with the climate menu 302 in FIG. 9 is brought up through cab power up program 425 through climate or HVAC menu step 496 of FIG. 12a. Climate menu step 496 with the associated program is illustrated in FIGS. 16a and 16b. Entry into the climate menu or program 496 results in altering the display and information unit 12 in a number of areas immediately. The temperature control bar 360 with indicator 362 appears as indicated at display temperature control bar step 800. The air outlet control bar 350 with indicator 354 appears as indicated at display air outlet control step 802. The blower function switch 368 appears as indicated at display off blower step 804 which is described further below.

The fan function switch 370 appears as indicated at display low speed step 806. The air function switch 372 appears as indicated at display fresh air step 808. The air conditioner function switch 374 appears as indicated at display off air conditioner step 810. The main menu of function switch 298 also appears as indicated at display main step 812.

A subsequent touching of temperature control function switch 360 results in adjustment of the temperature control to the location touched, as indicated at adjust temperature step 814. This results in altering the position of temperature indicator 362 to the location set at display present setting step 816.

A subsequent touching of air outlet function switch 350 results in adjustment of the air outlet to the position touched, as indicated at adjust air outlet step 818. Thereafter, the display and information unit 12 is altered to display the air outlet function selected as indicated at display present position of air outlet step 820. On bringing up the display outlet control the program also passes to display present position of air outlet step 820.

A subsequent touching of blower function switch 368 results in turning on the blower to the set speed as indicated at on blower step 822. Thereafter, the display and information unit 12 is altered to show that the blower function is on as indicated at display blower on step 824.

A subsequent touching of blower function switch 368 results in turning off the blower as indicated at turn off blower step 826. Thereafter, the display and information unit 12 is altered to display the off state of the blower as indicated at display blower off step 804 where the blower function switch 368 appears. Following the bringing up of display low speed step 806, a subsequent touching of speed function switch 370 results in a medium blower speed as indicated at set medium speed step 828. The display 13 is then altered as indicated at display medium speed step 830. Thereafter, a subsequent touching of the switch area on the display 13 results in a high speed as indicated at set high speed step 832 with a subsequent alteration of the display as indicated at display high speed step 834. A subsequent touching of this switch area results in a return to low speed as indicated in set low speed step 836. Thereafter, the display is altered at display low speed step 806.

A subsequent touching of air function switch 372 results in recirculation of the air output as indicated at recirculation step 838. Thereafter, the display 13 is altered as shown at display recirculation air step 840. Thereafter, a touching of this air function switch 372 results in a return to fresh air as indicated at fresh air step 842. As a result, the display and information unit 12 is altered as indicated at display fresh air step 808.

A subsequent touching of the air conditioner function switch 374 results in turning on the air conditioner as indicated at on air conditioner step 844 and this results in the display 13 being altered at on air conditioner step 846. Thereafter, a touching of this switch area results in turning off the air conditioner as indicated at off air conditioner step 848 with the consequent alteration of the display 13 at display off air conditioner step 810. A touching of main menu function switch 298 results in the program going to the main menu as indicated at main menu step 596. If at any time an operator fails to touch the display and information unit 12 for an interval exceeding 15 seconds, the program passes through the main menu step 596 from time out step 850.

Figure 16C:
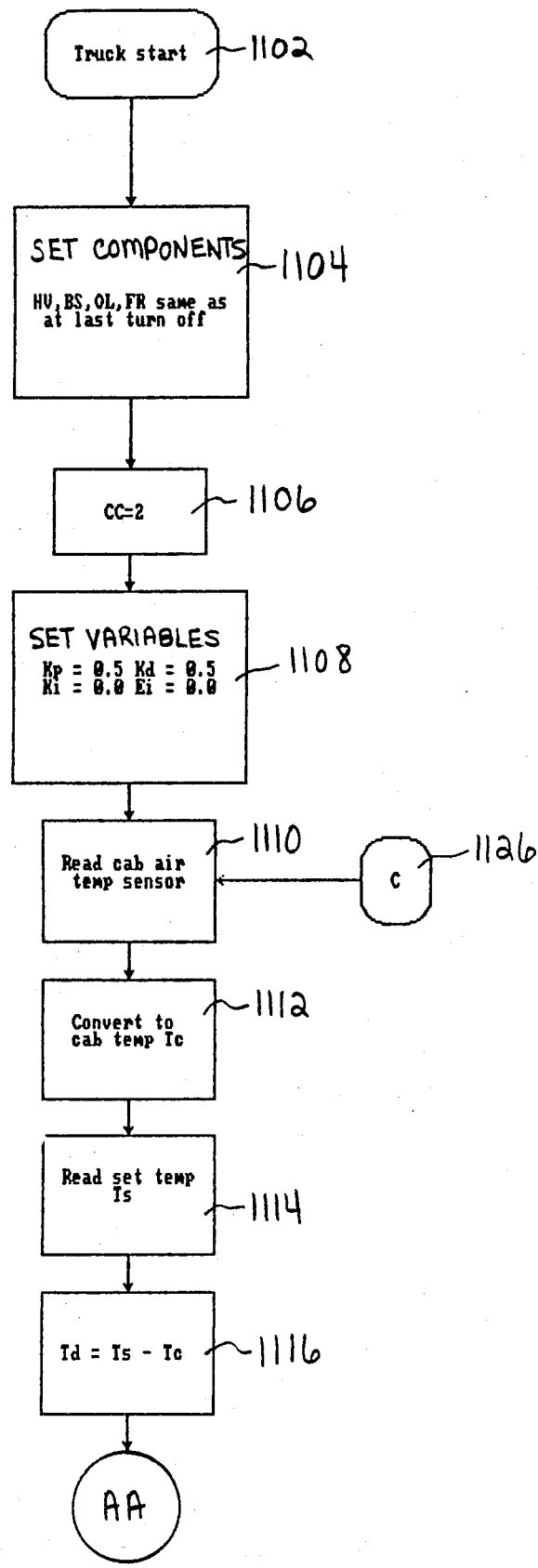
Figure 16D:
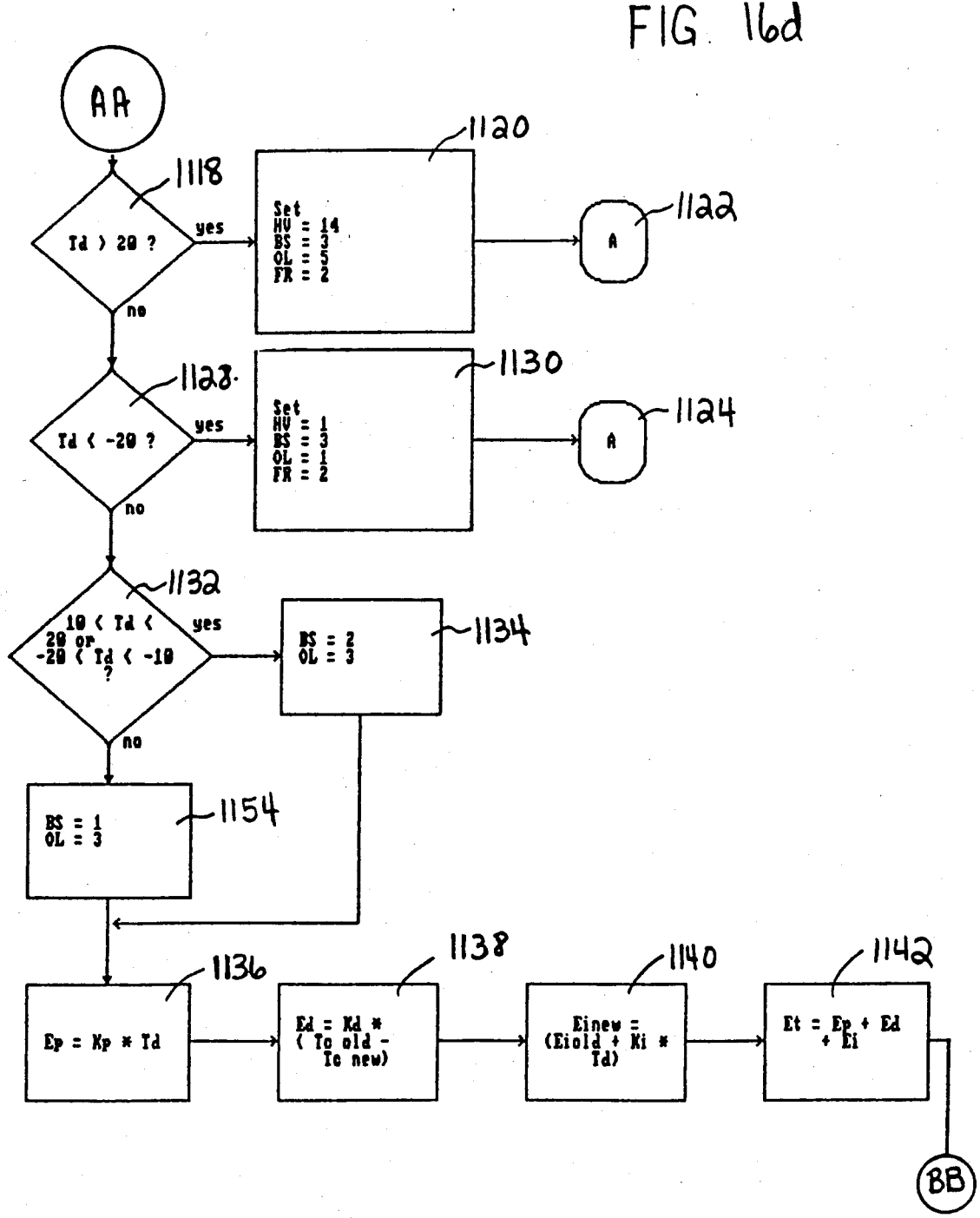
Figure 16E:
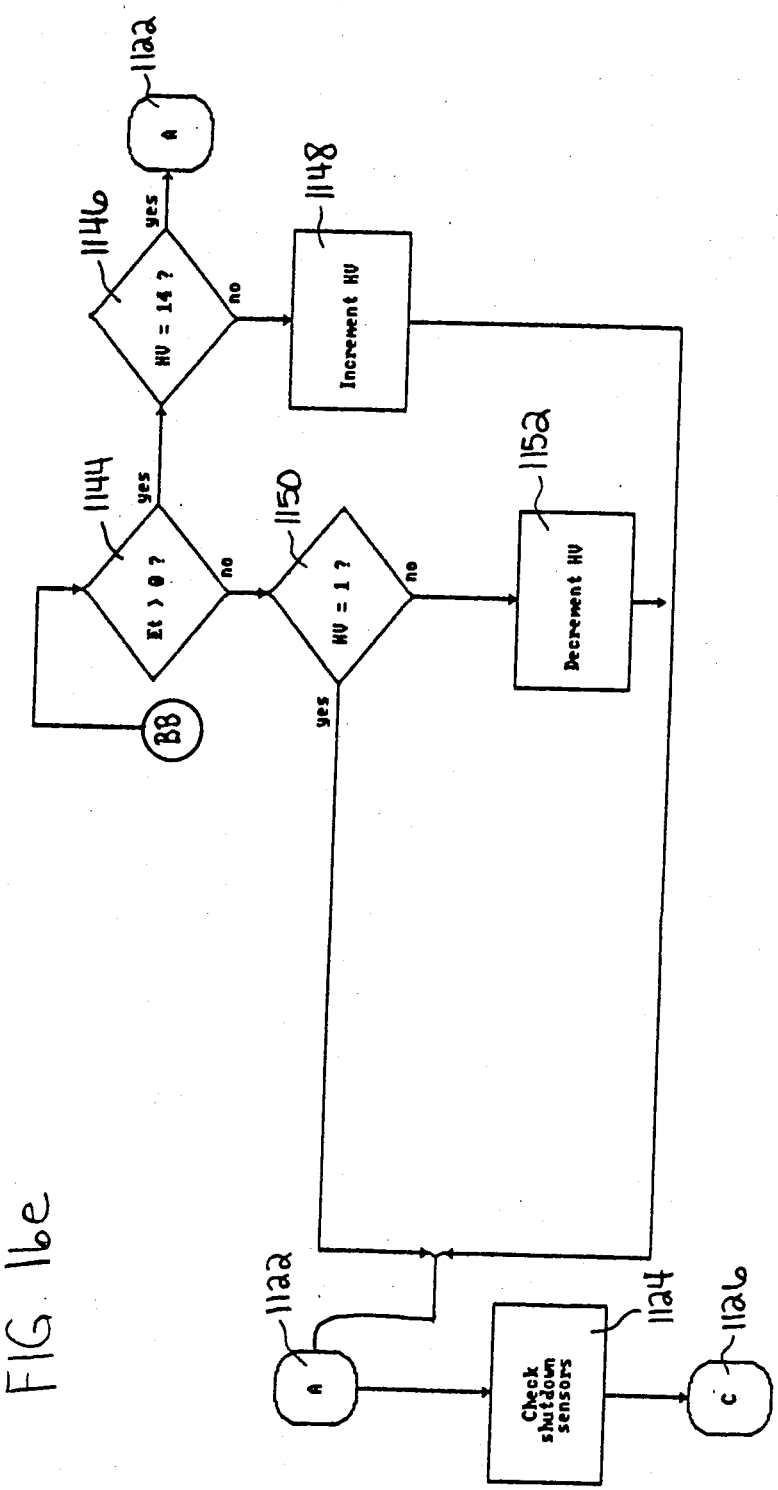

Frequently the operator will not enter into the climate menu previously discussed but instead will remain in the automatic climate control mode which is illustrated in FIGS. 16c-16e. More often than not, the operator on starting the vehicle will prefer to have the climate settings the same as those which were previously in effect when the vehicle was turned off. In that event, as part of the start routine, the program will enter into the autoclimate program 1100. For the sake of brevity, only the skeletal program is illustrated in this Figure but it is well within the skill of the art to flesh out the skeleton for a full program similar to those employed by other microprocessor based automatic climate control programs. The truck start step 1102 is illustrated to commence the autoclimate program 1100. Thereafter, the climate control components are set to their previous values in set component step 1104. These component values are HV for heat valve position, which is variable over a range of 1 through 14 for minimum heat (cooling) to maximum heat 14. BS is for blower speed which ranges between 0 and 3, 0 being off and 3 being maximum speed. OL for output level of the defrost/floor valve being variable to direct output to the floor at 1 or to the inner windshield at 5 for defrosting. FR is for fresh air and may assume a value of 1 or 2. The value 1 opens the fresh air vent. The value 2 shuts the fresh air vent and merely recirculates the interior atmosphere. CC is for the compressor clutch with the value of 1 or 2, 1 being off and 2 being on. Following the setting of all the components excepting the compressor clutch in step 1104. Thereafter the compressor clutch is turned on in clutch step 1106. A number of variables are needed to appropriately weight the algorithm employed to rapidly bring the cab atmosphere to the desired state and which must be changed in accordance with well known principles during the process. These variables include $K_d$, $K_p$, $K_i$. Variable $E_i$ is the initial integral error that must be given a value of zero. During the process of approaching the desired temperature these variables are changed in accordance with well known principles which include the number of times the entire program has looped through the end adjustment loop later discussed. "p" stands for a proportional value, "d" for derivative values, and "i" for integral values. Immediately following the turn on of the compressor clutch in step 1106, these variables are set in set variable step 1108. Immediately thereafter, the cab air temperature sensor is read in read error step 1110. Then, the cab air temperature is converted to cab temperature value TC in step 112. Following the acquisition of cab temperature in step 1112, the set temperature TS is retrieved in step 1114 and the temperature difference TD is calculated in step 1116. The temperature difference is tested in decision step 1118 to see whether or not it is greater than +20. If the value of the temperature difference is greater than +20, then the components are reset in reset components step 1120. Thereafter the program passes through dummy point A labelled 1122 and the shutdown sensors are checked in step 1124. If the sensors do not indicate a shutdown, the program passes through dummy point C labelled 1126 and proceeds to read the cab air temperature sensor again in step 1110. Similarly, TD is tested in step 1128 to see if the temperature difference is less than −20. If the temperature difference is less than −20, the component values are reset in low reset step 1130 and the program then passes through dummy point A labelled 1122 as previously discussed. The purpose of the testing is to ensure that heating or cooling is at maximum values when the temperature differences are large. If the temperature differences are moderate, the program proceeds to step 1132 where TD is tested to see whether or not it is between $\mp 10$ to $\pm 20$ degrees of the desired temperature. If TD is in that range, then some of the component values are reset in moderate reset step 1134. Namely, the blower speed is reduced to medium and the output level is similarly distributed between the floor and windshield level. Thereafter, the error algorithm is performed in steps 1136 through step 1142. In step 1136, the value of Ep is formed by multiplying the present value of Kp by the temperature difference. In step 1138, Ed is calculated equal to the product of the present value Kd and the difference between Tc old Tc new. In step 1140, Ei new is calculated which is the sum of Ei oil and the product between Ki and the temperature difference. Following this, a control variable Et is formed equal to the sum of Ep plus Ed plus Ei in step 1142. Thereafter, the value of Et is tested in step 1144 to see whether or not it is greater than zero. If Et is greater than zero, then the present value of HV is tested to see whether or not it is at a maximum at step 1146. If it is, the program passes through dummy point A, 1122 as previously discussed. In the event the heat value is not at its maximum as tested in step 1146, the heat value is incremented in step 1148 following which the program passes again through dummy point A, 1122. In the event that the value of Et is negative in step 1144, then the heat value is tested to see whether or not it is at its minimum in step 1150. If the heat value is at its minimum, the program again passes through dummy point A, 1122. In the event it is not at its minimum, then the heat value is decremented in step 1152 and thereafter passes through dummy point A, 1122. Returning to step 1122, if the temperature difference is not moderate, then it must be small. When the temperature difference is small, the component values are reset in small reset step 1154, following which the error algorithm is run commencing with the step 1136 as previously discussed.

The program associated with the diagnostic menu 900 in FIG. 9a is brought up by depressing the diagnostic switch 296 which is part of the Main #2 Menu 272 shown in FIG. 6. The diagnostic menu 598 summoned by depression of that switch is shown as part of Main #2 Menu program 272 in summon menu step 597 in FIG. 13b. The programs particularly associated with the diagnostic menu are illustrated in FIG. 17, in particular FIGS. 17a, 17b, 17c and 17d.

FIG. 17a shows an automatic check and record failure program which is not associated with the diagnostic menu 598 as such but is a background task which is a predicate to the display recorded condition functions activated by switches 376–379. In common with other background routines, most of which are not illustrated, automatic check and record program 1200 is periodically run at predetermined intervals, preferably at about 5 minutes when non-priority tasks will not be interfered with. Initiation of this auto check and record program 1200 is shown in step 1202 of FIG. 17a.

Following the completion of the automatic check and record step 1202 the appropriate section of memory is examined to determined whether or not any recorded failures exist in step 1204. If there are no recorded failures, this program terminates until it is again run at a predetermined interval. However, in the event that a failure is found to be recorded in step 1204, the appropriate display recorded condition switch 376–379 begins blinking as shown in step 1206. This allows an operator to display the recorded condition and recheck the portion of the system as explained in detail in connection with FIGS. 17b–17c.

Figure 17C:
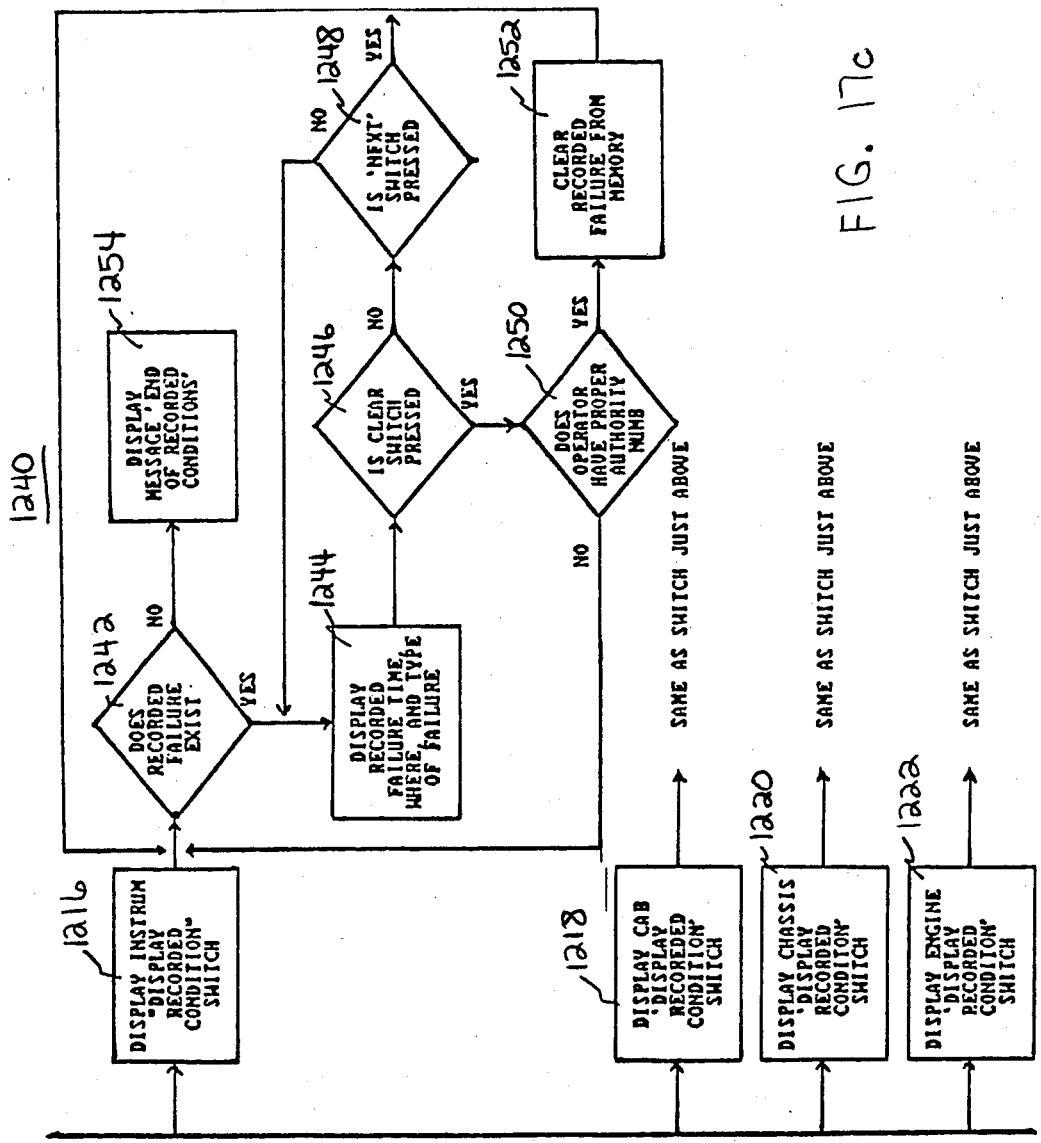
Figure 17D:
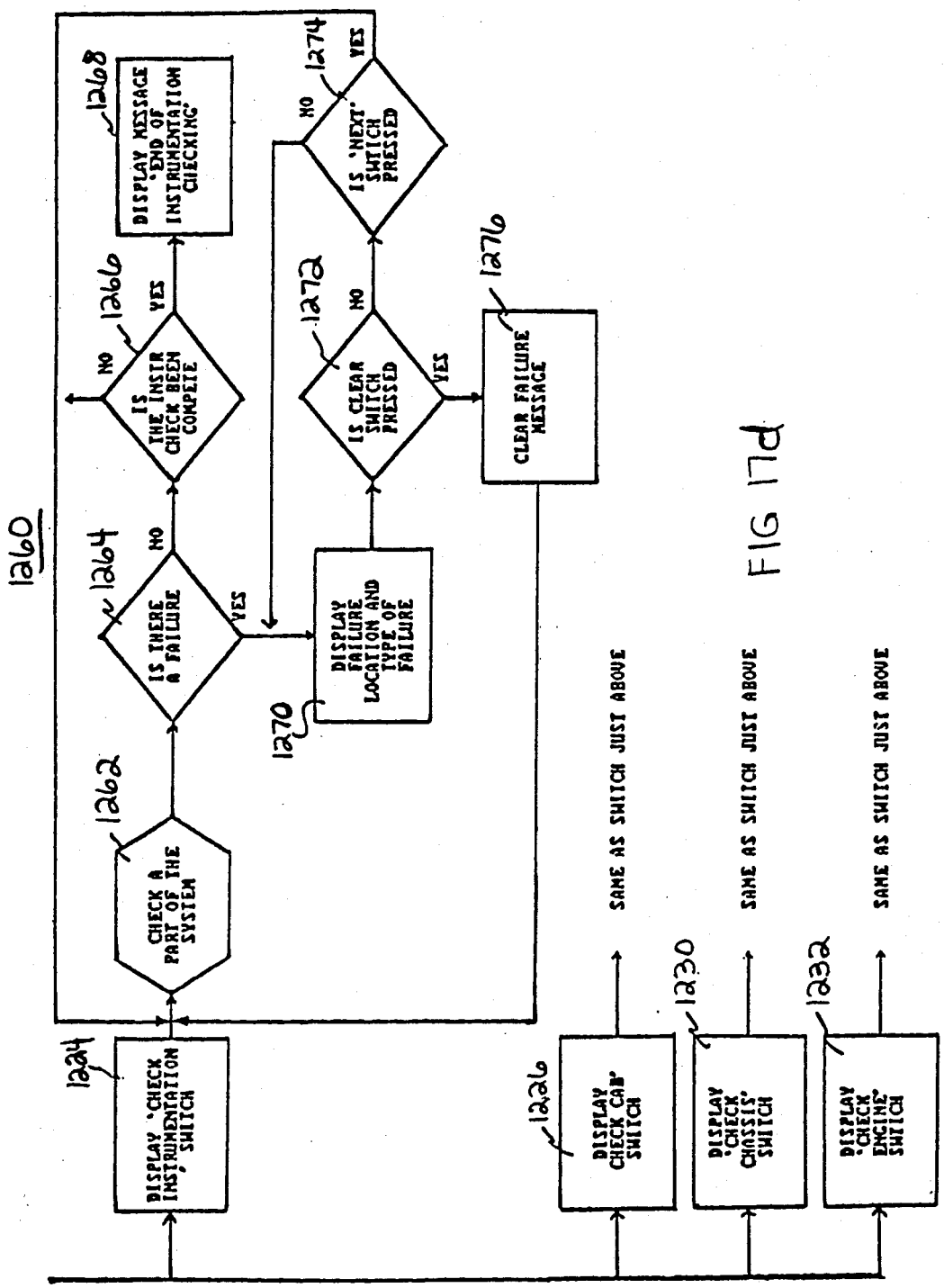

Summoning the diagnostic menu in step 598 immediatley alters the display to bring up the diagnostic menu 375 as is shown in FIGS. 17b–17d in steps: display next switch 1210, display clear switch 1212, display main switch 1214, display instruments 1216, display cab, display recorded condition switch 1218, display chassis, display recorded condition switch 1220, display engine, display recorded condition switch 1222, display check instrumentation switch 1224, display check cab switch 1226, display check chassis switch 1230, and display check engine switch 1232. As previously stated, recorded condition switches 1216–1222 will blink as a result of blink step 1206 is a recorded condition exists.

For brevity, the subroutines for displaying recorded conditions or the cab, chassis and engine have been omitted since the program is similar in overview to that for displaying the recorded condition switch for the instruments 1216 which is shown in FIG. 17c.

Upon activation of a display recorded condition switch, a display sub-program similar to sub program 1240 is executed. First, memory is examined to determine whether or not a recorded failure exists in step 1242. If a recorded failure does exist, the first addressed is displayed in failure message area in Main #1 Menu (FIG. 5) in step 1244. The failure message displayed may only be cleared from display and information unit 12 by activating either clear switch 1246 or next switch 1248. If the clear switch is pressed to clear program similar to that shown in association with start menu 478 in FIG. 14a and 14b is summoned and a similar authorization program executed. Unless an operator has entered a correct number, the failure record is not cleared. This particular subroutine for clearing failure messages has been condensed into the inquiry of proper authority in step 1250. If the operator lacks proper authority, the program returns to its start in step 1242. If the operator has the proper authority, then the failure message is cleared from memory in step 1252 before returning to step 1242. If the clear switch is not pressed but the next switch is pressed in step 1248, then the program returns to block 1242 where it goes to the next address to determine whether or not another message exists.

Check program 1260 is shown in detail in FIG. 17d. Similarly to display subprogram 1240, this program is employed in connection with display check instrumentation 1224, display check cab switch 1226, display check chassis switch 1230 and display check engine switch 1232. However, there are a number of differences between the display recorded condition program 1240 and check program 1260. The foremost among them is that there is no need to check memory and that there is no authority subroutine similar to program step 1250 in the display recorded condition program 1240 in the check condition program 1260. Following the performance of one of the display check steps 1124 through 1232, the step of check a part of the system 1262 is performed. This step may substantially vary from one iteration to the next, depending on which part of the system is being checked and which system is being checked. As may be readily inferred when one of the smart switch outputs, for example, right high beam light 82, is being checked, the normalcy of the smart switch operation and the interrogation routines are employed as earlier discussed. However, other parts of a system check are performed to see whether or not the particular part is functioning within predetermined limits or whether an auxiliary system has a recorded failure independently of the operation of these routines. In any case, following the check of part of a system step 1262, a determination is made as to whether there is a failure in decision step 1264. If there is a failure, the failure and related information is displayed in display step 1270. Thereafter, if the clear switch is pressed as is determined in step 1272, the failure message is cleared in step 1276 and the program proceeds to the first step of check part of the system step 1262. In the event the clear switch button has not been pressed as determined in step 1272, the program next determines whether or not the next switch has been pressed in step 1274. If it has, the program again returns to its first step check part of the system step 1262. If not, the program loops back and continues to display the failure and related information as shown in step 1270. If there has been no failure as a part of the step 1264, then the program determines whether or not the instrument check has been completed in complete step 1266. In the event the check has noted been completed for the system being checked, then the program returns to the first step of check a part of the system step 1262. In the event that all the parts of the system have been checked, then the program proceeds to display an appropriate message in display end of instrument checking step 1268. Given the nature of the subprograms 1240 and 1260 to display information concerning failures to both operator and maintenance persons, the automatic time out return to main menu operative for most of the other programs is not operative once these subprograms have begun. The only exit from these programs is provided by the clear 1252 and next 1248 switches.

Figure 18:
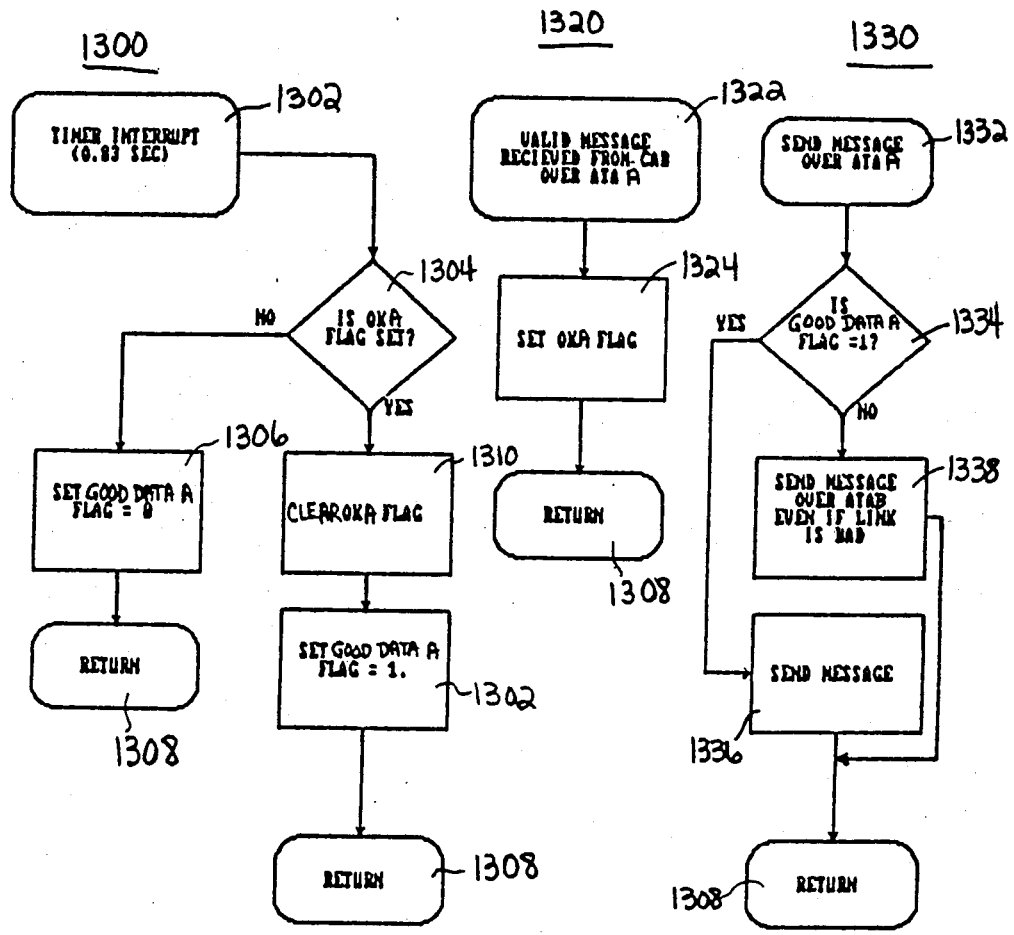
FIG. 18 shows flow charts for three routines associated with the communications over the public and provide data links.

FIG. 18 displays three routines associated with the redundancy feature between ATA public data link 18a and private serial communication link 18b. These programs are run in conjunction with communications over data links 18a and 18b. Since the programs employed for data link 18bare the same as those for data link 18a, only the programs associated with 18a are shown. Each program involves the utilization of such things as watchdog timers and parity checks to determine the normalcy of the operation of the links involved and if an abnormal condition is observed, one or more flags are set to appropriately compensate for the abnormal condition.

Interrupt program 1300 begins with an interrupt step 30 1302. The step is run approximately every 830 milliseconds. Thereafter, the OK A flag status is determined in OK step 1304. If the OK flag should not be set, then the program continues to set the good data flag to zero in good data step 1306. Thereafter, the program returns to the foreground and continues with whatever task was previously being run in return step 1308. Essentially, the diagnostics routine associated with the communications over the data links will examine the good data flag and display an error condition in the event the flag is set to zero as is later set forth. In the event the OK flag was set in step 1304, then the OK flag is cleared in step 1310. Thereafter, the good data flag is set to 1 in step 1302 and the program returns to the foreground task being run in step 1308.

Received program 1320 is run on receipt of a valid message being received over the data link. It commences with receipt of a valid message in step 1322. Thereafter the OK flag is set in step 1324 and the program returns to whatever task is being run in step 1308. The send program 1330 is run at any time a message is to be transmitted over the data link. It commences with send message step 1332. Thereafter, a determination is made as to whether or not the good data flag is set in step 1334. If the flag is equal to 1, indicating that conditions are normal, then the message is sent in step 1336. Thereafter, the program returns to whatever is being run in foregound in return step 1308. However, in the event the good data flag is not equal to 1 in step 1334 and an abnormal condition exists, then the message is sent over the other link although the other link may not have a good data flag equal to 1 in send message over other link in step 1338. Thereafter, the program returns to the foreground task previously run in return step 1308. These programs, shown on FIG. 18, attempts to ensure that data is exchanged over an operative link by the send data program 1330 regardless of whether cab controller 14 or chassis controller 16 are about to transmit. An attempt is also made to ensure that the respective receiving controller monitors the quality of the data received in received program 1320. Additionally, whether transmitting or receiving, periodic checks of the state of the data links are made in interrupt program 1300. As those skilled in the art will readily recognize, some of the program steps described may be interchanged in order and those shown as simultaneous may be delayed from one to another without adversely affecting the performance of the system.

From the foregoing description it will be apparent that modifications can be made to the ATA multiplexed electrical wiring system 10 with driver interface and power switching of the present invention without departing from the teachings of the invention.

Also, it will be appreciated that the invention has a number of advantages, some of which have been described above and others of which are inherent in the invention. For example, the microprocessor electrical system 10 of the present invention provides the following advantages of prior systems:
1. Eliminate 90-95% of the cab-to-chassis wiring circuits and their associated connections;
2. Eliminate 70-80% of the required cab current of today's vehicle;
3. Reduce the cab feed circuit size;
4. Reduce the voltage drop by eliminating 20-30 ft. of cable in each circuit returning to the chassis (lights, air dryers, starter solenoid, etc.);
5. Reduce vehicle weight;
6. Reduce-in-plant installation labor;
7. Eliminate cab switch control panel and mechanical switches;
8. Compatibile with ATA/SAE serial data link;
9. Compatible with a TRUCK OPERATION MONITORING SYSTEM as disclosed in U.S. application Ser. No. 833,298 filed Feb. 25, 1986.

Accordingly, the scope of the invention is only to be limited as necessitated by the accompanying claims.

We claim:

1. A land vehicle electrical system including a battery, battery charging means for energizing the battery, controller means which may assume a number of controller states for regulating the flow of electricity to driven devices, sensor means for monitoring various parameters of operation of the land vehicle and land vehicle components, input means for affecting the controller state and for regulating the flow of electricity to driven devices, and display means for providing information concerning the operation of the land vehicle and land vehicle components, said controller means including a cab controller, a chassis controller and controller memory distributed between said cab controller and said chassis controller, said cab controller including a cab memory, a cab microprocessor to which chassis functions are assigned, cab sensor input means for sensing signals from said sensor means, cab output means for affecting driven devices in accordance with the cab controller state, and cab communication means for receiving and transmitting digital signals, said chassis controller including a chassis memory, a chassis microprocessor to which chassis functions are assigned, chassis sensor input means for sensing signals from said sensor means, chassis output means for affecting driven devices in accordance with the chassis controller state, and chassis communication means for receiving and transmitting digital signals, said chassis controller having substantially identical components as said cab controller; a controller bus coupled between said respective communication means of said cab controller and said chassis controller for exchanging digital data among said system components, said sensor means selectively including analog, switched digital sensors selectively coupled to the respective sensor input means of said cab controller and said chassis controller, said driven devices being operatively connected to the output means of said cab controller, said output means of said chassis controller, and to said input means of said controller means.

2. The system of claim 1 wherein said input means includes a plurality of mechanical switches for affecting the driven devices and selectively presenting a signal to said controller means through dedicated parallel inputs.

3. The system of claim 2 wherein said input means includes a serial device for presenting a signal to said controller means through a serial input; and said display means includes an alpha-numeric readout to provide information concerning the operation of the land vehicle and land vehicle components to a land vehicle operator.

4. The system of claim 1 wherein said display means displays alpha-numeric characters which are readily readable in ambient light levels.

5. The system of claim 4 wherein said display means is a liquid crystal display.

6. The system of claim 4 wherein said display means is electro-luminescent.

7. The system of claim 4 wherein said display means is at least partially integrated with said input means in a display and information unit which provides information in menu form and accepts an operator input provided by approaching a portion of a displayed menu.

8. The system of claim 7 wherein said input means acts in response to a change in capacitance of the portion of the displayed menu.

9. The system of claim 7 wherein said input means acts in response to a change in resistance of the portion of the displayed menu.

10. The system of claim 6 wherein said display means has a brightness level exceeding 100 foot lamberts.

11. The system of claim 10 wherein said display means is at least partially integrated with said input means in a display and information unit which provides information in menu form and accepts an operator input provided by touching a portion of a displayed menu.

12. The system of claim 1 wherein said controller bus includes a first bus and a second bus which are selectively redundant for selected information in the event of a transmission failure of one of the buses.

13. The system of claim 12 wherein said first bus is electrical and conveys electrical signals; said second bus is a fibre optic link and conveys light signals; and said respective communication means of said cab controller and said chassis controller have electro-optical conversion means in operative connection with said second bus.

14. The system of claim 1 wherein said controller bus includes a public bus operating in conformity with industrial standards and a private bus.

15. The system of claim 14 wherein said public bus and said private bus are selectively redundant for selected information in the event of a transmission failure of one of the buses.

16. The system of claim 15 wherein said private bus is a fibre optic link and conveys light signals; and said respective communication means of said cab controller and said chassis controller have electrooptical conversion means in operative connection with said private bus.

17. The system of claim 1 further including a plurality of device drivers operatively and selectively interconnected with said output means of said cab controller and said chassis controller for regulating the flow of electricity to said driven devices.

18. The system of claim 17 further including freewheeling diodes which protect said device drivers against a rise in voltage appearing at the output of a device driver which could arise from interrupting the flow of electricity to an inductive driven device.

19. The system of claim 17 wherein said device drivers include solid state device drivers which may be selectively employed individually and in parallel to regulate the flow of electricity to said driven devices.

20. The system of claim 19 wherein one or more of said solid state device drivers directly regulates the flow of electricity in a starter solenoid of a relatively large displacement diesel engine in the land vehicle.

21. The system of claim 19 wherein said solid state device drivers include logic level controlled power switches selectively within said output means of said cab controller and said chassis controller.

22. The system of claim 21 wherein said power switches further include an interrogation terminal as well as other terminals adapted to regulate the flow of electricity to driven devices, the interrogation and other terminals, when appropriately energized, providing status information concerning the normalcy of the function of said power switches in conjunction with said driven devices and providing information on abnormal conditions of an open conduction path to said driven devices, a shorted conduction path to said driven devices, and a malfunction of said power switch; and said cab microprocessor and said chassis microprocessor periodically elicit status information which is retained in said controller memory.

23. The system of claim 1 further including a cab regulator in said cab controller for conditioning the power drawn from said battery supplying power to said cab controller and including a supply switch operatively connected to said controller bus and an output of said cab microprocessor, said supply switch being responsive to the presence of a signal on said control bus and the output of said cab microprocessor to supply power to said cab controller and, in the absence of a signal, interrupting the supply of power to said cab controller; a chassis regulator in said chassis controller for conditioning the power drawn from said battery supplying power to said chassis controller including a supply switch operatively connected to said controller bus and an output of said chassis microprocessor, said supply switch being responsive to the presence of a signal on said control bus and the output of said chassis microprocessor to supply power to said chassis controller and, in the absence of a signal, interrupting the supply of power to said chassis controller; and said input means includes a connection selectively to said supply switch in said cab controller and said chassis controller to initiate the supply of power.

24. The system of claim 23 further including a plurality of isolation diodes interposed between said supply switches and signal lines conveying the signals to which said supply switches are responsive; said supply switches include means for maintaining the supply of power to their associated controllers for a predetermined time after a signal is no longer present; and said input means include mechanical input switches which are connected to semiconductor input switches, said semiconductor switches in turn being connected to an associated isolation diode.

25. The system of claim 1 wherein said memory of said controller means stores a plurality of display menus including a main menu which in the absence of an ongoing interaction between said input means and said controller for a predetermined periods is displayed on said display means, and which selectively provides information to a land vehicle operator concerning the manner in which other menus will be displayed on said display means by operator activation of said input means.

26. The system of claim 25 wherein the plurality of means includes at least one of the following: a start menu to guide the operator in starting an engine of the land vehicle; a radio menu to guide the operator in affecting a radio of the land vehicle; a climate control menu to guide the operator in affecting components of the land vehicle which provide heated and cooled air to a compartment in which the operator occupies; and a diagnostic menu to guide the operator in selectively determining whether said land vehicle and components are operating properly and whether the land vehicle and components have properly operated in the past.

27. The system of claim 25 wherein said plurality of menus selectively display information concerning the present operation of the land vehicle and components.

28. The system of claim 1 wherein said land vehicle is a truck which includes at least one of a plurality of truck components; and said controller memory contains information as to which truck components have been included among the plurality of truck components with appropriate information concerning the particular operation of selected components.

29. The system of claim 1 wherein said sensor means include, a plurality of cab analog sensors connected to said cab sensor input means for providing an analog signal conveying the sensed quantity; a plurality of cab switches connected to said cab sensor input means for providing a status signal conveying the occurrence of a sensed state; a plurality of chassis analog sensors connected to said chassis sensor input means for providing an analog signal conveying the sensed quantity; and a plurality of chassis switches connected to said chassis sensor input means for providing a status signal conveying the occurrence of a sensed state.

30. An electrical system controller for a land vehicle comprising: a controller microprocessor operatively connected to other controller elements; a controller memory operatively connected to said controller microprocessor; controller sensor input means operatively connected to said controller microprocessor; a plurality of controller device drivers, each of which has an on state and an off state operatively connected to said controller microprocessor for receiving logic level signals from said controller microprocessor and altering the device driver state between on and off in response to the logic level signals; controller input means operatively connected to said controller microprocessor; analog sensor means connected to said controller sensor input means for providing analog information concerning a sensed quantity; digital sensor means connected to said controller sensor input means for providing a state status signal conveying the occurrence of a sensed state; a plurality of driven devices connected to at least one of said controller device drivers; and display means operationally connected to said controller microprocessor for providing information concerning the operation of the land vehicle and land vehicle components.

31. The system of claim 30 further including freewheeling diodes which protect controller device drivers against a rise in voltage appearing at the output of a controller device driver which could arise from interrupting the flow of electricity to an inductive driven device.

32. The system of claim 30 wherein said controller device drivers include solid state device drivers which may be selectively employed individually and in parallel to regulate the flow of electricity to said driven devices.

33. The system of claim 32 wherein one or more of said solid state device drivers directly regulates the flow of electricity in a starter solenoid of a relatively large displacement diesel engine in the land vehicle.

34. The system of claim 32 wherein said solid state device drivers further include an interrogation terminal as well as other terminals adapted to regulate the flow of electricity to driven devices, the interrogation and other terminals when appropriately energized providing status information concerning the normalcy of the function of said solid state device drivers in conjunction with said driven devices and providing abnormal conditions of an open conduction path to said driven devices, a shorted conduction path to said driven devices, and a malfunction of said power switch; and said controller microprocessor being operable to periodically and appropriately energize the terminals of said power switches in the output means of the controller to elicit status information which is retained in said controller memory.

35. The system of claim 30 further including a controller regulator for conditioning the power drawn from said battery supplying power to said controller including a supply switch selectively and operatively connected to said controller input means and said controller microprocessor, said supply switch being responsive to the presence of a signal in said controller input means and said controller microprocessor to supply power to said controller microprocessor and, in the absence of a signal, interrupting the supply of power to said controller microprocessor and associated components; and said input means includes a connection to said supply switch in said controller regulator to initiate the supply of power.

36. The system of claim 35 further including a plurality of isolation diodes interposed between said supply switch and signal lines conveying the signals to which said supply switch is responsive; said supply switch including means for maintaining the supply of power to the controller for a predetermined time after a signal is no longer present; and said input means including mechanical input switches which are connected to semiconductor input switches, said semiconductor switches in turn being connected to an associated isolation diode.

37. The system of claim 30 wherein said controller memory stores a plurality of display menus including a main menu which in the absence of an ongoing interaction between said controller input means and said controller microprocessor for a predetermined period is displayed on said display means, and which selectively provides information to a land vehicle operator concerning the manner in which other menus will be displayed on said display means by operator activation of said controller input means.

38. The system of claim 37 wherein the plurality of menus includes at least one of the following: a start menu to guide the operator in starting an engine of the land vehicle; a radio menu to guide the operator in operating a radio of the land vehicle; a climate control menu to guide the operator in affecting components of the land vehicle which provide heated and cooled air to a compartment which the operator occupies; and a diagnostic menu to guide the operator in selectively determining whether the land vehicle and components are operating properly and whether the land vehicle and components have properly operated in the past.

39. The system of claim 38 wherein said plurality of menus selectively display information concerning the present operation of the land vehicle and components.

40. The system of claim 37 wherein the plurality of menus includes a diagnostic menu to guide the operator in selectively determining whether said land vehicle and components are operating properly and whether the land vehicle and components have properly operated in the past; said solid state device drivers further include an interrogation terminal as well as other terminals adapted to regulate the flow of electricity to driven devices, the interrogation and other terminals when appropriately energized providing status information concerning the normalcy of the function of said solid state device drivers in conjunction with said driven devices and providing information of abnormal conditions of an open conduction path to said driven devices, a shorted conduction path to said driven devices, and a malfunction of said power switch; and said controller microprocessor periodically and appropriately energizes the terminals of said power switches in the output means of the controller to elicit status information which is retained in said controller memory for selective display on said diagnostic menu.

41. The system of claim 30 wherein said land vehicle is a truck which includes at least one of a plurality of truck components; and said controller memory contains information as to which truck components have been included among the plurality of truck components with appropriate information concerning the particular operation of selected components.

42. The system of claim 30 wherein said display means displays alpha-numeric characters which are readily readable in ambient light levels.

43. The system of claim 42 wherein said display means is a liquid crystal display.

44. The system of claim 42 wherein said display means is electro-luminescent.

45. The system of claim 42 wherein said display means is at least partially integrated with said input means in a display and information unit which provides information in menu form and accepts an operator input provided by approaching a portion of a displayed menu.

46. The system of claim 45 wherein said input means acts in response to a change in capacitance of the portion of the displayed menu.

47. The system of claim 45 wherein said input means acts in response to a change in resistance of the portion of the displayed menu.

48. The system of claim 45 wherein said display means has a brightness level exceeding 100 foot lamberts.

49. The system of claim 48 wherein said display means is at least partially integrated with said input means in a display and information unit which provides information in menu form and accepts an operator input provided by touching a portion of a displayed.

50. In a land vehicle electrical system the improvement comprising a cab controller and a chassis controller each comprising substantially the same microprocessor and a multiplexing system coupling said controller together.

51. In a land vehicle electrical system the improvement comprising a controller including a microprocessor having analog inputs and sensors coupled directly into said analog inputs.

52. In a land vehicle electrical system the improvement comprising a controller including a microprocessor having analog inputs and smart switches connected to said analog inputs and having means for communicating to said microprocessor the status of said switch, open circuit and close circuit, and said microprocessor having means for controlling the status of said switches.

53. In a land vehicle electrical system the improvement comprising a cab controller including a microprocessor system, a chassis controller including a microprocessor system, and a public serial data link and a private data link conforming to industrial standards.

54. In a land vehicle electrical system the improvement comprising a cab controller including a microprocessor system comprising a microprocessor, a visual display coupled to said microprocessor and said visual display having touch sensitive switch function areas on the display and means actuated by touching various switch function areas for calling up different menus and different control panels on the visual display.

55. In a land vehicle electrical system the improvement comprising cab controller including a microprocessor system, said microprocessor system including means for effecting a diagnostic evaluation of various instruments and sensors coupled directly or indirectly to said cab controller and indicating to the cab controller if an instrument or sensor is nonfunctioning.

56. In a land vehicle electrical system the improvement comprising cab controller including a microprocessor system, said microprocessor system including means for effecting a diagnostic evaluation of various instruments and sensors coupled directly or indirectly to said cab controller and indicating to the cab controller if an instrument or sensor is out of range.

* * * * *

EX PARTE REEXAMINATION CERTIFICATE (6041st)
United States Patent
Windle et al.

(10) Number: US 4,809,177 C1
(45) Certificate Issued: Dec. 11, 2007

(54) MULTIPLEXED ELECTRICAL WIRING SYSTEM FOR A TRUCK INCLUDING DRIVER INTERFACE AND POWER SWITCHING

(75) Inventors: W. Eric Windle, Antwerp, OH (US); James W. Kruse, Fort Wayne, IN (US)

(73) Assignee: International Truck Intellectual Property Company, LLC, Warrenville, IL (US)

Reexamination Request:
No. 90/007,196, Sep. 9, 2004

Reexamination Certificate for:
Patent No.: 4,809,177
Issued: Feb. 28, 1989
Appl. No.: 07/085,661
Filed: Aug. 14, 1987

(51) Int. Cl.
*G06F 15/04* (2006.01)
*G06F 17/00*

(52) U.S. Cl. .............. 701/1; 701/29; 701/36; 180/170

(58) Field of Classification Search .............. None
See application file for complete search history.

(56) References Cited

U.S. PATENT DOCUMENTS

| | | |
|---|---|---|
| 3,553,475 A | 1/1971 | Fee |
| 3,651,454 A | 3/1972 | Venema et al. |
| 3,683,197 A | 8/1972 | Lves |
| 3,696,758 A | 10/1972 | Goginez, Jr. |
| 3,742,447 A | 6/1973 | Sognefest et al. |
| 3,846,639 A | 11/1974 | Ueda et al. |
| 3,913,064 A | 10/1975 | Salway et al. |
| 4,041,470 A | 8/1977 | Slane et al. |
| 4,065,751 A | 12/1977 | Stewart et al. |
| 4,188,618 A | 2/1980 | Weisbart |
| 4,204,256 A | 5/1980 | Klotzner |
| 4,236,213 A | 11/1980 | Richardson |
| 4,255,789 A | 3/1981 | Harrford et al. |
| 4,258,421 A | 3/1981 | Juhasz et al. |
| 4,267,569 A * | 5/1981 | Baumann et al. .............. 701/99 |

(Continued)

OTHER PUBLICATIONS

Harmon et al., Electronic Control for Bus, Truck and off-Highway Vehicle Transmissions, SAE 820907, 1982 Convergence Conference Proceedings, p. 147, month is not available.*

(Continued)

*Primary Examiner*—Tan Q. Nguyen

(57) ABSTRACT

The land vehicle electrical system comprises a cab controller including a microprocessor system and a chassis controller including a microprocessor system. The microprocessor systems have a multiplexed coupling therebetween and each system includes a microprocessor substantially identical to the microprocessor in the other system with the hardware in each system being substantially identical and with each microprocessor having slightly different software. The microprocessor utilized in the chassis controller has analog inputs for direct connection to sensors. A public data link and a private data link are provided between the microprocessors for additional and backup communication between them. Smart switches are coupled to one or both of the microprocessors and each switch includes means for indicating its status, open circuit or closed circuit, to a microprocessor and the microprocessor includes means for reading the status of the switch and for controlling the status of the switch. The microprocessor also have a diagnostic routine for diagnostic capability or fault isolation. Furthermore, the cab controller includes a visual dipslay having touch actuated switch function areas on the screen of the visual display which switch function areas can be actuated to call up different menus and different control panels.

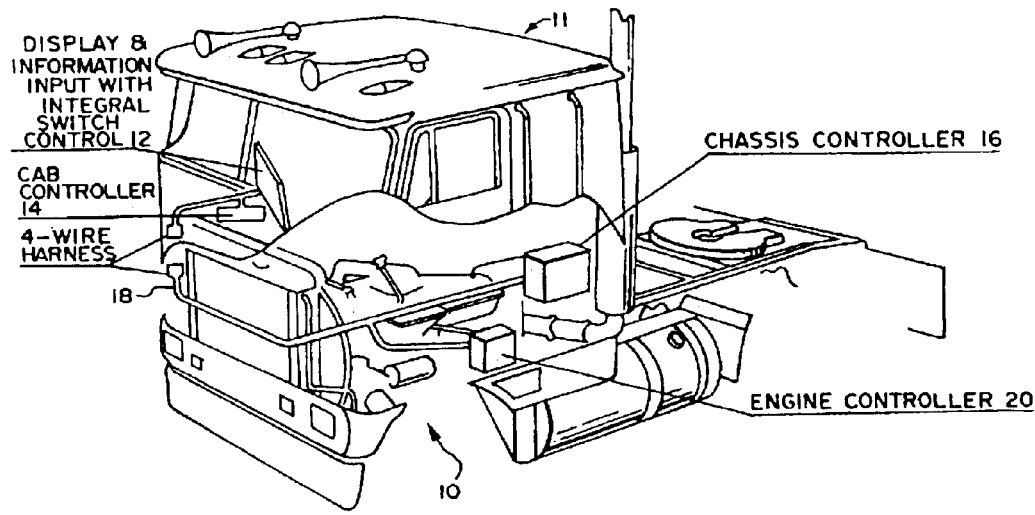

U.S. PATENT DOCUMENTS

| | | |
|---|---|---|
| 4,271,402 A | 6/1981 | Kastura et al. |
| 4,277,772 A | 7/1981 | Kastura et al. |
| 4,282,465 A | 8/1981 | Acker et al. |
| 4,296,409 A | 10/1981 | Whitaker et al. |
| 4,302,814 A | 11/1981 | Full et al. |
| 4,306,218 A | 12/1981 | Leconte et al. |
| 4,309,759 A | 1/1982 | Tokuda et al. |
| 4,344,136 A | 8/1982 | Panik |
| 4,344,139 A | 8/1982 | Miller et al. |
| 4,361,871 A | 11/1982 | Miller et al. |
| 4,368,705 A | 1/1983 | Stevenson et al. |
| 4,368,824 A | 1/1983 | Thomasson |
| 4,395,624 A | 7/1983 | Wartski |
| 4,398,258 A | 8/1983 | Naitoh et al. |
| 4,404,648 A | 9/1983 | Miyakawa et al. |
| 4,419,654 A | 12/1983 | Funk |
| 4,433,379 A | 2/1984 | Schenk et al. |
| 4,435,648 A | 3/1984 | Goode, III |
| 4,442,424 A | 4/1984 | Shirasaki et al. |
| 4,487,002 A | 12/1984 | Kruse et al. |
| 4,497,057 A * | 1/1985 | Kato et al. .................. 714/46 |
| 4,503,528 A | 3/1985 | Nojiri et al. |
| 4,518,268 A | 5/1985 | Swis et al. |
| 4,521,856 A | 6/1985 | Phelps et al. |
| 4,527,241 A | 7/1985 | Sheehan et al. |
| 4,532,594 A | 7/1985 | Hosaka et al. |
| 4,534,025 A | 8/1985 | Floyd |
| 4,551,801 A * | 11/1985 | Sokol .......................... 701/32 |
| 4,556,943 A | 12/1985 | Pauwels et al. |
| 4,562,545 A | 12/1985 | Hasegawa |
| 4,574,266 A * | 3/1986 | Valentine ................... 340/635 |
| 4,583,036 A | 4/1986 | Morishita |
| 4,593,357 A | 6/1986 | Van Ostrand et al. |
| 4,594,571 A | 6/1986 | Neuhaus et al. |
| 4,594,572 A * | 6/1986 | Haubner et al. ........... 340/462 |
| 4,602,324 A | 7/1986 | Fujawa et al. |
| 4,611,193 A | 9/1986 | Bruggemann et al. |
| 4,622,637 A | 11/1986 | Tomita et al. |
| 4,630,043 A | 12/1986 | Haubner et al. |
| 4,635,034 A | 1/1987 | Tokuyama et al. |
| 4,635,214 A | 1/1987 | Kasai et al. |
| 4,639,609 A | 1/1987 | Floyd et al. |
| 4,642,771 A | 2/1987 | Asagi et al. |
| 4,659,977 A | 4/1987 | Kissel et al. |
| 4,663,940 A * | 5/1987 | Suzuki et al. ................. 62/127 |
| 4,677,308 A | 6/1987 | Wroblewski et al. |
| 4,677,429 A | 6/1987 | Glotzbach |
| 4,745,552 A | 5/1988 | Phelps et al. |
| 4,799,126 A | 1/1989 | Kruse et al. |
| 4,845,465 A | 7/1989 | Kruse et al. |
| 4,845,645 A | 7/1989 | Matin et al. |
| 4,862,365 A | 8/1989 | Onesti |
| 4,875,041 A | 10/1989 | Dannenberg |
| 4,926,331 A | 5/1990 | Windle et al. |

OTHER PUBLICATIONS

Nolan, "Survey of Electronic Displays" SAE 750364, 1995, pp. 97–100, month is not available.*

Lowndes et al., "The Motocar Multiplex Systems", IEEE 1983, pp. 154–159, month is not available.*

Phillips, "Microprocessor Applications", Automotive Mircroelectronics, 1986, p. 1–36, month is not available.*

Weishaupt, "Technical Aspect of the BMW On–board and Service Diagnostics System", 1984 Convergence Proceedings, pp. VIII–25 to VIII–30, month is not available.*

Jurgen, ed., "More Electronics in Detroit's 1985 Models" IEEE Spectrum (Oct. 1984), pp. 54–60.

Massoubre et al., "A Multiplexed Wiring System for Cars and its Electronics" Precision Mecanique Labinal, pp. 268–271, month and year are not available.

He, "A Multiplexing System for Digital Transmission and Process in Vehicles", Electronics and Communications in Japan, Part 1, vol. 70, No. 9, 1987, pp. 87–94.

Westbrook, "Developments in Automotive Electronics", Automotive Engineer, vol. 4, No. 4, Aug.–Sep. 1979, pp. 19–23.

Preston et al., "Multiprocessor Implementation of the Logic Function of a Multiplexed Wiring System for Automobiles", IEE Proc., vol. 129, Pt. E, No. 6, Nov. 1982, pp. 223–228.

Phillips, "Microprocessor Applications", Automotive Microelectronics, 1986, pp. 1–36, month is not available.

Danek, "Microprocessor Instrument Cluster", Agricultural electronics—1983 and beyond; proceedings of the National Conference on Agricultural Electronics Applications, Dec. 11, 1983, National Conference on Agricultural Electronics Applications, Chicago, Ill. vol. 1, 1984, pp. 144–150.

Blasi et al., "Modular Electronic Signals System for Automobiles", International Symposium on Automative Technology and Automation (1984: Milan, Italy) ISATA 84013, 1984, pp. 217–230 and 232), month not available.

Lowndes, et al., "The Motocar Multiplex Systems" International Conference on Automotive Electronics, IEE confrerence publication No. 229, 1983, pp. 154–159, month not available.

Oho et al., "A Custom LSI Approach to Multiplexed Wiring," Proceedings, International Symposium on Automotive Technology and Automation, 1985 (Graz, Austria), ISATA 85046; pp. 111, 113–129, month not available.

Foerste, "Automotive 'Signalbus' Multiplex Wiring System", pp. 263–267, month/year not available.

Warder, "Low Cost Intelligent Load Switching Using Smartpower Devices," IMechE—Conference Publications, 1985–12, The Fifth Internationl Conference on Automotive Electronics, Oct. 29–Nov. 1, 1985, Hotel Metropole, Birmingham, pp. 365–368.

Zuckmantel et al., "Multiplex Systems for Vehicles—Evolution Instead of Revolution," IMechE Conference Publications, Fifth International Conference on Automotive Electronics, Oct. 29–Nov. 1, 1985, Hotel Metropole, Birmingham, pp. 237–244.

Zuckmantel, "On Board Control and Monitoring Systems for Automotive Vehicles", pp. 253–257.

Dolenga, "Vehicle Communication Networking: A System Perspective," IEEE 1986 Workshop on Automotive Applications of Electronics (Oct. 23–24, 1986, Hyatt Regency Hotel, Dearborn, Michaigan), pp. 23–33.

Brody, "Smart Power Chips that Combine Electronic Intelligence with Electrical Brawn Can Make Equipment Smaller and More Efficient" High Technology, Dec. 1985, pp. 18, 20 and 23.

Jones, "Off Road Vehicle Electronics" Motor Vehicle Technology: Progress and Harmony, Proceedings vol. 2, The Second International Pacific Conference on Automotive Engineering, Keio Plaza Hotel, Tokyo, Japan, Nov. 7–10, 1983, pp. 599–616.

Versatile, 2000 Pull Type Combine Operator's Manual 1982, pp. 1–50, survey and symbols.

Versatile vehicle (photo).

International Congress on Transportation Electronics, "Theme: New Horizons in Vehicular Electronics" Final Program Oct. 22–24, 1984, pp. 1–30.

Motorola Semiconductors, "MC68HC11A8 Technical Summary" 1984, pp. 1–36, month not available.

1985 Car Shop Manual, Part I of II, vol. B, "Body Chassis Electrical" Ford, Sep. 1984, pp. 33–09–01 to 33–09–26; 33–07–01 to 3307–27.

DeeCo—Applications Manual "Electroluminescent Graphics and Text Display Module with Controller, Model #M2EL512x256P", 1985, List of Figures, Table of Contents, and pp. 1–34 and 11 pages of Addenda, month not available.

Jones et al., Aricultural and Construction Vehicle Electronics, International Congress on Transportation Electronics Proceedings, IEEE Catalog No.:84CH1988–5, Oct. 22–24, 1984, 8 cover pages, pp. 1–21 to 1–35pp. 1–35.

"Commercial Vehicle Electronics" The Thirty–Second L. Ray Buckendale Lecture, 1986, pp. ii, iii, v–ix, 1–43.

Toelle, SAE770008: "Microprocessor Control of the Automobile Engine" International Automotive Engineering Congress and Exposition, 1977, pp. 1–10, month not available.

Jarvis et al., SAE840313: "Cathode–Ray Tube Information Center with Automotive Navigation Electronic Displays and Information Systems SP–565", 1984, pp. 123–137, month not available.

Hartford, SAE780118: "Microprocessor Engine Controller", Technical Paper Series, Society of Automotive Engineers, 1978, pp. 1–9, month not available.

Asano et al., SAE800825: "Digital Engine Controller", SAE Technical Paper Series, 1980, 9 pages, month not available.

Harmon et al., SAE820909: "Electronic Controls for Bus, Truck, and Off–Highway Vehicle Transmissions", 1982, Convergence Conference Proceedings, pp. 147–160, month not available.

Murashige, SAE830203: "A Microprocessor Based CRT Controller for Automotive Applications", pp. 123–127, month, year not available.

Floyd et al., SAE830537: "An Evaluation of Serial Protocols and Media Alternatives for Vehicle Multiplex", SAE Technical Paper Series, 1983, pp. 1–9, month not available.

Yoshida et al, SAE830543: "An Advanced Car Air Conditioning System with Microcomputer", SAE Technical Paper Series, 1983, pp. 1–12, month not available.

Falzoni et al, SAE830628: "Microprocessor Clutch Control", pp. 115–125, month/year not available.

Upchurch et al., SAE810940: "Development of a Microprocessor–Based Steering Controller for an Over–the–Row Apple Harvester", pp. 21–31, month/year not available.

Kovener, SAE820256: "A Low Cost Electronic Ignition Control System with a 4–Bit Microcontroller", pp. 27–32, month/year not available.

Matsuzaki et al. SAE840492: "Development of Multiplex Wiring System with Optical Data Link for Automobiles", SAE Technical Paper Series, 1984, pp. 1–14, month not available.

Perissinotto et al., SAE840493: "Automotive Informative System: Electronic Dashboard as Central Unit", SAE Technical Paper Series, 1984, pp. 1–10, month not available.

Himono et al., SAE840494: "Optical Link for Automotive Multiplex Wiring", SAE Technical Paper Series, 1984, pp. 1–7, month not available.

Sullivan, SAE840546: "European Applications of Ford Central Fuel Injection Engine Control System" Sullivan, pp. 147–157, month not available.

DeNardo et al., SAE850305: A Multiprocessor Information System for Bus Vehicles, pp. 95–105, month, year not available.

Seegan et al., SAE850306: "Software Architecture for a Driver Information System", pp. 107–113, month, year not available.

Page, SAE850563: "A Microprocessor Based Controller for a Dry Plate Clutch and Constant Mesh Gearbox" SAE Technical Paper Series, 1985, pp. 81–88, month not available.

Morris et al., SAE850783: "Electronic/Hydraulic Transmission Control System for Off–Highway Hauling Vehicles", SAE Technical Paper Series, 1985, pp. 1–7, month not available.

Rivard, SAE852296: "Automotive Electronics Technologies for the '80s" Rivard, pp. 899–915, month not available.

Riley et al., SAE852325: "The Importance and Evolution of the Standardized Serial Data Link to the Truck OEM", $3^{rd}$ International Pacific Conference on Automotive Engineering, 1985, pp. 17–22.

van Veldhuizen, SAE854205: "Proposal for an Automotive Multiplex Wiring System", ImechE, 1985, pp. 227–230, month not available.

Johnson et al., SAE854218: "Systems Considerations for Incorporating Vehicle Data Networks (Multiplex) Into Automobiles", pp. 209–218, month/year not available.

Haub et al., SAE860178: "The LCD Dot Matrix for Versatile Driver Information" Haub, pp. 37–44, month/year not available.

Ziegler, SAE860341: "Electronic Instrument Cluster with LCD", pp. 73–85, month/year not available.

Phail et al., SAE860390: "In–Vehicle Networking—Serial Communication Requirements and Directions", pp. 7–18, month/year not available.

Juzswik et al., SAE860393: "Microcomputer Based Serial Multiplex Wiper Control System", SAE Technical Paper Series, 1986, pp. 1–10, month not available.

Rivard, SAE861027: "Automotive Electronics in the Year 2000", pp. 1–18, month not available.

Florence et al., SAE861031: "Integrated Vehicle Electronics—An Overview of Its Potential" Florence, pp. 33–38, month/year not available.

Gerstenmeier, SAE861033: "Traction Control (ASR)—An Extension of the Anti–Lock Braking System (ABS)", pp. 49–54, month/year are not available.

Krugler, SAE861048: "Vehicle Electronics—Proliferation and Consolidation in the 1990's " Krugler, pp. 143–149, month is not available.

Numazawa, SAE861060: "Overview and Future Plan of Automotive Electronic Systems", pp. 223–238, month/year are not available.

Mizutani et al., SAE861067: "Current Status on Truck, Bus, and Agricultural Vehicle Electronics in Nippondenso", pp. 277–284, month/year are not available.

Malecki et al., SAE861077: "Diesel Electronic Engine Controls in the North American Heavy Duty Truck Market", pp. 311–320, month/year are not available.

Jennings et al., SAE861959: "A Dynamic Simulation of the Detroit Diesel Electronic Control System in Heavy Duty Truck Powertrains", SAE Technical Paper Series, 1986, pp. 1–26, month is not available.

Petersen et al., SAE861961: "Anti–Lock Braking System (ABS) with Integrated Drive Slip Control (ASR) for Commercial Vehicles", SAE Technical Paper Series, 1986, pp. 1–14, month is not available.

Steiger, Panther 1000 Series Operators Manual, pp. 1–115.

Panther, 1000 Series Parts Manual, pp. 1–1 to 11–10.

Steiger, Panther 1000, Rated Engine HP 335 HP (250 kW), 6 pages.

Steiger, Panther 1000, Introducing Revolutionary Power-Plus–controlled 12–speed Full Powershift Transmission, 6 pages.

Steiger, The Steiger Line. 4 pages.

Steiger, Panther 1000, Official Test Data., 13 pages.

Steiger, General Specifications Panther 1000 Series Tractors Service Manual, pp. 1–62 + 10 Schematics.

Steiger, Panther 1000 Series Heating, Ventilating & A/C Service Manual, pp. 1–1 to 12–9 + Schematics pp. 13–37.

Steiger, General Specifications Bearcat & Cougar 1000 Powershift Series, Service Manual, pp. 1 to 14 + Schematics.

Kruse, James William, Deposition Transcript of Mar. 11, 2004, in the matter of *International Truck and Engine Corp., and International Truck Intellectual Property Co., LLC.* v *Caterpillar, Inc.,* Civil Case No. 1:03 CV265, U.S. District Court for the Northern District of Indiana (Fort Wayne Division).

Kruse, James William, Deposition Transcript of Nov. 9, 2004, in the matter of *International Truck and Engine Corp., and International Truck Intellectual Property CO., LLC.* v. *Caterpillar, Inc.,* Civil Case No. 1:03 CV265, U.S. District Court for the Northern District of Indiana (Fort Wayne Division).

Riley, Donald E., Deposition Transcript of Apr. 8, 2004 (includes minuscript), in the matter of *International Truck and Engine Corp., and International Truck Intellectual Property Co., LLC.* v *Caterpillar, Inc.,* Civil Case No. 1:03 CV265, U.S. District Court for the Northern District of Indiana (Fort Wayne Division).

Rivard, Jerome G., Deposition Transcript of Mar. 25, 2004 in the matter of *International Truck and Engine Corp., and International Truck Intellectual Property Co., LLC.* v *Caterpillar, Inc.,* Civil Case No. 1:03 CV265, U.S. District Court for the Northern District of Indiana (Fort Wayne Division).

Windle, William Eric, Deposition Transcript of Mar. 9, 2004, in the matter of *International Truck and Engine Corp., and International Truck Intellectual Property Co., LLC.* v *Caterpillar, Inc.,* Civil Case No. 1:03 CV265, U.S. District Court for the Northern District of Indiana (Fort Wayne Division).

Windle, William Eric, vol. II, Deposition Transcript of Nov. 10, 2004, in the matter of *International Truck and Engine Corp., and International Truck Intellectual Property Co., LLC.* v *Caterpillar, Inc.,* Civil Case No. 1:03 CV265, U.S. District Court for the Northern District of Indiana (Fort Wayne Division).

Sullivan, Dennis Kelly, Deposition Transcript of Mar. 30, 2004, in the matter of *International Truck and Engine Corp., and International Truck Intellectual Property Co., LLC.* v *Caterpillar, Inc.,* Civil Case No. 1:03 CV265, U.S. District Court for the Northern District of Indiana (Fort Wayne Division).

Worpell, Dave, Deposition Transcript of Mar. 23, 2004, in the matter of *International Truck and Engine Corp., and International Truck Intellectual Property Co., LLC.* v *Caterpillar, Inc.,* Civil Case No. 1:03 CV265, U.S. District Court for the Northern District of Indiana (Fort Wayne Division).

Hundiwal, Arun, Deposition Transcript of Nov. 29, 2004 (includes minuscript version), in the matter of *International Truck and Engine Corp., and International Truck Intellectual Property Co., LLC.* v *Caterpillar, Inc.,* Civil Case No. 1:03 CV265, U.S. District Court for the Northern District of Indiana (Fort Wayne Division).

Kravig, Kelly, Deposition Transcript of Nov. 22, 2004, in the matter of *International Truck and Engine Corp., and International Truck Intellectual Property Co., LLC.* v *Caterpillar, Inc.,* Civil Case No. 1:03 CV265, U.S. District Court for the Northern District of Indiana (Fort Wayne Division).

Cox, Ronald, "Local Area Network Technology Applied to Automotive Electronic Communications" 1985 IEEE Transactions on Industrial Electronics, vol. IE–32, No. 4, Nov. 1985, pp. 327–333.

Tuska, J.W., SAE 840495: "Multiplex Wiring with Microcomputer Control", SAE Technical Paper Series, 1984, month not available.

Moncelle, Michael E., SAE 850173: "Caterpillar 3406 PEEC (Programmable Electronic Engine Control)", SAE Technical Paper Series, 1985, pp. 1–15, month not available.

SAE J1708 JAN86; "Serial Data Communications Between Microcomputer Systems in Heavy Duty Vehicle Applications" 1986, pp. 1–10 (15 pages), month not available.

Trouble Shooting Section, pp. 124.

Phelps et al., "Automatic Electronic Traction Aid (AETA) Control For Off–Highway Trucks" Convergence 1984, IEEE Cat. #84CH1988–5, pp. X–13 through X–19, month is not available.

Rivard, J.G., "Electronic Fuel Injection in the USA", Prepared for Presentation at the International Colloquium on Automotive Electronic Technology—Convergence '74, Troy, Michigan, Oct. 1974, pp. 1–16.

Jurgen, R.K., "Coming from Detriot: Networks on Wheels" IEEE Spectrum, 1986, pp. 53–59, month is not available.

Jurgen, R.K., "Multiplexed Car Wiring Called Next Automotive Wave", The Institute, vol. 10 No. 5, 1986, pp. 1, 13, month is not available.

"MPC 1510 Application Considerations" Motorola, Inc., 1987, month is not available.

Hames, R.J., "DDEC–Detroit Diesel Electronic Control", Presented to Convergence 84, Oct. 23, 1984, 1984 SAE Truck & Bus Meeting & Exposition, 2 pages.

"DDEC DDL Reader Model #1285 Instruction Manual" General Motors Corporation, 1984, pp. 1–16.

"Compuchek Protection Plan" Cummins Engine Company, Inc. 1985.

Nolan, SAE 750364: "Survey of Electronic Displays" Automotive Electronics II, 1975, pp. 97–100, month is not available.

Batcheller, "Integrated Electronic Tractor Controls" 1984 Convergence Conference Proceedings, p. IV–9, month is not available.

Weishaupt, "Technical Aspects of the BMW On–Board and Service Diagnostics Systems" 1984 Convergence Conference Proceedings, p. VIII–25, month is not available.

Weathers, "Automotive Computers and Control Systems" 1984, month is not available.

"International Congress on Transportation Electronics" 1982 Convergence Conference Proceedings, month is not available.

"International Congress on Transportation Electronics" 1984 Convergence Conference, Proceedings, month is not available.

Artusi, "Smartpower—New Electronic Solutions to Automotive Problems" Smart Power: Automotive Applications SP–719, Aug. 1987, p. 15–22.

Dannenberg, Robert, Deposition Transcript of Mar. 26, 2004, in the matter of *International Truck and Engine Corp., and International Truck Intellectual Property Co., LLC. v Caterpillar, Inc.,* Civil Case No. 1:03 CV265, U.S. District Court for the Northern District of Indiana (Fort Wayne Division), pp. 1, 21–34, 60–125, 151, 158–161 and 178–181.

Exhibit B: Plaintiff's Response to Defendant Caterpillar's First Set of Requests for Admission (Nos. 1–5), Mar. 22, 2004 (N.D. Ind. Case No. 1:03cv265).

Exhibit C: Deposition of James Kruse, p. 148, line 8–p. 151, line 25 (N.D. Ind. Case No. 1:03cv265).

Exhibit D: Declaration of Dennis F. Wilkie, Ph.D.

* cited by examiner

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 1–29, 31, 33–40, 44–49, 53 and 54 are confirmed.

Claims 30, 32, 41–43, 50–52, 55 and 56 are cancelled.

* * * * *